United States Patent [19]
Yang et al.

[11] Patent Number: 6,057,800
[45] Date of Patent: May 2, 2000

[54] RDOP SURFACE FOR GPS RELATIVE POSITIONING

[75] Inventors: Xinyu Yang, Longmont, Colo.; Robert Brock, DeRayter, N.Y.

[73] Assignee: State University of New York, Albany, N.Y.

[21] Appl. No.: 08/884,308

[22] Filed: Jun. 27, 1997

Related U.S. Application Data

[60] Provisional application No. 60/020,749, Jun. 28, 1996.

[51] Int. Cl.$^7$ .............................. G01S 5/02; H04B 7/185
[52] U.S. Cl. .............................. 342/357.08; 342/357.06; 701/213
[58] Field of Search .................................. 342/357, 457; 701/213; 455/12.1

[56] References Cited

U.S. PATENT DOCUMENTS

| | | |
|---|---|---|
| 4,870,422 | 9/1989 | Counselman, III . |
| 4,928,107 | 5/1990 | Kuroda et al. .......................... 342/357 |
| 5,248,981 | 9/1993 | Yoshihara et al. . |
| 5,252,982 | 10/1993 | Frei . |
| 5,323,163 | 6/1994 | Maki ....................................... 342/357 |
| 5,347,285 | 9/1994 | MacDoran et al. ..................... 342/357 |
| 5,359,332 | 10/1994 | Allison et al. . |
| 5,434,787 | 7/1995 | Okamoto et al. . |
| 5,442,363 | 8/1995 | Remondi . |
| 5,483,456 | 1/1996 | Kuwahara et al. . |
| 5,497,356 | 3/1996 | Norton et al. .............................. 376/6 |
| 5,519,620 | 5/1996 | Talbot et al. . |
| 5,757,916 | 5/1998 | MacDoran et al. ....................... 380/25 |
| 5,774,829 | 6/1998 | Cisneros et al. ........................ 701/213 |

OTHER PUBLICATIONS

Hatch et al., "Strategic Planning Tool for GPS Surveys," *Journal of Surveying Engineering*, 115(2):207–217 (1989).
Merminod et al., "Planning GPS Surveys—Using Appropriate Precision Indicators," *CISM Journal ACSGC*, 44(3):233–249 (1990).

*Primary Examiner*—Thomas H. Tarcza
*Assistant Examiner*—Dao L. Phan
*Attorney, Agent, or Firm*—Braman & Rogalskyj, LLP

[57] ABSTRACT

The effect of changing satellite geometry on the achievable accuracy of GPS relative positioning under the full GPS constellation has been researched. A mathematical model has been developed for the quantitative analysis of the accuracy of GPS relative positioning with respect to the changing satellite/station configuration, observation starting time and session length. A method based on modeling the relative dilution of precision (RDOP) has been developed for the optimum design of GPS relative positioning with carrier phase observable. The RDOP surface, a mathematical surface, has been generated based on the broadcast almanac file. The optimum observation windows, optimum session starting time and optimum observation session length have been derived from the study of the RDOP surface.

The method and mathematical model based on the RDOP are compared with those based on the PDOP (position dilution of precision) for application purposes. An important phenomenon, the shift of the RDOP curve as a function of observing session length, has been discovered. The relation between PDOP and RDOP is explained based on this finding. The results and analyses are given with practical examples.

Array algebra filtering, a generalized sequential estimation technique, has been investigated and further developed for the fast generation of the RDOP surface. The mathematical principle and statistical properties of array algebra filtering have been researched and the characteristics of this filtering technique are analyzed. The algorithmic development, processing run streams, data and results are included. The potentials of this technique for use in fast real-time GPS data processing and real-time accuracy prediction are outlined.

6 Claims, 12 Drawing Sheets

RDOP SURFACE FOR GPS RELATIVE POSITIONING

This application claims priority of U.S. Provisional patent application Ser. No. 60/020,749, filed Jun. 28, 1996, the entire contents of which are hereby incorporated by reference.

1.0 INTRODUCTION

1.1 Scope

The Navigation Satellite Timing And Ranging (NAVSTAR) Global Positioning System (GPS) is a space-based all-weather navigation system under development by the U.S. Department of Defense (DOD) since 1975. The original objective of GPS is to "satisfy the requirements for the military forces to determine their position, velocity and time in a common reference system, anywhere on or near the Earth on a continuous basis" (Wooden, 1985). Early GPS surveying demonstrated that the GPS technique can be used for geodetic relative positioning with separations from a few tens of kilometers to several hundreds of kilometers with substantially higher accuracy and efficiency than conventional terrestrial methods. With the deployment of the full GPS constellation in 1994, GPS provides a 24-hour navigation and surveying capability with full coverage anywhere on Earth. GPS has revolutionized the practice of surveying. GPS has great potential and it also provides a great challenge for surveying. The space-based GPS technique is radically different from conventional earth-based surveying technology. It requires rethinking traditional methodologies and techniques for survey planning, optimum design, accuracy estimation and data processing.

The purpose of this research is to develop and test an optimum technique which can be used for precise GPS relative positioning with carrier phase observable. A method based on the modeling of Relative Dilution of Precision (RDOP) will be developed for quantitative analysis of the achievable accuracy of a GPS baseline. A filtering and prediction technique, array algebra filtering, will be investigated for the fast generation of a RDOP surface. This technique can be used for the optimum design of precise GPS relative positioning based on the broadcast almanac file. It can also be used for, real-time GPS data processing or real-time accuracy prediction based on the ephemeris file.

The principle of this method is based on modeling the effect of the changing geometry of GPS satellites/stations configuration with respect to observation time on the achievable accuracy of the GPS baseline. The value of RDOP, a quantifiable measure proposed by Goad (1989) will be used to generate a mathematical surface which is a function of the satellite configuration, the approximate position of the GPS baseline to be observed and the survey start/stop time. This RDOP surface will be studied and an optimum observation curve will be derived from this surface. Three models of RDOP will be studied for the achievable accuracy of kinematic relative positioning and static relative positioning under the condition of the fall GPS satellite constellation.

The research consists of five main stages: (1) Derivation of a mathematical model for evaluating the effect of changing geometry of satellites/stations configuration with respect to observation time based on RDOP; (2) Implementation of the algorithms used for GPS satellite orbit prediction based on the almanac file; (3) Numerical generation and theoretical study of the RDOP surface; (4) Derivation of the optimum curve for GPS relative positioning; (5) Comparison of the method based on RDOP developed in this research with the current method used by Trimble software which is based on PDOP.

The data sets used in this research are the almanac files collected with Trimble and Margellan receivers on Oct. 24, 1993 and Aug. 31, 1994. The method and algorithms developed in this research will be compared and tested with the method used in the Trimble software. The application of the theory and method developed in this research will be discussed and outlined.

1.2 The Limitation of GDOP

The measure of Geometric Dilution of Precision (GDOP) or Position Dilution of Precision (PDOP) has been commonly used to describe the effect of the satellite geometric distribution on the achievable accuracy of GPS positioning. The concept of GDOP/PDOP was borrowed from GPS navigation principle which reflects only the instantaneous satellite geometry related to a single point at a single epoch. The GDOP factor does not reflect the accuracy achievable with precise GPS relative positioning which is determined by satellite/station geometry and the timing and duration of observation. PDOP values for pseudo range solutions are more relevant to navigation rather than to survey application. The limitation of PDOP as an accuracy indicator for relative positioning was reported by Norton (1987), Hatch and Avery (1989), and Merminod, Grant and Rizos (1990).

Due to the absence of a proper measure of good satellite geometry for relative positioning, GDOP factors have tended also to be used to assist in the planning of GPS surveys (Merminod, Grant and Rizos 1990). The recommended GDOP/PDOP factors for relative positioning can be found in government survey and mapping organization documentation (Canada, Rapatz et al, 1987; Australia, Inter-Government Advisory Committee on Surveying and Mapping, IGACSM, 1988). The United States Federal Geodetic Control Committee (FGCC, 1988) recognized the problem with GDOP and remarked, ". . . Studies are underway to investigate the relationship of Geometric Dilution of Precision (GDOP) values to the accuracy of the base line determinations. . . . It appears the best result may be achieved when the GDOP values are changing in value during the observing session." Several efforts have been made to use the changing rate of GDOP as a measure for relative positioning. One suggested that the best results are achieved when the GDOP values are getting smaller in value during the observing session (IGACSM 1988) while the other said that it was often desirable to take observations at a time of rapidly chancing PDOP (Trimble, 1989). It is obvious that there are some contradictions and confusions in the previous research about a rational criterion that can be used for optimum GPS survey planning.

The accuracy of relative positioning is determined by the continuously changing satellite geometry from the observation starting time to the end of a session. Since the computation of GDOP does not take into account time as a variable, it is not a proper measure for GPS satellite surveying.

1.3 Modeling Satellite Geometry with RDOP

In this research a mathematical model based on RDOP, a quantifiable measure proposed by Goad (1989), will be developed to study the effect of the continuously changing satellite geometry over the entire observation period on the achievable accuracy of relative positioning. This model is based on:

(1) Unlike point positioning, the accuracy of which is determined by the instantaneous satellite/station geometry at a single epoch, the accuracy of relative positioning is determined by the continuously changing satellite/station geometry from observation starting time to the end of the session which may last for a few hours. Therefore in this model the time t will be treated as a continuous variable.

(2) The position determined in the point positioning only involves a single point while in relative positioning 2 positions are determined simultaneously for a GPS baseline. Thus ideally the coordinates of both points should be considered as unknowns in this model.

A generalized mathematical model of RDOP based on the above consideration will be developed to study the achievable accuracy of relative positioning under the condition of a full GPS constellation. In this model the time t is treated as a continuous variable thus the variability of the accuracy of relative positioning with respect to different observation starting time and session length can be studied based on this model. With both of the two stations of a baseline considered as unknowns a complete accuracy analysis can be derived from this model, namely the absolute accuracy of the two stations and the relative accuracy between the two.

Compared with the mathematical model of PDOP, a new variable, the observation session length, is introduced into the model of RDOP. The commonly used PDOP curve is a two dimensional plot in which one axis represents observation time and the other axis represents the values of PDOP. In the plot of RDOP the observation session length can be expressed in the third dimension to generate a mathematical surface. This surface will be called the RDOP surface. The RDOP surface contains the accuracy information for GPS relative positioning with respect to a certain session starting time and session length. The advantage of the RDOP surface is that it can be numerically simulated based on the GPS broadcast almanac file. An optimum observation curve can then be derived from the theoretical study of the RDOP surface. The optimum curve can be used for a GPS surveying network design based on the almanac file or the automatic determination of the session length in a real-time mode based on the ephemeris file. The value of RDOP is a measure that can also be used for objective quality control in a least-squares adjustment of a GPS network.

1.4 A Mathematical Approach: Array Algebra Filtering

The RDOP surface is 3-D graphical presentation of the RDOP which is a function of session starting time and session length. A RDOP surface can be generated based on grided data. The generation of the RDOP surface is computationally expensive. With the conventional least-squares batch solution technique, the generation of a RDOP surface for a 12 hour window with 2 hour session length at a 1 minute interval requires a total of 86400 computations of RDOP.

In this research a filtering technique, called array algebra filtering, will be investigated for the fast generation of the RDOP surface. This technique processes data sequentially in an "on line" mode. The initial value of the RDOP at the beginning of a session can be computed as soon as the minimum number of equations required for a unique solution of the RDOP is satisfied, and the subsequent solutions of the RDOPs with different session length can be computed based on "epoch by epoch" basis. In each step of the filtering solution only the inversion of a smaller matrix related to the new observations is needed and the previous observations are not required to be stored in the memory. Thus substantially less memory is required and a faster processing speed can be achieved.

The generalized mathematical model of the RDOP described in 1.3 contains the singular case. The loop inverse technique developed by Rauhala (1974, 1975, 1976) will be investigated for the filtering solution of the GPS data in the singular case.

The filtering technique that will be developed in this research provides real time computational ability and it can be used for real time GPS data processing.

2.0 LITERATURE REVIEW

In the past ten years, there has been a rapid advance in GPS positioning methodologies and data processing techniques but little effort has been made to establish a clear procedure for optimum GPS surveying design. This is partly because of the limited number of available satellites and restricted windows in the early days of GPS surveying and partly because of the complex relationships regarding the obtainable accuracy with the changing geometry of the satellite configuration, timing and duration of the observation session. Another reason for the delay in the research on this topic is that most of the people think that with the full GPS satellites deployment in 1994 the GPS survey planning problem will be less critical.

In the GPS surveying literature one can find a number of early attempts to develop more appropriate accuracy indicators for GPS surveying. Landau and Eissfeller (1985) used the computed coordinate precision with an assumption that the cycle ambiguities have been resolved. The differential PDOP or GDOP factors proposed by Bietsos (1986) are far from ideal to be used in GPS surveying (Mennonod, Grant and Rizos, 1990).

Norton (1987) reported the inappropriateness of the GDOP used for the carrier phase solution. He pointed out that the high GDOP values which mean the poor geometry for pseudo-range point positioning may be, the best observing time for carrier phase relative positioning. Another apparent reason that the GDOP is not appropriate for the carrier phase solution is that the GDOP is undefined for observing three satellites but three satellites can be used in static relative positioning with the carrier phase observable. Hatch and Avery (1989) gave a dear example about this point in the 1986 Iceland GPS survey campaign.

Goad (1989) proposed the use Relative Dilution of Precision (RDOP) as an accuracy measure for GPS base line determination. He gave the basic equation for the computation of the RDOP which is based on the modeling of conier phase double difference solution.

$$RDOP = \sqrt{\frac{tr[A^T \Sigma^{-1} A]^{-1}}{\sigma_\phi^2}} \qquad (2.1)$$

where $[A^T\Sigma^{-1}A]^{-1}$ is the least squares covariance matrix; A is the matrix of partial derivatives of the double difference with respect to the unknown baseline elements; $\sigma_\phi$ is the uncertainty in the double difference measurement; and $\Sigma$ is the double difference covariance matrix.

The units of the RDOP used by Goad is meters/cyde. Theoretically the relative position error (RPE) of a GPS vector can be obtained by multiplying the RDOP with the uncertainty of a double difference measurement. The RPE is a desirable quantity for the relative positioning design.

Goad discussed the possibility of using RDOP as a measure for the GPS mission planning and accuracy prediction. No practical implementation of RDOP as a GPS survey planning tool has been published by Goad.

Hatch and Avery (1989) have developed a Differential GDOP (DGDOP) program for GPS surveying planning. The computation of DGDOP is based on the computed variance of the triple difference solution. The model they used is based on (1) The most important factor determining the accuracy of a GPS baseline is whether or not the whole cycle ambiguities can be resolved; (2) The ability for the resolution of cyde ambiguity is determined by satellite selection and the timing and duration of the data collection interval; (3) The computed variance in the triple difference solution can be used as a measure of the probability of proper whole cyde ambiguity resolution.

Merminod (1990) has developed a set of three accuracy indicators called Bias Dilution of Precision (BDOP) for short distance GPS surveying plan. The three BDOPs are defined based on the partition of the normal equation matrix of the double difference solution.

$$N_{XX} = \begin{bmatrix} N_{cc} & N_{cb} \\ N_{bc} & N_{bb} \end{bmatrix} \quad (2.2)$$

where $N_{cc}$ contains the coordinate part, $N_{bb}$ contains the cycle ambiguity part, while $N^{bc}$ and $N_{cb}$ are the sub matrices formed from the cross multiplication of coordinate and ambiguity terms. The cofactor matrix $Q_{xx}$ is obtained by inversion of $N_{xx}$.

$$Q_{XX} = \begin{bmatrix} Q_{cc} & Q_{cb} \\ Q_{bc} & Q_{bb} \end{bmatrix} \quad (2.3)$$

BDOPI indicates the precision of the coordinates in an ambiguity-free solution. BDOPI is defined as:

$$BDOP1 = \sqrt{\text{trace}[Q_{cc}]} \quad (2.4)$$

BDOP2 indicates the precision of ambiguity parameters in an ambiguity-free solution. BDOP2 is defined as:

$$BDOP2 = \sqrt{\text{trace}[Q_{bb}]} \quad (2.5)$$

BDOP3 indicates the precision of coordinates in an ambiguity-fixed solution. BDOP3 is defined as:

$$BDOP3 = \sqrt{\text{trace}[N_{bb}^{-1}]} \quad (2.6)$$

Of the three BDOPs proposed by Merminod, the usefulness of BDOP2 is quite limited. This is because of: (1) The value of BDOP2 depends on the method used to solve the ambiguity parameters therefore it is not uniquely defined; (2) The behavior of BDOP2 is similar with BDOP1 since they describe similar properties of satellite geometry, therefore interest in BDOP2 is rather limited.

The accuracy indicators of BDOP1 and BDOP3 described by Merminod appear to be equivalent to the RDOP factor proposed by Goad. BDOP1 corresponds to the RDOP with double difference float solution and BDOP3 corresponds to the RDOP with double difference fixed solution.

3.0 GPS SATELLITE ORBIT PREDICTION

3.1 Introduction

The term "orbit prediction" used in this dissertation refers to the mathematical computation of satellite positions at specified intervals of time. The orbit theory and mathematical models for the satellite orbit description based on Keplerian elements are discussed in detail by Leick (1990) and Hofmann et al (1992). The practical realization of the GPS satellite orbit prediction is based on the parameters contained in the GPS almanac file. The parameters contained in the ephemeris file are computed based on a least-squares curve fitting over a specified interval of time; therefore they are not valid for total orbit prediction. The time system and almanac parameters for the GPS orbit description used in this investigation will be given in this chapter. It will be followed by a description of the practical method used for the orbit prediction which is based on the almanac file. Finally a numerical example in MathCad will be given for the demonstration of the computation of the GPS satellite coordinates.

3.2 GPS Epoch

The time systems used in this investigation are GPST (GPS time) and UTC (Universal Time Coordinated). Both GPST and UTC are practical realizations of dynamic time and they are based on the atomic time scales. UTC is a local solar mean time at Greenwich. UTC is kept very close to UT to approximate civilian time by offsets which are maintained by the U.S. Naval Observatory. GPST coincides with UTC at the GPS standard epoch, Ohr on Jan. 6, 1980.

Date conversion

The complete equations for converting a dvihan date to a Julian date were given by Montenbruck (1984). In this research slightly modified equations which are similar to those given by Hufnaann et al. (1992) are used to compute GPS epochs.

The conversion of civilian date to Julian date is acomphshed by $$JD = \text{int}(362.25y) + \text{int}[30.6001(m+1)] + D + UTC/24 + 1720181.5 \quad (3.1)$$

$$y = Y+1 \quad m = M+12 \quad \text{if} \quad M \le 2$$

$$y = Y \quad m = M \quad \text{if} \quad M \ge 2$$

where

In (3.1) Y, M and D are integer values for year, month and day, and UTC is the real value of the time in hours. The simplified equation of (3.1) is valid for an epoch between March 1900 and February 2100.

The Julian date computed in (3.1) can be used to compute the GPS week and GPS epoch.

GPS week

The GPS week can be computed by $$\text{week} = \text{int}[(JD - 2444244.5)/71] \quad (3.2)$$

The GPS week gives the integer number of the total weeks starting from the GPS standard epoch.

GPS Epoch

The GPS epoch can be computed by $$t = (JD - 2444244.5 - \text{week} - 7)86400 \quad (3.3)$$

The unit of GPS epoch is second and it starts from the beginning of a week which is midnight on Sunday.

The constant of 2444244.5 in Equations (3.2) and (3.3) is the Julian date of the GPS standard epoch at 0 hours on Jan. 6, 1980.

3.3 GPS Satellite Orbit Computation

The parameters contained in the almanac file used in this thesis are shown in Table 3.1

The spatial orientation of an orbital ellipse described with almanac parameters is shown in FIG. 3.1. The orientation of the orbital plane with respect to the earth is defined by right accession $\Omega_0$ at ta and inclination ik. The orientation of the orbit in the orbital plane is defined by argument of peerage ω. The size and shape of the orbit is defined by the semi-major axis a and eccentricity e.

TABLE 3.1

Almanac File Parameters

| Parameter | Description |
|---|---|
| ID | Satellite PRN number |
| Health | Satellite health status |
| e | Eccentricity |
| ta | Reference epoch within the current week (sec) |
| ik | Orbital inclination (rad) |
| Ωv | Rate of right ascension (rad/sec) |
| √a | Square root of semi-major axis (m) |
| $\Omega_0$ | Right ascension at ta (rad) |
| ω | Argument of perigee (rad) |
| M0 | Mean anomaly at ta (rad) |
| afo | Clock phase bias (sec) |
| af1 | Clock frequency bias (sec/sec) |
| wn | Current GPS week |

The key to the computation of the instantaneous positions of GPS satellites is the solution of the true anomaly fk which is a function of time. The computation of the true anomaly fk requires two auxiliary parameters called mean anomaly Mk and eccentric anomaly Ek. The true anomaly fk is related to the time through the mean anomaly Mk. The mean anomaly Mk is a simple linear function of the mean angular velocity (or mean motion) no and the time tk. Mk is related to $n_o$ and tk by $$Mk = no\ tk + M0 \quad (3.4)$$

where mean angular velocity $n_0$ is related to the gravitational constant $\mu$ and the major aids a by Kepler's third law.

$$n_0 = \sqrt{\frac{\mu}{a^3}} \quad (3.5)$$

tk is the time from the reference epoch ta. tk can be expressed as $$tk = t - ta + (\text{week} - wn)604800 \quad (3.6)$$

where t is the GPS observation epoch and the week is the corresponding GPS week; and wn is the reference GPS week.

The mean anomaly Mk and eccentric anomaly Ek are related by Kepler's equation $$Ek = Mk + e\ \sin Ek \quad (3.7)$$

Kepler's equation gives a very important relationship between the mean anomaly and the eccentric anomaly. Equation (3.7) plays an important role in the satellite orbit computation. The commonly used method for solution of Ek in the Equation of (3.7) is an iterative method which is most suitable for computer computation. A closed form of Ek can be expressed by using a Bessel function with an expansion to the seventh power of e (Muller, 1964).

$$Ek = Mk + \left(e - \frac{1}{8}e^3 + \frac{1}{192}e^5 - \frac{1}{9216}e^7\right)\sin Mk + \quad (3.8)$$

-continued $$\left(\frac{1}{2}e^2 - \frac{1}{6}e^4 + \frac{1}{98}e^6\right)\sin 2Mk +$$

$$\left(\frac{3}{8}e^3 - \frac{27}{128}e^5 + \frac{243}{5120}e^7\right)\sin 3Mk +$$

$$\left(\frac{1}{3}e^4 - \frac{4}{15}e^6\right)\sin 4Mk + \left(\frac{125}{384}e^5 - \frac{3125}{9216}e^7\right)\sin 5Mk +$$

$$\frac{27}{80}e^6\sin 6Mk + \frac{16807}{46080}e^7\sin 7Mk$$

For GPS satellites, the error of (3.8) is less than $3.4'' \times 10^{-8}$.

The true anomaly $f_k$ is related to the eccentric anomaly Ek by $$fk = 2\operatorname{atan}\left[\sqrt{\frac{1+e}{1-e}}\tan\left(\frac{Ek}{2}\right)\right] \quad (3.9)$$

The argument of latitude uk is the sum of the true anomaly fk and the argument of perigee ω.

$$uk = fk + \omega \quad (3.10)$$

The orbit radius rk is the elliptical radio distance which is a function of the semi-magor axis a and the eccentricity Ek.

$$rk = a\ (1 - e\ \cos Ek) \quad (3.11)$$

The position of a GPS satellite in an orbital plane can be expressed as $$\begin{bmatrix} xk \\ yk \\ zk \end{bmatrix} = \begin{bmatrix} rk\ \cos\ uk \\ rk\ \sin\ uk \\ 0 \end{bmatrix} \quad (3.12)$$

The longitude of the ascending node can be expressed as $$\Omega_k = \Omega_0 + (\Omega_v - \Omega_e)tk - \Omega_e\ ta \quad (3.13)$$

where $\Omega_e = 7.292115167\ 10^{-5}$ is the WGS 84 value of the earth rotation rate.

The geocentric coordinates of a GPS satellite are obtained by applying a first rotation of the (xk, yk, zk) orbital coordinate system through inclination ik and than a second rotation through the longitude of node $\Omega_k$.

$$\begin{bmatrix} Xk \\ Yk \\ Zk \end{bmatrix} = R_2(-\Omega_k)R_1(-ik)\begin{bmatrix} xk \\ yk \\ zk \end{bmatrix} \quad (3.14)$$

where $$R_2(-\Omega_k)R_1(-ik) = \begin{bmatrix} \cos\Omega_k & -\cos ik\sin\Omega_k & \sin ik\sin\Omega_k \\ \sin\Omega_k & \cos ik\cos\Omega_k & -\sin ik\cos\Omega_k \\ 0 & \sin ik & \cos ik \end{bmatrix}$$

SUMMARY

We submit this application for a method and apparatus that provides a relative dilution of precision (RDOP) surface for a global position systems (GPS)S relative positioning (i.e. survey) system. The application has three Exhibits including (a) The Optimum Design of Precise GPS Relative Positioning with RDOP Surface: Modeling, Comparison, and Results, (b) Comparison Between RDOP and PDOP showing how RDOP is a better measurement for taking surveys, and (3) RDOP Surface: An Optimum Design Tool for GPS Relative Positioning.

GPS survey systems have at least two receivers. One receiver has a known location; the location of the other receiver is unknown. Orbiting satellites broadcast GPS signals to the receivers. With the satellite signals, the receivers determine their position, i.e. their longitude, latitude and altitude. The accuracy of GPS positions vary because the relative position of each satellite with respect to each receiver changes while the measurements are made. A position dilution of precision (PDOP) has been developed to measure the accuracy of the positions. However, PDOP only measures accuracy at the start of a measuring event. It does not indicate how precision changes over the time taken to measure the positions. We have found that another criterion of accuracy, RDOP is a better measure of precision. RDOP tracks precision over the duration of the measurements event. It takes into account the relative changing positions of the satellites during the time the positions of the receivers are measured. However, determining RDOP is complex and time consuming. The invention soles the problem and quickly estimates RDOP by using a dynamic filter that generates and RDOP surface, i.e. the change in PDOP over the time of the measurements. The estimate is made with an array to algebraic filter to provided near real time estimates of RDOP. The technique greatly reduces the post processing time for generating RDOP.

Figure 18:
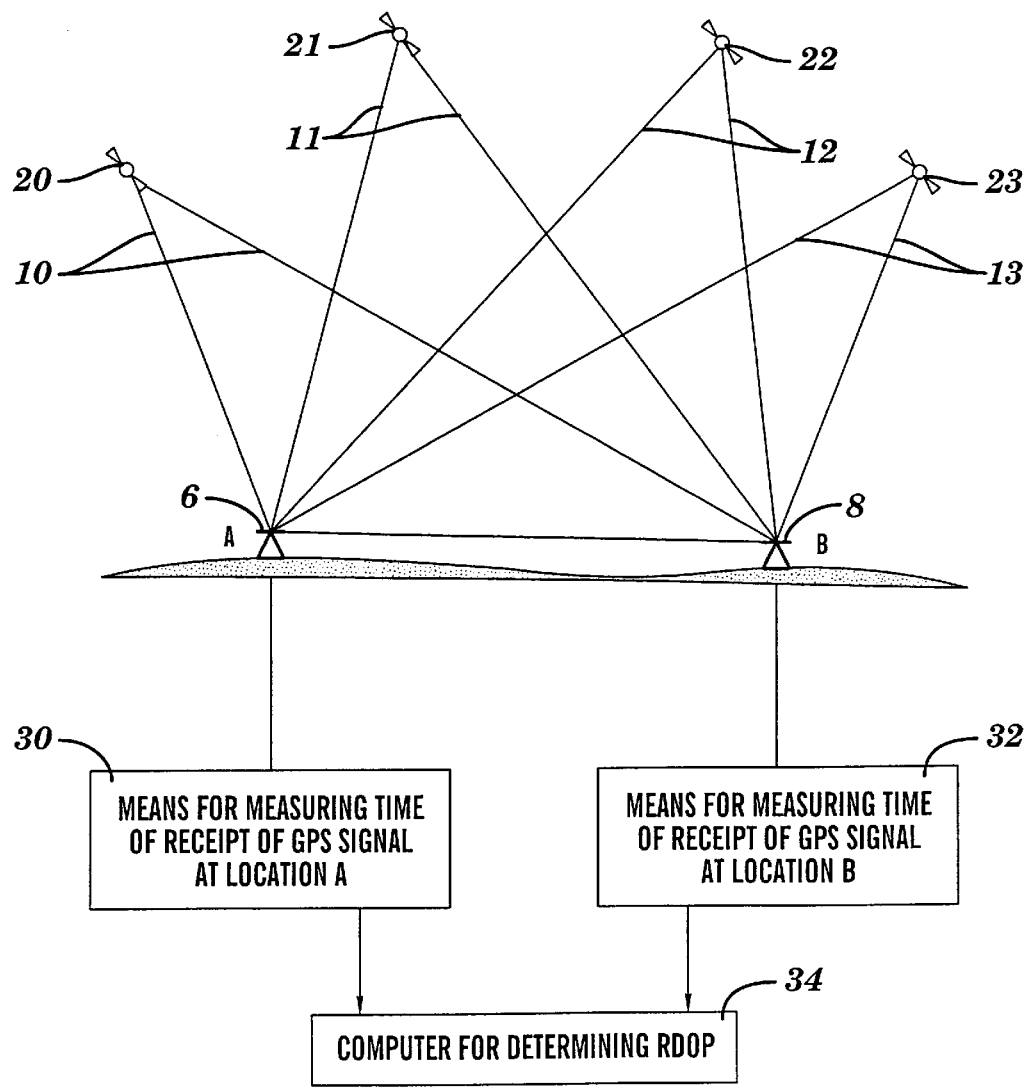
FIG. 18 Schematic drawing of an apparatus according to one embodiment of the present invention.

Accordingly, the present invention relates to an apparatus for determining the relative dilution of precision (RDOP) of a GPS measurement. Referring now to FIG. 18 to illustrate the apparatus of the present invention, the apparatus includes receiver 6 for receiving signals 10–13 from a plurality of GPS satellites 20–23 at a first, fixed, known location (denoted A in FIG. 18). The apparatus further includes a receiver 8 for receiving signals 10–13 from plurality of GPS satellites 20–23 at a second, fixed location (denoted B in FIG. 18). Trimble 4000ST receivers are suitable for use as receivers 6 and 8. Further, the apparatus of the present invention also includes devices 30 and 32 for measuring the time of receipt of signals 10–13 at receivers 6 and 8, such as, for example, a device capable of measuring GPS time or Universal Time Coordinated. Measurements of the time of receipt of signals 10–13 at receivers 6 and 8 are then used to compute RDOP. For example, the time of receipt data produced with devices 30 and 32 can be manipulated in accordance with the equations set forth below using, for example, computer 34 or other calculating device to determine RDOP.

4.0 MODELING THE SATELLITE GEOMETRY WITH RDOP

The accuracy of GPS relative positioning is directly related to the changing satellite geometry over a certain observation period, which is a complicated function of satellite relative movements with respect to time. A complete development of the mathematical model of RDOP for the modeling of satellite geometry will be given in this chapter. Three models of relative positioning are proposed for the study of RDOP.

4.1 Modeling Relative Positioning with RDOP

Relative positioning is a commonly used technique in GPS surveying to determine one geodetic position with respect to another geodetic position. In relative positioning two receivers are used at two sites to simultaneously collect carrier phase observables from the same set of satellites for a certain period of time. The advantage of the relative positioning is that the main error sources, satellite related or receiver related, can be canceled or greatly reduced with the carrier phase differential technique since they produce nearly equal shifts in the estimated position of both sites.

The characteristic of GPS relative positioning is that the relative location of the two stations can be determined to a very high order of accuracy. Typically 1 ppm to 0.1 ppm can be routinely achieved; but the absolute position of the baseline, at present time, is only at the 5 meter level or worse. The commonly used technique in GPS surveying is to start relative positioning from a station whose absolute position has been accurately determined so the whole GPS network can be fixed to that station.

The observables used in relative positioning are L band carrier phase observations. The carrier phase observations can be converted to a very precise but ambiguous range. The range is ambiguous since only a fractional part of the wavelength can be accurately determined by the receiver hardware. In order to achieve high accuracy with relative positioning, the cycle ambiguities carried in the carrier phase reduction must be resolved.

The accuracy of precise relative positioning is determined by the changing geometry of the satellite/station configuration and the timing and duration of the data collection interval. Since the Computation of GDOP does not take into account time as a variable, it is not a proper measure for GPS relative positioning.

The RDOP, a single number accuracy indicator proposed by Goad (1989), can be used for modeling the achievable accuracy of relative positioning. RDOP can be computed based on the simulation of phase data reduction in which the satellite/station geometry, session starting time and session length are all taken into account. The satellite/station geometry has two aspects: (1) the satellite configuration (all-in-view) in the sky and (2) the orientation and length of the GPS baseline on the earth.

The current standard processing strategy implemented in most GPS carrier phase processing software is: (1) The raw carrier phase observations are first differenced between stations with respect to a single satellite to form single difference observations in which most of the satellite-dependent systematic errors are eliminated; (2) The single difference variables are then differenced between satellites to form double-differenced variables in which the receiver-dependent systematic errors are eliminated. After most of the systematic errors contained in the raw carrier phase observables have been eliminated or greatly reduced, the double difference observations can be modeled in terms of station and satellite coordinates and the doubledifferenced ambiguity parameters. Based on the unknowns carried in the modeling of relative positioning, three models are proposed in this investigation for the study of RDOP.

Model 1: $\{X_B, Y_B, Z_B, t\}$

Model 1 is based on double difference fixed solution in which only the coordinates of one site of the GPS baseline are considered as unknown. The time t carried in this model can be expressed as session starting time and session length. It is assumed that the ambiguity parameters have been solved before carrier phase processing. This model can be used for the study of relative Idnematic positioning.

Model 2: $\{X_B, Y_B, Z_B, N_{AB}{}^{12}, N_{AB}{}^{13}, \ldots N_{AB}{}^{1i}, t\}$ Model 2 is based on the double difference float solution in which both the coordinates of one site of the baseline and the ambiguity parameters are considered as unknowns. Therefore the effect of changing satellite/station geometry on the aclfievable precision of the station coordinates and ambiguity parameters can be studied under this model.

In model 1 and model 2 the starting point of the GPS baseline is held fixed and assumed to have no errors. Model 1 and model 2 correspond to the minimal constraint solution witch will be discussed in Chapter 5.

Model 3: $\{X_A, Y_A, Z_A, X_B, Y_B, Z_B, NA_{AB}{}^{12}, N_{AB}{}^{13}, \ldots N_{AB}{}^{1i}, t\}$ Model 3 contains all the information needed for study of relative positioning. The unknowns carried in the model 3 are coordinates of both the sites of the GPS baseline and double difference ambigaities. Model 3 corresponds to the inner constraint solution. The important statistical properties of the inner constraint solution will be discussed in chapter 5.

4.2 Mathematical Model of RDOP

The derivation of RDOP is based on the mathematical simulation of GPS relative positioning with carrier phase observation adjustment. The values of RDOP are directly related to the changing satellite geometry, which is a function of the number of all-in-view satellites and their positions in the orbits over a certain observation period. In order to efficiently deal with the rising and setting of satellites with a fast filtering technique, the mathematical model that will be derived in this section is based on an epoch by epoch solution.

4.2.1 Carrier Phase Observable

The carrier phase observable is the measurement of the difference between the received satellite signal and receiver generated signal at the epoch of measurement t, which can be expressed as $$\Phi_A^i(t) = \Phi^i(t) - \Phi_A(t) + N_A^i \qquad (4.1)$$

where $\Phi_A^i(t)$ is the carrier phase observable in units of cycles for satellite i and receiver A measured at epoch t. $\Phi^i(t)$ denotes the received phase of satellite i and $\Phi_A(t)$ denotes the receiver generated phase. $N_A^i$ is an integer ambiguity at the initial epochs. The phase measurement provided by the GPS receiver is accurate to about 1/100 of a cycle, hence it can be converted to a very precise, typically a few millimeters, but ambiguous range. The phase measurement is ambiguous since $N_A^i$ in (4.1), an unknown carried in the carrier phase adjustment, can not be directly measured.

GPS is a one-way ranging system therefore docks are used in both of the satellites and the receivers on the ground to keep the satellite signals and receiver signals in the same time system. Hence the phase observable is biased by clock errors. The most basic range equivalent form of (4.1) is $$\phi_A^i(t) = \frac{\rho_A^i(t)}{\lambda} + a_A(t) - b_i(t) + N_A^i \qquad (4.2)$$

where $p_A^i(t)$ denotes the slant distance from receiver A to satellite i at epoch t and $\lambda$ is the wavelength of the carrier. The wavelength $\lambda$ in (4.2) is simply used to scale the slant distance $pi_A$ (t) into proper units. The $a_A(t)$ is the error in the receiver dock and $b_i(t)$ is the error in satellite clock. A more complete carrier phase model containing the detailed expressions of a and b can be found in Remondi (1984), King et al. (1987) and Leick (1990). From a practical standpoint most of the satellite related errors and receiver rerated errors can be removed or greatly reduced in the double difference solution, which will be used for RDOP modeling in the next section. Since this is the case the detailed expression for the carrier phase observable will not be given in this dissertation.

Figure 4:
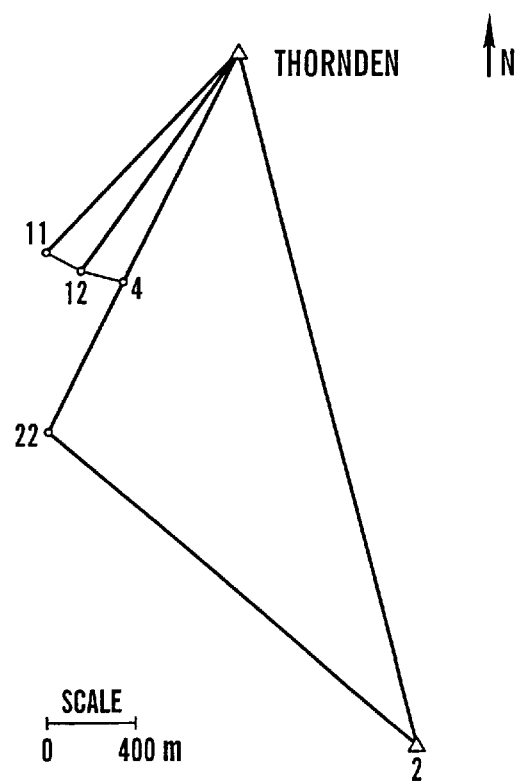
FIG. 4 A small GPS network.

The phase observable $\Phi iA(t)$ is an accumulated value of the L-band carrier phase which contains a fractional part of wavelength measured at the initial epoch and the number of whole cycles since the initial lock on the satellite signal. In effect, it is the change in the receiver-satellite range between two epochs which has been measured to very high accuracy. The geometric meaning of carrier phase observable is shown in FIG. 4. 1. The $\Phi_0, \Phi_1, \Phi_2, \Phi_3$, are phase observables and the ambiguity N is a constant if no cycle slips have occurred.

4.2.2 Derivation of RDOP

The derivation of RDOP is based on the double difference solution.

Double difference observations $\_\Phi$

If two stations A and B observe satellites i and j with i as the reference satellite at epoch t, the double difference can be expressed as $$\Delta\Phi_{AB}{}^{ij}(t)=\Delta\Phi_{AB}{}^{j}(t)-\Delta\Phi_{AB}{}^{i}(t)=\Phi_{A}{}^{j}(t)-\Phi_{B}{}^{j}(t)-\Phi_{A}{}^{i}(t)+\Phi_{B}{}^{i}(t) \quad (4.3)$$

where the superscripts denote the observed satellites and the subscripts denote the receivers. $\Phi^{i}{}_{A}(t)$ is the raw phase observable observed at station A to satellite i at epoch t. $\Delta\Phi^{i}{}_{AB}(t)$ denotes the single difference computed from the observed phases at stations A and B to the satellite i. Similarly the $\Delta\Phi^{ij}{}_{AB}(t)$ represents the double difference computed from the observed phases at stations A and B to satellite i and j.

The double differences can be expressed in matrix form.

$$\Delta\Phi = D\Phi \quad (4.4)$$

The dimension of matrix $\_\Phi$, D and $\Phi$ is a function of the number of satellites observed and the number of stations. For a single baseline, two receivers observe s satellites at epoch t, the number of independent double difference observations is (s−1). For four satellites 1, 2, 3 and 4 with satellite 1 as reference satellite, the corresponding matrices $\_\Phi$, D and $\Phi$ have the following forms Covariance matrix $\Sigma\_\Phi$ The double difference observations $\_\Phi$ are linear combinations of raw phase observations $\Phi$, therefore the correlation existing between the double difference observables of (4.4) must be taken into account. The raw phase observables $\Phi$ can be assumed to have a random behavior with a normal distribution N (0, σ2) and to be of the same accuracy. Thus the covariance matrix of the raw phase observations can be expressed as $$\Sigma_{\Phi} = \sigma^2 I \quad (4.5)$$

By applying the law of variance-covariance propagation to (4.4) and taking (4.5) into account, we obtain the covariance matrix for the double difference.

$$\Sigma_{\Delta\Phi} = \sigma^2 D D^T \quad (4.6)$$

Explicitly for four satellites $$\sum_{\Delta\Phi} = \sigma^2 \begin{bmatrix} 4 & 2 & 2 \\ 2 & 4 & 2 \\ 2 & 2 & 4 \end{bmatrix} \quad (4.7)$$

The inverse of the cofactor matrix is $$Q^{-1} = \frac{1}{2}\frac{1}{4}\begin{bmatrix} 3 & -1 & -1 \\ -1 & 3 & -1 \\ -1 & -1 & 3 \end{bmatrix} \quad (4.8)$$

If i epochs are observed for a certain period, for epochs t1, t2, t3, ti, . . . ti, the inverse of the cofactor matrix becomes a block-diagonal matrix.

$$Q^{-1} = \begin{bmatrix} Q_{t1}^{-1} & & & & \\ & Q_{t2}^{-1} & & & \\ & & Q_{t3}^{-1} & & \\ & & & \ddots & \\ & & & & Q_{ti}^{-1} \end{bmatrix} \quad (4.9)$$

The dimension of sub-matrix $Q^{-1}{}_{ti}$ is a function of the number of the satellites observed at epoch i. $Q^{-1}{}_{ti}$ can be generally expressed as $$Q_{ti}^{-1} = \frac{1}{2s}\begin{bmatrix} s-1 & -1 & \cdots & -1 \\ -1 & s-1 & \ddots & \vdots \\ \vdots & \ddots & \ddots & -1 \\ -1 & \cdots & -1 & s-1 \end{bmatrix} \quad (4.10)$$

where s is the number of satellites observed at epoch i.

Design matrix A

The design matrix A has different forms under the models 1, 2 and 3 as discussed in previous section. The number of integer ambiguity parameters is (s−1). For four satellites, the parameters carried in Model 3 can be expressed as $$X^T = [X_A \; Y_A \; Z_A \; X_B \; Y_B \; Z_B \; N_{AB}{}^{12} \; N_{AB}{}^{13} \; N_{AB}{}^{14}] \quad (4.11)$$

The corresponding design matrix at epoch t can be expressed as $$A_t = \begin{bmatrix} \frac{\partial \Delta\phi_{AB}^{12}}{\partial X_A} & \frac{\partial \Delta\phi_{AB}^{12}}{\partial Y_A} & \frac{\partial \Delta\phi_{AB}^{12}}{\partial Z_A} & \frac{\partial \Delta\phi_{AB}^{12}}{\partial X_B} & \frac{\partial \Delta\phi_{AB}^{12}}{\partial Y_B} & \frac{\partial \Delta\phi_{AB}^{12}}{\partial Z_B} & 1 & 0 & 0 \\ \frac{\partial \Delta\phi_{AB}^{13}}{\partial X_A} & \frac{\partial \Delta\phi_{AB}^{13}}{\partial Y_A} & \frac{\partial \Delta\phi_{AB}^{13}}{\partial Z_A} & \frac{\partial \Delta\phi_{AB}^{13}}{\partial X_B} & \frac{\partial \Delta\phi_{AB}^{13}}{\partial Y_B} & \frac{\partial \Delta\phi_{AB}^{13}}{\partial Z_B} & 0 & 1 & 0 \\ \frac{\partial \Delta\phi_{AB}^{14}}{\partial X_A} & \frac{\partial \Delta\phi_{AB}^{14}}{\partial Y_A} & \frac{\partial \Delta\phi_{AB}^{14}}{\partial Z_A} & \frac{\partial \Delta\phi_{AB}^{14}}{\partial X_B} & \frac{\partial \Delta\phi_{AB}^{14}}{\partial Y_B} & \frac{\partial \Delta\phi_{AB}^{14}}{\partial Z_B} & 0 & 0 & 1 \end{bmatrix} \quad (4.12)$$

The first three columns of the design matrix $A_t$, contain the partial derivatives of the three double difference observations formed from four satellites with respect to point A. The next three columns correspond to the point B. The last three columns are the partial derivatives with respect to the double difference ambiguities which have the values of either 1 or 0 since the ambiguities are constants over the observing session if no cycle slips have occurred.

Each row of the design matrix At contains the partial derivatives of a single double difference observation with respect to the unknowns relevant to that observation. Each column of the design matrix $A_t$ contains the contribution, of all observations to a single unknown to be estimated in the double difference solution. Each element, the intersection of a row and a column of $A_t$, is the partial derivative of a particular double difference observation with respect to a particular unknown, which can be expressed as $$\frac{\partial \Delta \phi_{AB}^{ij}}{\partial X_A} = -\frac{1}{\lambda}\frac{(X_A - X^i)}{\rho_A^i} + \frac{1}{\lambda}\frac{(X_A - X^j)}{\rho_A^j} \quad (4.13.1)$$

$$\frac{\partial \Delta \phi_{AB}^{ij}}{\partial Y_A} = -\frac{1}{\lambda}\frac{(Y_A - Y^i)}{\rho_A^i} + \frac{1}{\lambda}\frac{(Y_A - Y^j)}{\rho_A^j} \quad (4.13.2)$$

$$\frac{\partial \Delta \phi_{AB}^{ij}}{\partial Z_A} = \frac{1}{\lambda}\frac{(Z_A - Z^i)}{\rho_A^i} - \frac{1}{\lambda}\frac{(Z_A - Z^j)}{\rho_A^j} \quad (4.13.3)$$

$$\frac{\partial \Delta \phi_{AB}^{ij}}{\partial X_B} = -\frac{1}{\lambda}\frac{(X_B - X^i)}{\rho_B^i} + \frac{1}{\lambda}\frac{(X_B - X^j)}{\rho_B^j} \quad (4.13.4)$$

$$\frac{\partial \Delta \phi_{AB}^{ij}}{\partial Y_B} = \frac{1}{\lambda}\frac{(Y_B - Y^i)}{\rho_B^i} - \frac{1}{\lambda}\frac{(Y_B - Y^j)}{\rho_B^j} \quad (4.13.5)$$

$$\frac{\partial \Delta \phi_{AB}^{ij}}{\partial Z_B} = \frac{1}{\lambda}\frac{(Z_B - Z^i)}{\rho_B^i} - \frac{1}{\lambda}\frac{(Z_B - Z^j)}{\rho_B^j} \quad (4.13.6)$$

$$\rho_A^i = \sqrt{(X^i - X_A)^2 + (Y^i - Y_A)^2 + (Z^i - Z_A)^2} \quad (4.13.7)$$

$$\rho_B^i = \sqrt{(X^i - X_B)^2 + (Y^i - Y_B)^2 + (Z^i - Z_B)^2} \quad (4.13.8)$$

$$\rho_A^j = \sqrt{(X^j - X_A)^2 + (Y^j - Y_A)^2 + (Z^j - Z_A)^2} \quad (4.13.9)$$

$$\rho_B^j = \sqrt{(X^j - X_B)^2 + (Y^j - Y_B)^2 + (Z^j - Z_B)^2} \quad (4.13.10)$$

The partial derivative of (4.13) gives the changing rate of double difference observable with respect to the particular coordinate of a point. For example, $$\frac{\partial \Delta \phi_{AB}^{ij}}{\partial X_A}$$

is the changing rate of $\Delta \Phi_{AB}^{ij}$ with respect to the X coordinate of point A.

$$\frac{X_A - X^i}{\rho_A^i}, \frac{Y_A - Y^i}{\rho_A^i}, \frac{Z_A - Z^i}{\rho_A^i}$$

are the direction cosines of the direction from station A to the satellite i and the $$\frac{X_A - X^j}{\rho_A^j}, \frac{Y_A - Y^j}{\rho_A^j}, \frac{Z_A - Z^j}{\rho_A^j}$$

are the direction cosines of the direction from station A to the satellite j

The corresponding design matrix for model 2 is $$A_t = \begin{bmatrix} \frac{\partial \Delta \phi_{AB}^{12}}{\partial X_B} & \frac{\partial \Delta \phi_{AB}^{12}}{\partial Y_B} & \frac{\partial \Delta \phi_{AB}^{12}}{\partial Z_B} & 1 & 0 & 0 \\ \frac{\partial \Delta \phi_{AB}^{13}}{\partial X_B} & \frac{\partial \Delta \phi_{AB}^{13}}{\partial Y_B} & \frac{\partial \Delta \phi_{AB}^{13}}{\partial Z_B} & 0 & 1 & 0 \\ \frac{\partial \Delta \phi_{AB}^{14}}{\partial X_B} & \frac{\partial \Delta \phi_{AB}^{14}}{\partial Y_B} & \frac{\partial \Delta \phi_{AB}^{14}}{\partial Z_B} & 0 & 0 & 1 \end{bmatrix} \quad (4.14)$$

Similarly the design matrix $A_t$ for model 1 is $$A_t = \begin{bmatrix} \frac{\partial \Delta \phi_{AB}^{12}}{\partial X_B} & \frac{\partial \Delta \phi_{AB}^{12}}{\partial Y_B} & \frac{\partial \Delta \phi_{AB}^{12}}{\partial Z_B} \\ \frac{\partial \Delta \phi_{AB}^{13}}{\partial X_B} & \frac{\partial \Delta \phi_{AB}^{13}}{\partial Y_B} & \frac{\partial \Delta \phi_{AB}^{13}}{\partial Z_B} \\ \frac{\partial \Delta \phi_{AB}^{14}}{\partial X_B} & \frac{\partial \Delta \phi_{AB}^{14}}{\partial Y_B} & \frac{\partial \Delta \phi_{AB}^{14}}{\partial Z_B} \end{bmatrix} \quad (4.15)$$

The dimension of matrix $A_t$ is a function of the number of satellites observed at epoch t and the number of unknowns carried in the double difference solution. For the parameters carried in (4.11), At has (s−1) rows and (s+5) columns. The elements of $A_t$ change at each epoch as the result of the movements of satellites; and the number of columns of $A_t$ changes at an epoch when one or more satellites is rising or setting. If i epochs are observed for a certain observation period, the design matrix A can be arranged to have the following form.

$$A = \begin{bmatrix} A_{t1} \\ A_{t2} \\ A_{t3} \\ \vdots \\ A_{ti} \end{bmatrix} \quad (4.16)$$

The design matrix A of (4.16) contains the information of the changing satellite geometry with respect to the GPS baseline over the entire observing session. Each sub matrix Ati contains the information of the satellite geometry at a particular epoch i.

The cofactor matrix for relative positioning with double difference observations can be expressed as $$Q_{xx} = [A^T Q^{-1} A]^{-1} \quad (4.17)$$

The cofactor matrix $Q_{xx}$ contains all the information about the accuracy and correlation of the unknowns carried in the double difference solution, therefore it constitutes the basis for the accuracy analysis. For the unknowns carried in (4.11) the corresponding cofactor matrix has the following form.

$$Q_{XX} = \begin{bmatrix} q_{X_AX_A} & q_{X_AY_A} & q_{X_AZ_A} & q_{X_AX_B} & q_{X_AY_B} & q_{X_AZ_B} & q_{X_AN_{AB}^{12}} & q_{X_AN_{AB}^{13}} & q_{X_AN_{AB}^{14}} \\ & q_{Y_AY_A} & q_{Y_AZ_A} & q_{Y_AX_B} & q_{Y_AY_B} & q_{Y_AZ_B} & q_{Y_AN_{AB}^{12}} & q_{Y_AN_{AB}^{13}} & q_{Y_AN_{AB}^{14}} \\ & & q_{Z_AZ_A} & q_{Z_AX_B} & q_{Z_AY_B} & q_{Z_AZ_B} & q_{Z_AN_{AB}^{12}} & q_{Z_AN_{AB}^{13}} & q_{Z_AN_{AB}^{14}} \\ & & & q_{X_BX_B} & q_{X_BY_B} & q_{X_BZ_B} & q_{X_BN_{AB}^{12}} & q_{X_BN_{AB}^{13}} & q_{X_BN_{AB}^{14}} \\ & & & & q_{Y_BY_B} & q_{Y_BZ_B} & q_{Y_BN_{AB}^{12}} & q_{Y_BN_{AB}^{13}} & q_{Y_BN_{AB}^{14}} \\ & & & & & q_{Z_BZ_B} & q_{Z_BN_{AB}^{12}} & q_{Z_BN_{AB}^{13}} & q_{Z_BN_{AB}^{14}} \\ & & & & & & q_{N_{AB}^{12}N_{AB}^{12}} & q_{N_{AB}^{12}N_{AB}^{13}} & q_{N_{AB}^{12}N_{AB}^{14}} \\ & & & & & & & q_{N_{AB}^{13}N_{AB}^{13}} & q_{N_{AB}^{13}N_{AB}^{14}} \\ & & & & & & & & q_{N_{AB}^{14}N_{AB}^{14}} \end{bmatrix} \quad (4.18)$$

The cofactor matrix $Q_{xx}$ is symmetric. The diagonal elements of the cofactor matrix $Q_{xx}$ contain the accuracy information of the coordinates of station A and B and the estimated values of $N^{12}_{AB}$, $N^{13}_{AB}$ and $N^{14}_{AB}$. The off-diagonal elements contain information about the correlation between any two unknowns.

The RDOP, a single number accuracy indicator, is a function of the diagonal elements of the cofactor matrix of the adjusted parameters (to follow the definition of GDOP). In general, $$RDOP = \sqrt{tr[A^T Q^{-1} A]^{-1}} \quad (4.19)$$

4.2.3 Computation of RDOP

In model 3 where both station A and station B are unknown, the cofactor matrix $A^T Q^{-1} A$ is singular or close to singular. Therefore either the classical least-squares batch solution or the Kalman filtering sequential solution of (4.19) would fail. The inner constraint solution of (4.19) with the loop inverse technique which converts a singular system into a classical fullrank case will be discussed in chapter 5. A fast Array Algebra Filtering technique which has been developed in this investigation for the computation of a RDOP curve will be discussed in the chapter 6.

In model 3 the specific accuracy information about station A, station B and the ambiguities can be computed from the corresponding diagonal elements. Please note that the coordinate system used in the computation of (4.13) is geocentric. In practice the most convenient form used for the expression of position accuracy of a station is the local geodetic coordinate system. The cofactor matrix of station A in the local geodetic coordinate system (northing, easting and height) can be expressed as $$Q_A = \begin{bmatrix} \sigma_n^2 & \sigma_{ne} & \sigma_{nh} \\ \sigma_{en} & \sigma_e^2 & \sigma_{eh} \\ \sigma_{hn} & \sigma_{he} & \sigma_h^2 \end{bmatrix} \quad (4.20)$$

The equations used for the transformation from geocentric to local geodetic can be found in Leick (1990).

More information about the accuracy of the functions of estimated parameters can also be derived from $Q_{xx}$. For example the accuracy of the GPS vector, $\Delta X$, $\Delta Y$ and $\Delta Z$, which is also a very useful accuracy indicator for relative positioning, can be derived by applying the law of cofactor propagation to the corresponding elements of $Q_{xx}$.

$$\begin{bmatrix} q_{\Delta X} \\ q_{\Delta Y} \\ q_{\Delta Z} \end{bmatrix} = \begin{bmatrix} q_{X_AX_A} & q_{X_AX_B} & q_{X_BX_B} \\ q_{Y_AY_A} & q_{Y_AY_B} & q_{Y_BY_B} \\ q_{Z_AZ_A} & q_{Z_AZ_B} & q_{Z_BZ_B} \end{bmatrix} \begin{bmatrix} 1 \\ -2 \\ 1 \end{bmatrix} \quad (4.21)$$

4.3 Data Example

The computation of RDOP requires the satellite orbit information and the approximate position of ground stations. The coordinates of satellites can be computed based on the almanac file collected with GPS receiver. A numerical example of GPS satellite orbit prediction was given in chapter 3. The following is an example of the computation of design matrix A. The data computed in this example will be used for the computation of RDOP curve in chapter 6.

Example 4.1 Compute the design matrix A for the observation period 12:42–13:57 eastern standard time on Oct. 24, 1993. The observing satellites are 3, 16, 17, 23 and 26. The geocentric coordinates of these five satellites were computed in the example 3.1. The GPS baseline to be observed is Thornden - 1, Syracuse. The approximate geocentric coordinates of these two stations are shown in Table 4.1

TABLE 4.1

| unit: meter Station | Geocentric X | Coordinates Y | Z |
|---|---|---|---|
| Thornden | 1119714.090 | −4532752.464 | 4330912.686 |
| 1 | 1168157.554 | −4520546.395 | 4330945.409 |

5.0 MATHEMATICAL APPROACHES FOR THE SOLUTION OF RDOP

A least-squares adjustment with an inner or minimal constraint solution provides different approaches for the solution of RDOP. The mathematical model and theoretical analysis of the two solutions will be given in this chapter based on the theory discussed by Pope (1971) and Leick (1990). The inner constraint solution with loop inverse estimation is presented with an example of a GPS network adjustment. The statistical properties and practical explanation of these two methods will be discussed following the mathematical derivation.

5.1 Minimal Constraint Solution

The stochastic model used in geodetic network adjustments is:

$$E(L_a) = A \overline{X}_a \quad (5.1a)$$

$$D(L_a) = \sigma_0^2 Q_{LL} = \sigma_0^2 p^{-1} \quad (5.1b)$$

Model (5.1) is the well-known Gauss-Markov model, in which La is the (m×1) vector of observations; A is the (m×n) design matrix of coefficients; $X_a$ is the (n×1) vector of unknown parameters; $\sigma_0$ is the standard deviation of unit weight; $Q_{LL}$ is the cofactor matrix of the observations; and P is the weight matrix. E ($L_a$) is the mathematical expected value; and D (La) is the variance. The assumption of (5. 1) is E (D)=0. This means that observations do not contain any systematic errors.

The linearized least-squares mathematical model which corresponds to model (5. 1) can be written as $$V=AX-L \qquad (5.2)$$

in which V=a vector of residuals. Let $X_0$ denote a vector of known approximate values of parameters; then $X=X_a-X_0$ a vector of corrections to initial approximations $X_0$. $L=F(X_0)-L_a$=the function evaluated at the initial approximations of the parameters $X_0$ minus the observations $L_a$. The normal equations are $$(A^TPA)X-A^TPL=0 \qquad (5.3)$$

The least-squares solution is $$X=(A^TPA)^{-1}A^TPL \qquad (5.4)$$

The covariance matrix of the adjusted parameters is $$\Sigma_X=\sigma_0^2(A^TPA)^{-1} \qquad (5.5)$$

The solution (5.4) requires that the coefficient matrix A has full column rank, e.g. R(A)=n, n is the number of unknown parameters. Full column rank means that the n columns of A are linearly independent. The least-square adjustment based on (5.1) (5.2) (5.3) is called the full rank adjustment problem.

The pure geometry of a GPS network (the three dimensional relative positions of GPS stations) is invariant with respect to translation and rotation. In the adjustment, if all stations were treated as unknowns to maintain the true geometry of the network, it would cause the coefficient matrix A a rank deficiency of three. In order to maintain a full rank for matrix A, a minimal constraint of fixing three parameters, usually the XY and Z coordinates of a station, is imposed in Eq. (5.2). This approach is called minimal constraint solution.

In the minimal constraint solution, the coordinates of one station are absolutely fixed. Therefore the accuracy of the adjusted parameters computed from Eq. (5.5) and their corresponding error ellipses are relative to the fixed point. The farther a point is in the network from the fixed point, the lower its accuracy. On the other hand, holding a different point as the fixed point would yield a different set of error ellipses. Understanding these important properties of minimal constraint solutions is important for GPS relative positioning and GPS network analysis.

5.2 Inner Constraint Solution

In GPS network analysis sometimes one is concerned about the accuracy of the adjusted parameters relative to the, internal geometry of the network, which is related to the satellite constellation, rather than the accuracy relative to a particular station. In this situation, one prefers not to fix any particular point in the adjustment. This causes the coefficient matrix A rank deficiency. In this case, the stochastic model is $$E(L_a)=A\bar{X}_a \qquad (5.6a)$$

$$D(L_a)=\sigma_0^2 Q_{LL}=\sigma_0^2 P^{-1} \qquad (5.6b)$$

in which R(A)=r<n; rank deficiency d=n-r; P is a nonsingular symmetric matrix of order n. This model is called the Gauss-Markov model with rank deficiency. The corresponding mathematical model is $$V=AX-L \qquad (5.7)$$

According to the least-squares principle $$V^T P V=\min \qquad (5.8)$$

the normal equations are $$NX-A^TPL=0 \qquad (5.9)$$

in which $R(N)=R(A^T P A)=r$ with r<min(m,n), N is singular therefore its Caley-inverse does not exist. Thus Eq. (5.7) does not have an unique solution. However Eq. (5.7) has a general solution which can be written as $$X=N^-A^TP L+(I-N^-N)M \qquad (5.10)$$

in which $N^-$ is the generalized inverse and M is an arbitrary vector; $N^- N \neq I$. Therefore Eq. (5.9) has an infinite set of solutions satisfying condition (5.8). The inner constraint solution is a particular solution of (5.1 0) which satisfies an additional condition $$X^TX=\min \qquad (5.11)$$

The inner constraint solution satisfying both (5.8) and (5.11) simultaneously can be written as $$X=N_m^- A^TPL \qquad (5.12)$$

in which $N^-_m$ is the minimum norm inverse; $N^{-hd\ m}=N(N N)^-$. In the inner constraint solution, the optimum relative positions of all the stations within a network are determined by the least-squares principle (5.8) and the absolute position of the network is determined by condition (5.11).

Compared with the minimal constraint solution, the adjusted parameters solved for by the inner constraint solution have a minimum norm. The covariance matrix and error ellipses computed from the inner constraint solution are related to the inner geometry of the network, and they are not relative to any particular station in the network.

5.3 Inner Constraint Solution by Loop Inverse

The loop inverse technique developed by Rauhala (1974, 1975, 1981, 1982) provides a more general approach to the solution of a singular system. A singular system of linear equations $$AX=L \qquad (5.13)$$

can be converted into a dassical fill-rank case by replacing the parameters X with an estimable set of equations $$A_0X=L_0 \qquad (5.14)$$

with the condition $$R(A_0)=R(A) \quad (5.15)$$

Practically $A_0$ can be chosen as a part of A satisfying condition (5.15). For the typical application in surveying $A_0$ can be readily identified by inspecting the design matrix A. The loop inverse estimation $$X=A^{lm}A^T L \quad (5.16)$$

$$A^{lm}=A_0^T(A_0 A^T A A_0^T)^{-1}A$$

yields a least-square minimum normal solution of (5.13) satisfying both conditions of $V^T P V$=min and $X^T X$=min. $A^{lm}$ inverse is a special case of loop inverse. For a detailed derivation of (5.16) refer to Rauhala(1974).

5.4 An Example

An example will be given in this section for the demonstration of the two approaches, minimal constraint solution and inner constraint solution which were discussed in the previous sections. The statistical properties and practical explanation of these two approaches are discussed following the numerical example.

Example 5.1 GPS network adjustment

For the ease of data management, a small GPS network near the SUNY ESF campus is used as an example for GPS network adjustment and analysis. The GPS network shown in FIG. 4 was established in September, 1990 as a part of an educational project. Two Trimble 4000ST receivers were used for the collection of GPS data. The GPS observations, GPS vectors and GPS coordinates in the WGS84 geocentric coordinate system, are shown in Table 5.1 and Table 5.2.

TABLE 5.1

| unit: m | | GPS Vector Observations | | |
|---|---|---|---|---|
| Station I | Station II | ΔX | ΔY | ΔZ |
| 2 | Thornden | −773.907 | 2059.288 | 2270.479 |
| 2 | 22 | 1643.309 | −873.983 | −1191.272 |
| 4 | 22 | 369.762 | 500.917 | 465.779 |
| 4 | 12 | 198.223 | −27.443 | −70.545 |
| 11 | 12 | −114.620 | 30.161 | 47.384 |
| Thornden | 11 | 812.486 | 626.768 | 495.520 |
| Thornden | 12 | 697.868 | 656.933 | 542.897 |
| Thornden | 4 | 499.645 | 684.397 | 613.456 |

TABLE 5.2

| unit: m | GPS Position Observations | | |
|---|---|---|---|
| Station | X | Y | Z |
| Thornden | 1119712.274 | −4532754.678 | 4330905.185 |
| 2 | 1120486.410 | −4534813.954 | 4328634.027 |
| 22 | 1118852.761 | −4533931.935 | 4329809.102 |
| 4 | 1119209.818 | −45333440.853 | 4330297.196 |
| 12 | 1119016.014 | −4533417.882 | 4330368.496 |
| 11 | 1118905.651 | −4533387.113 | 4330423.041 |

Two different approaches, the minimal constraint solution and the inner constraint solution, are used for the adjustment of the GPS data. In the minimal constraint solution station Thornden, a first order geodetic surveying point, is fixed in the adjustment. In the inner constraint solution, all stations in the network are treated as unknowns and the GPS coordinates shown in Table 5.2, the primary results of carrier phase processing, are used as initial approximations for the unknowns. The adjusted results are shown in Table 5.3 and Table 5.4.

TABLE 5.3

| | Minimal Constraint Solution | | | | | |
|---|---|---|---|---|---|---|
| Station | X (m) | $\sigma_X$ (mm) | Y (m) | $\sigma_Y$ (mm) | Z (m) | $\sigma_Z$ (mm) |
| Thornden | 1119712.274 | | −4532754.678 | | 4330905.185 | |
| 2 | 1120486.180 | 6 | −4534813.966 | 6 | 4328634.700 | 6 |
| 22 | 1118842.869 | 6 | −4533939.983 | 6 | 4329825.966 | 6 |
| 4 | 1119212.630 | 5 | −4533439.067 | 5 | 4330291.738 | 5 |
| 12 | 1119014.407 | 5 | −4533411.615 | 5 | 4330362.285 | 5 |
| 11 | 1118899.787 | 5 | −4533381.450 | 5 | 4330409.667 | 5 |

| Station I | Station II | $\Delta_X$ | $\Delta_Y$ | $\Delta_Z$ |
|---|---|---|---|---|
| 2 | Thornden | −773.906 | 2059.288 | 2270.486 |
| 2 | 22 | 1643.310 | −873.983 | −1191.265 |
| 4 | 22 | 369.761 | 500.917 | 465.772 |
| 4 | 12 | 198.223 | −27.451 | −70.547 |
| 11 | 12 | −114.619 | 30.165 | 47.382 |
| Thornden | 11 | 812.487 | 626.772 | 495.518 |
| Thornden | 12 | 697.867 | 656.937 | 542.901 |
| Thornden | 4 | 499.644 | 684.389 | 613.448 |

MSD = 6 mm
$V^T V$ = 0.442 mm

TABLE 5.4

| | Inner Constraint Solution | | | | | |
|---|---|---|---|---|---|---|
| Station | X (m) | $\sigma_X$ (mm) | Y (m) | $\sigma_Y$ (mm) | Z (m) | $\sigma_Z$ (mm) |
| Thronden | 1119714.737 | 3 | −4532755.621 | 3 | 4330906.437 | 3 |
| 2 | 1120488.643 | 5 | −4534814.909 | 5 | 4328635.951 | 5 |
| 22 | 1118845.333 | 5 | −4533940.926 | 5 | 4329827.216 | 5 |
| 4 | 1119215.094 | 3 | −4533440.009 | 3 | 4330292.989 | 3 |
| 12 | 1119016.870 | 4 | −4533412.558 | 4 | 4330363.536 | 4 |
| 11 | 1118902.251 | 5 | −4533382.393 | 5 | 4330410.918 | 5 |

| Station I | Station II | ΔX | ΔY | ΔZ |
|---|---|---|---|---|
| 2 | Thornden | −773.906 | 2059.288 | 2270.486 |
| 2 | 22 | 1643.310 | −873.983 | −1191.265 |
| 4 | 22 | 369.761 | 500.917 | 465.772 |
| 4 | 12 | 198.223 | −27.451 | −70.547 |
| 11 | 12 | −114.619 | 30.165 | 47.382 |
| Thornden | 11 | 812.487 | 626.772 | 495.518 |
| Thornden | 12 | 697.867 | 656.937 | 542.901 |
| Thornden | 4 | 499.644 | 684.389 | 613.448 |

MSD = 4 mm
V'V = 0.442 mm

In Table 5.3 and Table 5.4, MSD is a mean accuracy index which is defined as $$MSD = \sigma_0 \sqrt{\frac{tr(Q_{XX})}{n}} \quad (5.17)$$

where $\sigma_0$ is the standard deviation of unit weight; $Q_{xx}$ is the cofactor matrix of the adjusted parameters X; n is the number of parameters carried in the solution. MSD can be used to describe the, total accuracy of the adjusted parameters.

Analyzing Table 5.3 and Table 5.4 it can be seen
1. Although the adjusted coordinates of minimal constraint solution are different then that of inner constraint solution, the adjusted GPS vectors are exactly same by the two different approaches.
2. The values of the residual VrV computed by the two different approaches are same.
3. The mean accuracy index of the minimal constraint solution is larger than that of inner constraint solution.

For further discussion about the above results please see the next section.

Figure 5:
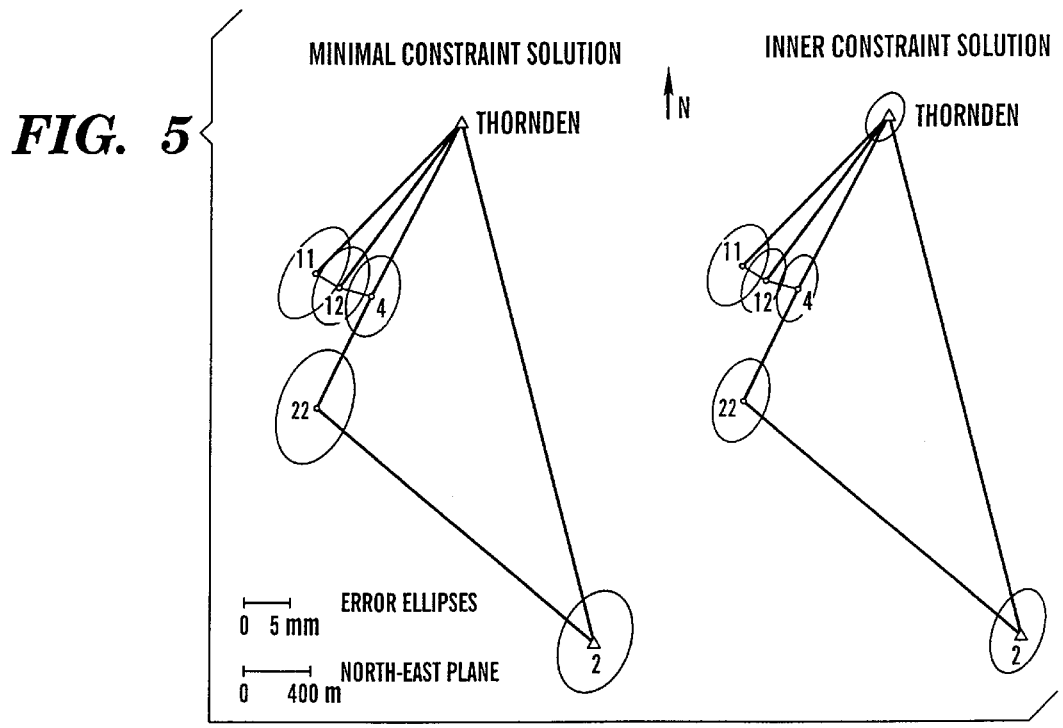
FIG. 5 GPS network with error ellipses.

The standard deviations shown in Table 5.3 and Table 5.4 are derived in the geocentric coordinate system. For the ease of interpretation, the respective covariance components of the adjusted parameters are transformed to the local geodetic coordinate system. The corresponding ellipses of the adjusted parameters are shown in FIG. 5.

5.5 Statistical Properties of the Inner Constraint Solution

Some theory and discussion of the inner constraint solutions can be found in Mittermayer(1971), Pope(1971), Perelmuter(1979), and Leick(1980, 1990). Here the focus is on the practical aspects and the interpretation of the properties of the inner constraint solution applied to, the GPS relative positioning.

Optimum Biased Estimates of X

Taking the expectation of both sides of (5.12), we get $$E(X) = N_m^- A^T PE(L) = N_m^- NX$$

in which $N = A^T P A$ is singular, $N_m^- N \neq I$, therefore $$E(X) \neq X \quad (5.18)$$

From (5.18) it can be seen that the inner constraint solution X is a biased estimate. The estimate is biased because in the inner constraint solution the reference coordinate system is not exactly defined to a particular station. The initial approximations of the coordinates of each station required in the inner constraint solution can be chosen arbitrarily by the user. Therefore it is impossible to find the unbiased estimates of X. However, on the other hand, this is an advantage that can be used in a GPS network adjustment. Recall that the absolute position of a GPS location is only at the 5 meter level while the relative position can be accurately determined to the centimeter or even millimeter level. The preference is to use the accurately observed GPS vectors as constraints to estimate the absolute position of each station through the use of the low accuracy GPS coordinate observations as initial approximations for the adjustment. In the inner constraint solution, the initial approximations of the unknowns actually define a reference coordinate system. This reference system can be improved by the inner constraint solution if the initial approidmations have a sound physical background. This is the physical meaning of optimum biased estimates by the inner constraint solution.

Unbiased Estimates of GPS vectors

In the inner constraint adjustment, the solutions for X determined in (5.12) are not unbiased estimates. This does not necessarily mean that there are no unbiased estimates in the network solution. In Example 5.1 it can be seen that the linear function of the adjusted parameters X, e.g., the adjusted GPS vectors are unbiased estimates in the inner constraint solution. This is an important property of the inner constraint solution. As far as the estimation of GPS vectors is concerned, there is no contradiction between the minimal constraint solution and the inner constraint solution. The adjusted GPS vectors computed from both approaches are exactly same. The only difference is the derived covariance matrix of the adjusted parameters X. This is the beauty of the inner constraint solution which gives a different view for the GPS data analysis.

The Variance of the Estimates of X is Minimum

Compared with the minimal constraint solution, the variance of the adjusted X by the inner constraint solution is minimum.

$$D(X_i)=\sigma_0^2(Q x_i x_i)=\min \qquad (5.19)$$

The theoretical proof of (5.19) can be found in Mattermayer(1972). The value of D (X) derived from the inner constraint solution is minimum because it is only affected by the errors contained in GPS vectors. In the minimal constraint solution, one station is held fixed, therefore the computed value of D (X) is influenced by the combination of the errors of the fixed station and the errors of the GPS observations.

6.0 ARRAY ALGEBRA FILTERING

6.1 Introduction

The GPS satellite signals collected with receivers are sequential in nature. The classical least-squares methods, which are currently implemented in most of the post-processing software for GPS relative positioning, simultaneously process batches of phase observations collected over a certain observation period. The final results, the optimum estimates and their accuracy and reliability, can not be evaluated until all the observations have been collected. The filtering methods process the data in an "on line" mode. The initial estimates can be computed as soon as the minimum number of observations required for a unique solution are available and the errors contained in the initial estimates are "filtered" with the new observations. In the sequential processing the previous estimates are updated based on the new observations. Therefore in each step only the inversion of a smaller matrix related to the new observations is needed and the previous observations are not required to be stored in the memory. Consequently less storage is required and a fast processing speed can be achieved. The filtering technique provides a real-time or near real-time computational capability. It gives the current estimates and their accuracy which are based on all the observations that have been collected so far and thus it is particularly suitable for real-time GPS data processing.

The theory of filtering and smoothing was first proposed by Kalman in the early 1960's (Kalman 1960; Kalman and Bucy 1961). The early application of Kalman filtering in a least-squares sequential adjustment in the non-singular case can be found in Rao and Mitra (1971), Williams (1972) and Mikhail and Helmering (1973). The application of filtering techniques used for GPS signal processing was discussed by Milliken and Zoller (1978) and Copps et al (1980). A recent investigation on filtering methods used for improving GPS orbits was reported by Goad and Chadwell (1993).

Array algebra is a generalized estimation theory and fast transformation technique that has been developed by Rauhala since the early 1970's (Rauhala, 1974, 1975, 1976, 1977, 1980, 1981, 1982, 1984, 1986, 1987, 1989). The early applications of array algebra to finite element filtering and data compaction were reported by Rauhala (1979, 1980b). The filtering concept of multidimensional digital signal processing interpreted by array algebra estimation was presented by Rauhala (1982). In this research the array algebra loop inverse technique which was developed by Rauhala (1974, 1975, 1981, 1982) has been investigated for the filtering solution of GPS data in the singular case. An algorithm has been implemented for the fast generation of the RDOP surface based on this method. The array algebra filtering approach provides a generalized mathematical model for the study of RDOP. The mathematical principle of array algebra filtering will be presented in this chapter, Following the mathematical derivation two examples of the filtering solution for the computation of RDOP curves, one with a fixed number of parameters and the other with a variable number of parameters, will be given.

6.2 Dynamic System Model

In a dynamic system a sequence of sets of observation equations at the time $t_i$ can be expressed as $$A_i X_i = L_i - \epsilon_i \ (i=1,2 \ldots ) \qquad (6.1)$$

where $A_i$ is the partial design matrix at the time $t_i$.

$X_i$ is a time dependent state vector which contains the unknown parameters of the dynamic system at the time $t_i$.

$L_i$ is the vector of observation at the time $t_i$.

$\epsilon_i$ is the observation noise at the time $t_i$.

The state vector $X_{i+1}$ at time $t_{i+1}$ can be determined based on $X_i$ and observation $L_{i+1}$ with the following stochastic equation $$X_{i+1} = T_{i+1,i} X_i + G \omega_i \qquad (6.2)$$

Where $T_{i+1}$ is the state transition matrix relating the state vector of $X_i$ at $t_i$ to the state vector of $X_{i+1}$ at $t_{i+1}$.

$\omega_i$ is the system noise at $t_i$.

G is the mapping matrix relating the system noise $\omega_i$ to the state vector of $X_{i+1}$.

The model described with equations of (6.1) and (6.2) is called a dynamic system model which has the following stochastic properties $$E\{\omega_i\} = 0, \quad E\{\omega_i \omega_j^T\} = \Omega_i \delta_{ij} \ (\Omega_i > 0) \qquad (6.3)$$

$$E\{\varepsilon_i\} = 0, \quad E\{\varepsilon_i \varepsilon_j^T\} = R_i \delta_{ij} \ (R_i > 0)$$

$$\delta_{ij} = 0 \text{ for } i \neq j; \quad \delta_{ij} = 1 \text{ for } i = j$$

The stochastic model of (6.3) implies that (1) Both $\epsilon$ and $\omega$ are normally distributed and uncorrelated; (2) The noises of $\epsilon$ and $\omega$ at any time t is independent of the noises at the time t+τ for τ≠0.

6.3 Filtering with Fixed Number of Parameters

A sequence of sets of observation equations with a fixed number of parameters can be expressed as $$\underset{m,n}{A} \underset{n,1}{X} = \underset{m,1}{L} - \underset{m,1}{\varepsilon} \qquad (6.4)$$

Where $$A = \begin{bmatrix} a_{11} & a_{12} & \cdots & a_{1n} \\ a_{21} & a_{22} & \cdots & a_{2n} \\ \vdots & \vdots & \cdots & \vdots \\ a_{ml} & a_{m2} & \cdots & a_{mn} \end{bmatrix}$$

$$X = \begin{bmatrix} x_1 \\ x_2 \\ \vdots \\ x_n \end{bmatrix} \quad L = \begin{bmatrix} l_1 \\ l_2 \\ \vdots \\ l_m \end{bmatrix} \quad \varepsilon = \begin{bmatrix} \varepsilon_1 \\ \varepsilon_2 \\ \vdots \\ \varepsilon_n \end{bmatrix}$$

For a discrete time series $t_1, t_2, \ldots t_i, t_{i+1} \ldots$, the minimum variance of the state vector $X_{i+1}$ in (6.2) can be predicted based on the state vector Xi and all the observations available at $t_i$.

The "˜" symbol refers to the predicted estimate of the state vector at $t_i$ and the "ˆ" symbol refers to the estimate of the state vector after incorporating the measurement at $t_i$.

The corresponding cofactor matrix can be expressed as $$\tilde{Q}_{i+1,i} = E\{(X_{i+1} - \tilde{X}_{i+1,i})(X_{i+1} - \tilde{X}_{i+1,i})^T | L\} \quad (6.6)$$

In the dynamic system model both the predicted state vector$_{i+1,i}$ and the observations $L_{i+1}$ are considered as stochastic quantities. The estimate of the minimum variance of the state vector at the time $t_{i+1}$ based on all the observations including $L_{i+1}$ is denoted as$_{i+1}$, which can be expressed as $$\hat{X}_{i+1} = \tilde{X}_{i+1,i} + K(L_{i+1} - A_{i+1}\tilde{X}_{i+1,i})^{-1} \quad (6.7)$$

The term $A_{i+1i+1,i}$ in (6.7) is the prediction of $L_{i+1}$. The K is Kalman gain which can be expressed as $$K = \tilde{Q}_{i+1,i} A_{i+1}^T (R_{i+1} + A_{i+1} \tilde{Q}_{i+1,i} A_{i+1}^T)^{-1} \quad (6.8)$$

The estimation of the cofactor matrix of Xi+1 can be expressed as $$\hat{Q}_{i+1} = \tilde{Q}_{i+1,i} - K A_{i+1} \tilde{Q}_{i+1,i} \quad (6.9)$$

The derivation of (6.7), (6.8) and (6.9) can be found in Bjerhammar (1973) Equations of (6.7), (6.8) an d (6.9) are simplified forms which are slightly modified to match the symbols used in the chapter 4.

The derivation of (6.7), (6.8) and (6.9) can be found in Bjerhammar (1973). Equations of (6.7), (6.8) and (6.9) are simplified forms which are slightly modified to match the symbols used in the chapter 4.

Array Algebra Filtering is a generalization of (6.7), (6.8) and (6.9) in which the solutions of $\tilde{Q}_{i+1,i}$ and $\tilde{X}_{i+1,i}$ have been expanded to the singular case by loop inverse estimation (Rauhala, 1974, 1975, 1981, 1982). In general for a linear system of (6.4), if A is singular or close to singular, neither $(A^TA)^{-1}$ nor $(AA^T)^{-1}$ exist. This singular filtering problem can solved by choosing a matrix $A_0$ from the row space of A with the condition of $R(A_0) = R(A)$. Any choice of $r \equiv R(A)$ independent $A_0X$ among $AX$ spans an unbiasedly estimable space. Thus the inversion of a singular matrix A can be solved by conventional inversion rules of a non-singular case. The initial values of can be expressed as $$\tilde{Q}_{i+1,i} = A_0^T(A_0 A^T A A_0^T)^{-1} A_0 \quad (6.10)$$

The right side of (6.10), $A_0^T(A_0 A^T A A_0^T) A_0$, is called $A^{lm}$ inverse, which is a special case of loop inverse. For the derivation of loop inverse refer to Rauhala (1974, 1975, 1979).

The initial values of $\tilde{Q}_{i+1,i}$ can be expressed as $$\tilde{X}_{i+1,i} = \tilde{Q}_{i+1,i} A^T L \quad (6.11)$$

Example 6.1 Compute a RDOP curve for the observation period 12:24 13:57 on Oct. 24, 1993 with a filtering solution. The GPS baseline to be observed is Thomden - I at Syracuse, N.Y. The satellite combination is 3, 16, 17, 23, 26.- The partial design matrix was computed in the example 4.1.

6.4 Filtering with Variable Number of Parameters

For a discrete time series $t_1, t_2, \ldots t_i, t_{i+1} \ldots$, the number of unknowns carried in the state vector $X_{i+1}$ of the dynamic system of (6.2) may change at the time $t_{i+1}$. A typical example in GPS data processing is the rising and setting of satellites, which would change the number of parameters carried in the filtering process. This situation can be described with two sets of observation equations obtained at the time $t_i$ and $t_{i+1}$.

$$A_i X_i = L_i + \varepsilon_i \quad (6.12a)$$

$$A_{i+1} X_i + a_{i+1} \Delta X_{i+1} = L_{i+1} + \varepsilon_{i+1} \quad (6.12b)$$

where $\Delta X_{i+1}$ is a subvector of the state vector $X_{i+1}$ at the time $t_{i+1}$ and $a_{i+1}$ is the additional submatrix of the design matrix $A_{i+1}$. Equations of (6.12a) and (6.12b) can be expressed as $$\begin{bmatrix} A_i & 0 \\ A_{i+1} & a_{i+1} \end{bmatrix} \begin{bmatrix} X_i \\ \Delta X_{i+1} \end{bmatrix} = \begin{bmatrix} L_i \\ L_{i+1} \end{bmatrix} + \begin{bmatrix} \varepsilon_i \\ \varepsilon_{i+1} \end{bmatrix} \quad (6.13)$$

The coefficient matrix of the normal equation of (6.13)

$$N_{i+1} = \begin{bmatrix} A_i & 0 \\ A_{i+1} & a_{i+1} \end{bmatrix}^T \begin{bmatrix} Q_i^{-1} & 0 \\ 0 & Q_{i+1}^{-1} \end{bmatrix} \begin{bmatrix} A_i & 0 \\ A_{i+1} & a_{i+1} \end{bmatrix} \quad (6.14)$$

can be partitioned as $$N_{i+1} = \begin{bmatrix} n_{11} & n_{12} \\ n_{21} & n_{22} \end{bmatrix}$$

where $$n_{11} = (A^T Q^{-1} A)_i + (A^T Q^{-1} A)_{i+1} \quad (6.15a)$$

$$n_{12} = (A^T Q^{-1} a)_{i+1} \quad (6.15b)$$

$$n_{21} = (A^T Q^{-1} a)_{i+1} \quad (6.15c)$$

$$n_{22} = (a^T Q^{-1} a)_{i+1} \quad (6.15d)$$

If the inverse of $N_{i+1}$ exists, the partitioned form of $N^{-1}_{i+1}$ is denoted by $$N_{i+1}^{-1} = B = \begin{bmatrix} b_{11} & b_{12} \\ b_{21} & b_{22} \end{bmatrix}$$

According to the basic definition of an inverse $$\begin{bmatrix} n_{11} & n_{12} \\ n_{21} & n_{22} \end{bmatrix} \begin{bmatrix} b_{11} & b_{12} \\ b_{21} & b_{22} \end{bmatrix} = \begin{bmatrix} I_i & 0 \\ 0 & I_{i+1} \end{bmatrix}$$

which leads to the following four equations:

$$n_{11}b_{11}+n_{12}b_{21}=I_i$$

$$n_{11}b_{12}+n_{12}b_{22}=0$$

$$n_{21}b_{11}+n_{22}b_{21}=0$$

$$n_{21}b_{12}+n_{22}b_{22}=I_{i+1}$$

Based on the above relations the following four equations can be derived.

$$b_{11}=(n_{11}-n_{12}n_{22}^{-1}n_{21})^{-1} \quad (6.16a)$$

$$b_{12}=-b_{11}n_{12}n_{22}^{-1} \quad (6.16b)$$

$$b_{21}=-n_{22}^{-1}n_{21}b_{11} \quad (6.16c)$$

$$b_{22}=n_{22}^{-1}-n_{22}^{-1}n_{21}b_{12} \quad (6.16d)$$

Equations (6.16a), (6.16b), (6.16c) and (6.16d) are the basic formulas for the inverse by partitioning. If $N_{i+1}$ is symmetric, then $n_{21}=n^T{}_{12}$, and consequently $b_{21}=b^T{}_{12}$. The key to the inverse by partitioning is the solution of the upper-left submatrix $b_{11}$ in B. After the solution of $b_{11}$, the other submatrices can be solved in sequence in which only the inverse of $n_{22}$ is involved. In fact, if the parameters carried in the state vector is only increased by 1, which is the case when only one satelhte is rising, then $n_{22}$ in (6.15d) is a scalar, so $n^{-1}{}_{22}$ is simply the reciprocal of a scalar.

By applying the following matrix lemma $$(Y-UZV)^{-1}=Y^{-1}+Y^{-1}U\,(Z^{-1}-V\,Y^{-1}U)^{-1}\,V\,Y^{-1}$$

to (6.16a), $b_{11}$ can be expressed as $$b_{11}=n_{11}^{-1}+b_{11}^{-1}n_{12}\,(n_{22}-n_{21}\,n_{11}^{-1}\,n_{12})^{-1}\,n_{21}\,n_{11}^{-1} \quad (6.17)$$

From equation of (6.15a) we can see that $n^{-1}{}_{11}$ in (6.17) can be computed in the filtering scenario with (6.7). After the solution of $b_{11}$ with (6.17), the other submatrices of $N^{-1}{}_{i+1}$ can be computed according to (6.16b), (6.16c) and (6.16d). Finally the cofactor matrix and state vector at the time $t_{i+1}$ expressed as $$\hat{Q}_{i+1}=N_{i+1}^{-1} \quad (6.18)$$

$$\hat{X}_{i+1}=N_{i+1}^{-1}\,[A_{i+1}\;a_{i+1}]^T\,L_{i+1} \quad (6.19)$$

Example 6.2 Compute a RDOP curve for the observation period 13:32–15:02 on Oct. 24, 1993 with the filtering solution. The GPS baseline to be observed is Thomden - 1 at Syracuse N.Y. The all-in-view satellites for the observation period is shown in table 6.1. The partial design matrices A1, A2, A3, A4, A5, A6 are shown in Appendix B.

TABLE 6.1

| All-In-View Satellites | | | |
| --- | --- | --- | --- |
| Satellite Constellation | Time Rise | Time Set | dt |
| 3 16 17 23 26 | 12:42 | 13:57 | 1:15 |
| 3 17 23 26 | 13:57 | 14:07 | 0:10 |
| 3 17 21 23 26 | 14:07 | 14:17 | 0:10 |

TABLE 6.1-continued

| All-In-View Satellites | | | |
| --- | --- | --- | --- |
| Satellite Constellation | Time Rise | Time Set | dt |
| 3 17 21 23 26 28 | 14:17 | 14:27 | 0:10 |
| 3 12 17 21 23 26 28 | 14:27 | 14:57 | 0:30 |
| 12 17 21 23 26 28 | 14:57 | 15:02 | 0:05 |

Date: Oct 24, 1993
Latitude: 43° 02' 26" N
time: 12:42–15:02
Longitude: 76° 07' 27" W
GPS baseline:
Thornden - 1, Syracuse, New York.

7.0 RDOP SURFACE

The RDOP surface is a 3-D graphical presentation of the RDOP as a function of session starting time and session length. The RDOP surface is generated based on modeling the effect of changing satellite geometry on the achievable accuracy of GPS relative positioning discussed in chapter 4. The array algebra filtering technique developed in this investigation is used for the fast generation of the RDOP surface. The process used for the generation of the RDOP surface is presented in this chapter. The geometric meaning of the RDOP surface and the implication of RDOP curves extracted from the RDOP surface in both the x and y direction will be analyzed and interpreted for application purposes.

7.1 Generation of RDOP Surface

The variability of the RDOP surface is a function of the changing satellite geometry, the location of the GPS baseline to be observed and the observation date/time. The RDOP surface varies with different locations on the earth. The changing satellite geometry with respect to the same location on the earth repeats for every 11 hours and 58 minutes and at a time which is four minutes earlier each day. Therefore the RDOP surface generated for a 12 hour period fully describes the effect of the relative movement of GPS satellites on the achievable accuracy for relative positioning.

The input data required for the generation of a RDOP surface are:

The almanac file which contains the GPS satellite orbit information;

An approximate location of the GPS baseline to be located;

The date and time for relative positioning.

The computation for the generation of the RDOP surface includes:

(1) The GPS satellite orbit prediction based on the almanac file;

(2) The design matrix A for the double difference carrier phase adjustment;

(3) The inverse of the cofactor matrix $Q^{-1}$ for the double difference observation;

(4) The cofactor matrix $Q_{xx}$ for the adjusted parameters.

The computation of (1) was described in chapter 3. The computation of (2) and (3) were given in chapter 4. The computation of (4) was discussed in chapter 5. The array algebra filtering technique developed in this investigation processes the GPS data epoch by epoch sequentially. This allows the user to chose a time interval to continuously compute all of the RDOP curves for a certain session length with different session starting times. All of the RDOP values are computed in a unified time series. This technique has proved to be particularly suitable for the fast generation of the RDOP surface.

Figure 8:
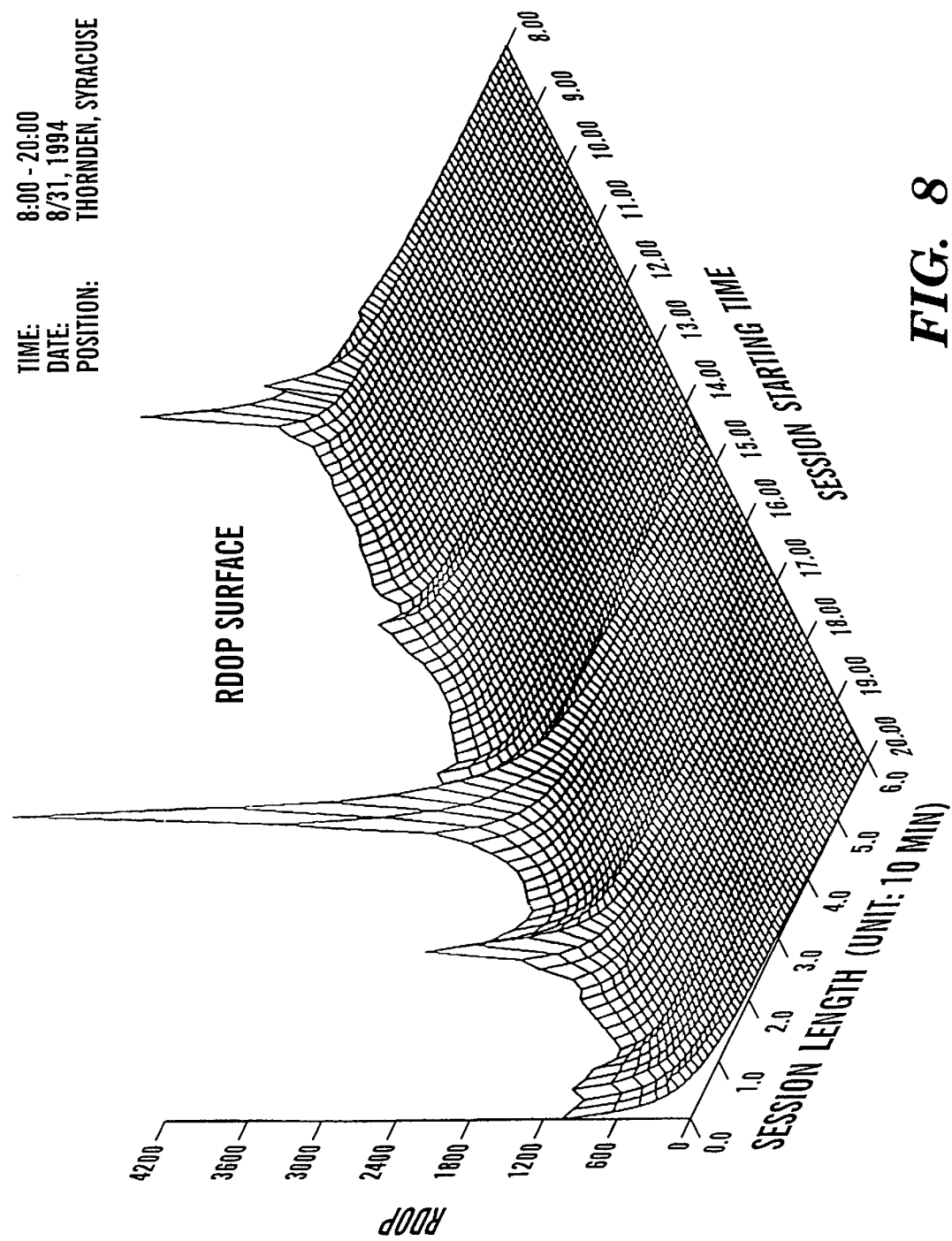
FIG. 8 A grid perspective view of the RDOP surface.
Figure 9:
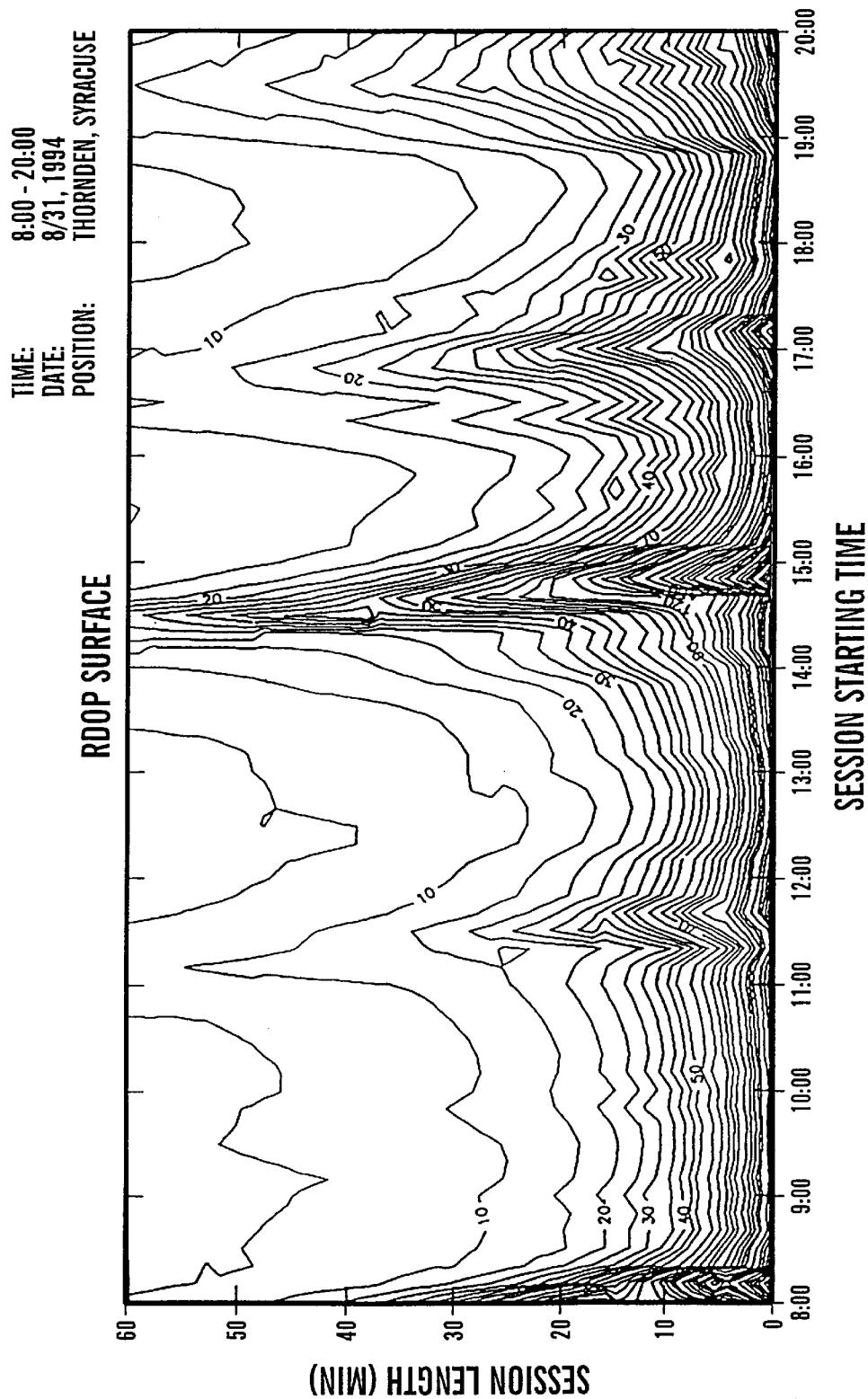
FIG. 9 The RDOP contour map.

A software package "GPSBIRD" written in C++ has been developed in this investigation for the computation of the RDOP surface. A RDOP surface for a 60 minute session length was generated for Thornden, Syracuse for a twelve hour window, 8:00–20:00, on Aug. 31, 1994. The almanac file 083194.alm used for the computation is given in Appendix A.2. The all-in-view satellite combinations used for the computation of the RDOP surface are shown in Table 7.1. A minimum elevation cutoff of 15° was applied in the computation. A grided perspective view of the RDOP surface is shown in FIG. 8 and the corresponding RDOP contour map is shown in FIG. 9.

TABLE 7.1

All-In-View Satellite Combination

| Satellite Constellation | Time Rise | Time Set | dT | PDOP Rise | PDOP Set |
|---|---|---|---|---|---|
| 2 7 15 19 27 | 8:00 | 8:07 | 0:07 | 5.2 | 5.1 |
| 2 7 15 27 | 8:07 | 8:17 | 0:10 | 7.2 | 6.7 |
| 2 7 14 15 27 | 8:17 | 8:32 | 0:15 | 4.6 | 4.7 |
| 2 4 7 14 15 27 | 8:32 | 8:52 | 0:20 | 3.8 | 3.3 |
| 2 4 7 12 14 15 27 | 8:52 | 9:02 | 0:10 | 1.8 | 1.8 |
| 2 4 7 12 14 15 | 9:02 | 9:12 | 0:10 | 2.1 | 2.2 |
| 2 4 7 9 12 14 15 | 9:12 | 9:52 | 0:40 | 2.1 | 2.5 |
| 2 4 7 9 12 14 | 9:52 | 10:02 | 0:10 | 2.9 | 2.9 |
| 2 4 7 9 12 14 24 | 10:02 | 10:17 | 0:15 | 2.2 | 2.2 |
| 2 4 5 7 9 12 14 24 | 10:17 | 11:02 | 0:45 | 2.1 | 1.9 |
| 2 4 5 7 12 14 24 | 11:02 | 11:17 | 0:15 | 2.0 | 2.0 |
| 4 5 7 12 14 24 | 11:17 | 11:32 | 0:15 | 3.0 | 2.7 |
| 4 5 7 12 24 | 11:32 | 11:47 | 0:15 | 5.0 | 5.9 |
| 4 5 7 12 18 20 24 | 11:47 | 11:52 | 0:05 | 2.0 | 2.0 |
| 4 5 7 12 16 18 20 24 | 11:52 | 12:12 | 0:20 | 1.8 | 1.9 |
| 4 5 7 16 18 20 24 | 12:12 | 13:02 | 0:50 | 2.2 | 2.4 |
| 4 5 16 18 20 24 | 13:02 | 13:17 | 0:15 | 2.8 | 2.8 |
| 4 5 6 16 18 20 24 | 13:17 | 14:07 | 0:50 | 2.5 | 1.8 |
| 4 5 6 16 20 24 | 14:07 | 14:12 | 0:05 | 2.2 | 2.2 |
| 4 6 16 20 24 | 14:12 | 14:22 | 0:10 | 2.7 | 2.7 |
| 4 6 16 20 24 26 | 14:22 | 14:32 | 0:10 | 2.3 | 2.3 |
| 6 16 20 24 26 | 14:32 | 14:47 | 0:15 | 4.6 | 4.9 |
| 6 16 24 26 | 14:47 | 15:07 | 0:20 | 6.6 | 9.1 |
| 6 16 17 24 26 | 15:07 | 15:57 | 0:50 | 2.8 | 3.2 |
| 6 16 17 24 26 20 | 15:57 | 16:02 | 0:05 | 2.8 | 2.8 |
| 6 16 17 23 24 26 27 | 16:02 | 16:22 | 0:20 | 2.0 | 2.0 |
| 6 16 17 23 26 27 | 16:22 | 16:27 | 0:05 | 2.7 | 2.7 |
| 6 16 17 23 26 | 16:27 | 17:12 | 0:45 | 3.3 | 2.8 |
| 6 9 16 17 23 26 | 17:12 | 17:32 | 0:20 | 2.7 | 2.7 |
| 6 9 17 23 26 | 17:32 | 17:42 | 0:10 | 5.4 | 4.8 |
| 9 17 23 26 | 17:42 | 17:57 | 0:15 | 4.8 | 4.8 |
| 9 12 17 21 23 26 28 | 17:57 | 18:57 | 1:00 | 2.0 | 2.5 |
| 1 9 12 17 21 23 26 28 | 18:57 | 19:02 | 0:05 | 2.0 | 2.0 |
| 1 9 12 17 21 23 26 | 19:02 | 19:32 | 0:30 | 2.1 | 2.1 |
| 1 9 12 17 21 23 | 19:32 | 19:57 | 0:25 | 4.7 | 4.4 |
| 1 5 9 12 17 21 23 | 19:57 | 20:17 | 0:20 | 3.0 | 3.0 |
| 1 5 9 12 21 23 | 20:17 | 20:32 | 0:15 | 3.2 | 3.4 |
| 1 5 9 12 20 21 23 | 20:32 | 20:42 | 0:10 | 2.8 | 2.9 |
| 1 5 9 12 20 21 23 25 | 20:42 | 20:22 | 0:40 | 2.2 | 2.3 |

Date: Aug 31, 1994
Latitude: 43° 02' 02" N
Time: 8:00 - >21:22
Longitude: 76° 07' 27" W
Cut-Off Elevation: 15°
Zone: - 4:00

7.2 Geometric Meaning of the RDOP Surface

Figure 7:
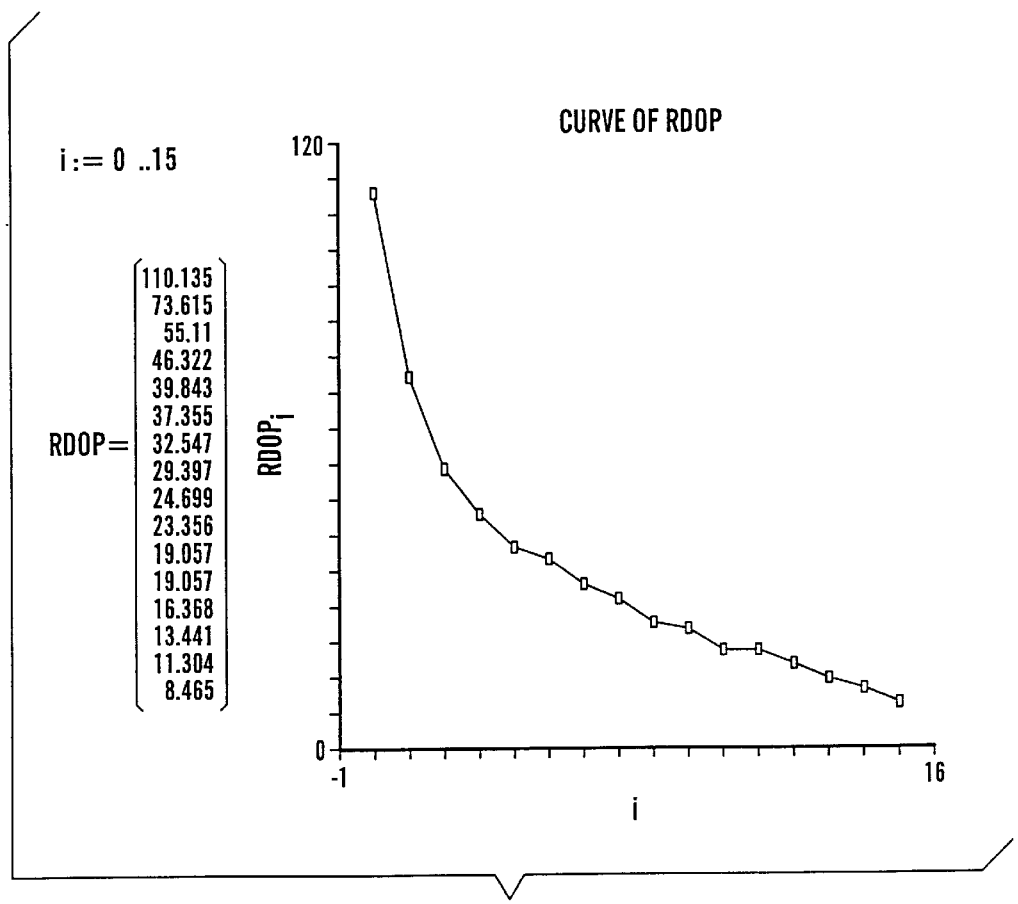
FIG. 7 A curve of RDOP computed with a filtering solution with a variable number of parameters.

The RDOP contour map of (7.2) shows the variability and magnitude of the RDOP with respect to different session starting times and session lengths over a 12 hour period. In FIG. 7 the x axis represents session starting time and the y axis shows the session length. The contour lines represent the values of the RDOP in the third dimension. Specific RDOP curves with different implications can be extracted from the contour map as described in the following section.

7.2.1 Profiles along the x Direction

Figure 10:
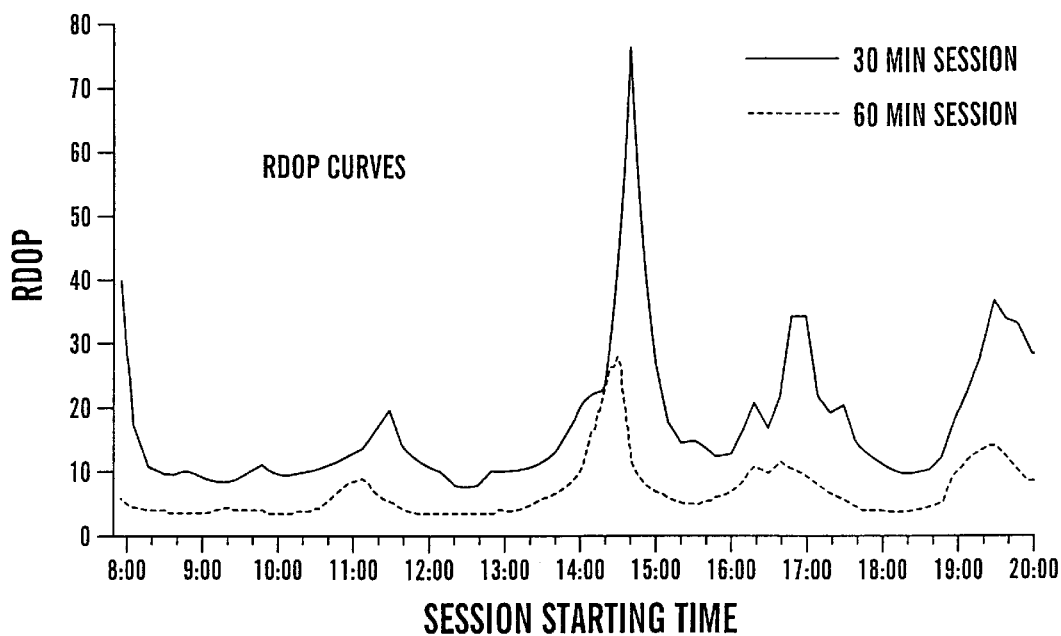
FIG. 10 RDOP curve extracted along the x direction

A profile along the x direction extracted from the RDOP contour map is a RDOP curve representing the variability of RDOP versus different starting times for a certain observation period. FIG. 10 is an extraction of two profiles parallel to the x axis. One RDOP curve represents a 30 minute session and the other represents a 60 minute session.

The RDOP curves extracted along the x direction gives information about the optimum starting times for GPS relative positioning for Thornden, Syracuse during a 12 hour period on Aug. 31, 1994. The five peaks represent the five local maximums for the RDOP, which corresponds to the lowest accuracy for relative positioning. The four troughs between the peaks represent the optimum starting periods for relative positioning.

Comparing these two curves it can be seen that (1) a significant improvement in the RDOP can be achieved for the 60 minute session and (2) the variability of the RDOP for the longer session has been smoothed.

Note the shift of the x coordinates for the peaks of the 60 minute sessions compared with the 30 minute sessions. This important phenomenon will be discussed in chapter 8.

7.2.2 Profiles along the y Direction

Figure 11:
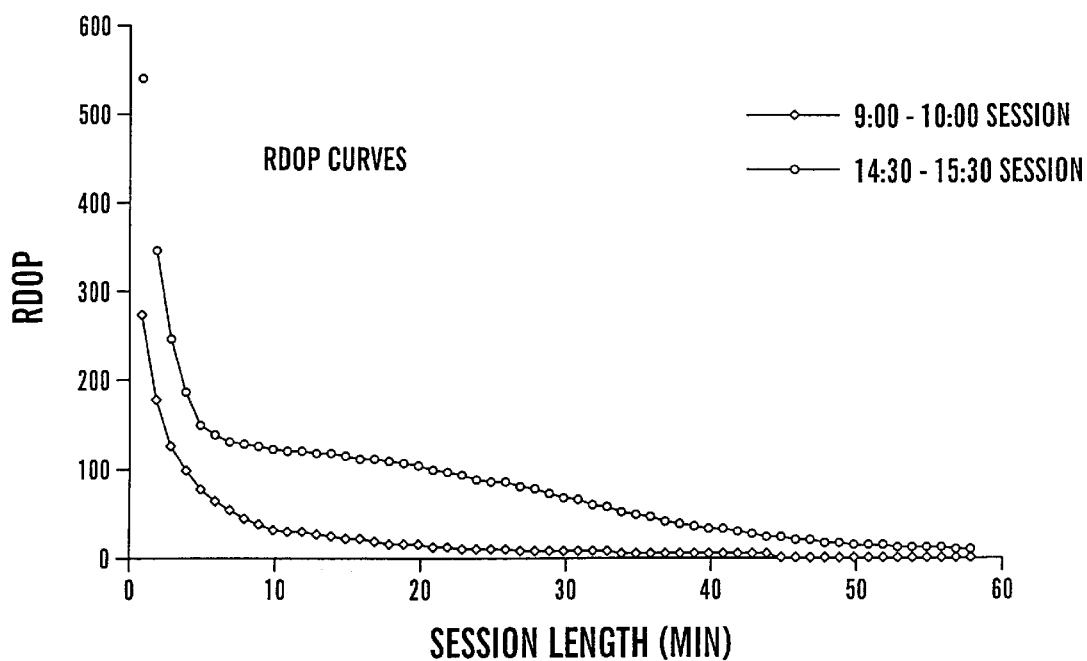
FIG. 11 RDOP curve extracted along the y direction.

A profile in the y direction shows the improvement of RDOP over certain tracking intervals. FIG. 11 shows two RDOP curves for the 9:00 10:00 session and the 14:30–15:30 session respectively.

From FIG. 11 we can see the rapid improvement of RDOP in a very short period at the beginning. It then slows down very quickly after 10 minutes. There is a significant change at the 5 minute session length in the 14:30–15:30 session. The variation of changing rate of the RDOP is determined by the changing satellite geometry and the combination of satellites available at each epoch. The initial values of the RDOP are determined by the satellite/station geometry at the session starting time and the number of satellites available. The difference in the RDOP for different sessions gets much smaller as the session lengths increase. This is the smoothing effect mentioned in the previous section.

The optimum observation length for a particular starting time for GPS relative positioning can be interpolated from the RDOP curve extracted along y direction.

Further discussion on the application of the RDOP surface will be given in chapter 9.

8.0 COMPARISON BETWEEN RDOP AND PDOP

Figure 12:
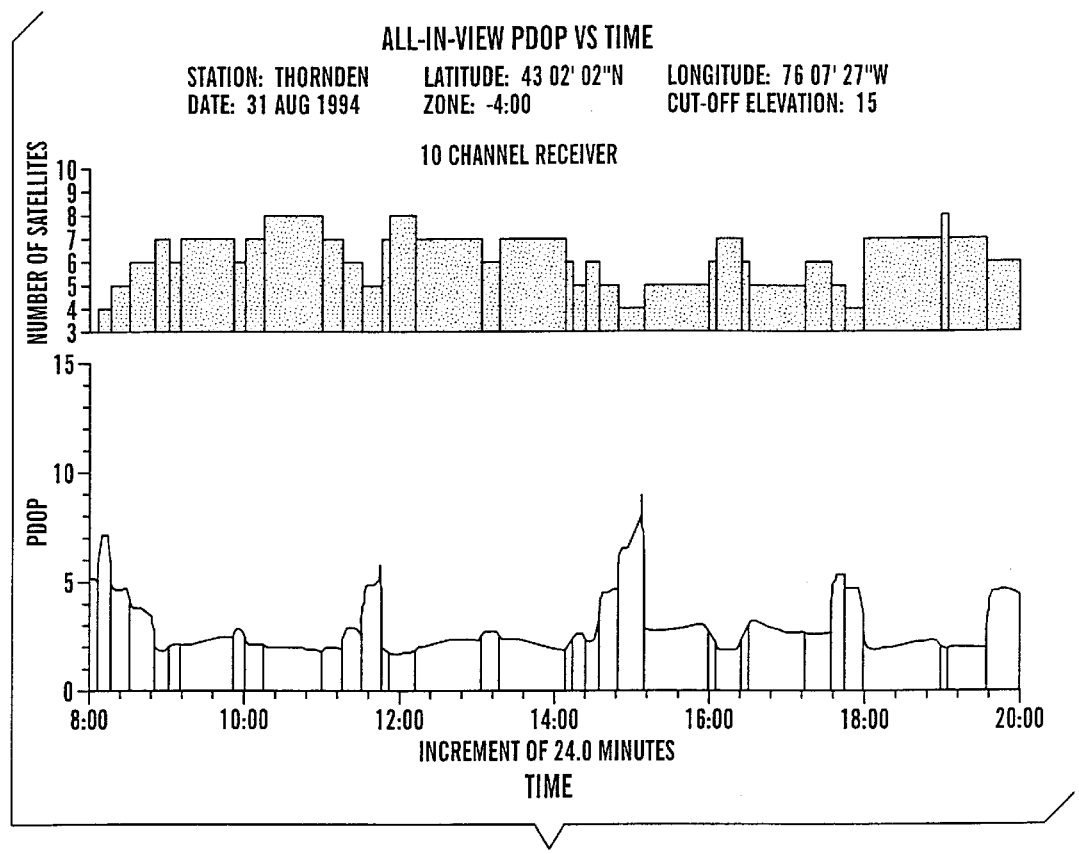
FIG. 12 PDOP vs time.

In order to evaluate and test the method and algorithms developed in this research and to study the possible relation between RDOP and PDOP, a PDOP plot (FIG. 12) was generated for the same period under same conditions (all-in-view satellites and 15° cut-off elevation) for Thornden, Syracuse with the nimble ProPlan software. By comparing the PDOP plot of FIG. (8.1) with the RDOP contour map of FIG. (7.2), several interesting results have been found. An important phenomenon, the shift of the RDOP curve as a function of session length, has been discovered. The relation between PDOP and RDOP will be explained based on this finding.

8.1 Relation between RDOP and PDOP

Comparing the PDOP plot of FIG. (8.1) with the RDOP contour map of FIG. (7.2), a similarity in the trend can be found between the peeks and troughs of PDOP and RDOP. The five maxima of PDOP correspond to the five maxima of RDOP. Therefore RDOP is somehow related to PDOP. A relation can be found by comparing the x coordinates of the five peaks (including the two side peaks) of the PDOP curve with the x coordinates of the five peaks of the initial solution of the RDOP. The results are shown in Table 8.1.

TABLE 8.1

Comparison between PDOP and RDOP

|      | max1 | max2  | max3  | max4  | max5  |
|------|------|-------|-------|-------|-------|
| PDOP | 8:10 | 11:40 | 15:00 | 17:30 | 19:50 |
| RDOP | 8:10 | 11:40 | 14:50 | 17:10 | 20:00 |

Although the filtering technique developed in this research to compute the continuous RDOP surface is quite different than the technique used in Trimble software to compute PDOP, the x coordinates of the five peaks of PDOP curve coincide pretty well with those of the five peaks of the initial solution of RDOP at the beginning of the session. It can be concluded that the initial value of RDOP at the beginning of a session is related to that of PDOP. The reason is obvious. Both PDOP and RDOP are a function of the satellite/station geometry. The lowest PDOP corresponds to the highest accuracy for point positioning and so does the lowest RDOP for elative positioning. There should not be any contradiction between the two. The question is: can we simply use PDOP as an accuracy indicator for relative positioning ?

8.2 Shift of RDOP Curve

Through the careful examination of the x coordinates of the peaks of the RDOP curves at different ssesion lengths, an interesting phenomenon has been found. The x coordinates of the peaks of the RRDOP curve gradually change as the session length gets longer. The shift of the RDOP curve as a function of session length is shown in Table 8.2.

TABLE 8.2

Shift of the Peaks of the RDOP Curve

| Session length (min) | max2  | max3  | max4  | max5  |
|----------------------|-------|-------|-------|-------|
| 10                   | 11:38 | 14:50 | 17:10 | 19:50 |
| 20                   | 11:28 | 14:43 | 16:58 | 19:50 |
| 30                   | 11:28 | 14:42 | 16:57 | 19:30 |
| 60                   | 11:08 | 14:32 | 16:42 | 19:30 |

The first local maximum max1 does not show in Table 8.2 since the shift of x coordinate of max1 is out of the range of FIG. 7.2 when the observing session is longer than IS minutes. On the other hand the shift of the local maximum max5 becomes more obvious as shown by the shifting of the x coordinate of max5 when the session length is more the 5 minutes. The shift of the RDOP curve is due to the changing geometry of satellites. The RDOP is governed by the continuously changing satellite geometry from the starting time to the end of a session. At each epoch the instantaneous satellite-station geometry can be expressed by PDOP. The RDOP reflects the accumulated PDOP. The longer the session length is, the wider will be the range of PDOP covered from the starting time to the end of the session. The variation of the PDOP during a session will in turn affect the x coordinates of the peaks of the RDOP. Thus the x coordinates of the peaks of the RDOP curve will gradually change as the session length gets longer.

The shift of the RDOP curve as the session length gets longer changes the coincidence between PDOP and the initial solution of RDOP. The comparison between the maxima of the PDOP curve (FIG. 12) and those of the 60 minute RDOP curve (FIG. 7) is shown in Table 8.3.

TABLE 8.3

Comparison between PDOP and 60 min Session RDOP

|             | max2  | max3  | max4  | max5  |
|-------------|-------|-------|-------|-------|
| PDOP        | 11:40 | 14:50 | 17:30 | 19:50 |
| 60 min RDOP | 11:08 | 14:32 | 16:42 | 19:28 |

Note the three maxima at 11:08, 14:32 and 19:28 of the 60 minute RDOP curve correspond to the three minima of PDOP curve. The other maximum at 16:42 of RDOP also corresponds to the relatively low value of PDOP. The coincidence between PDOP and RDOP at beginning epoch does not exist any more due to the shift of the peaks of RDOP when the observing session is getting longer. Thus the widely accepted belief that low PDOP indicates good satellite/station geometry for a GPS survey is not true for relative positioning. Similar results were also repeated by Norton (1987), Hatch and Avery (1989) and Merminod, Grant and Rizos (1990).

The filtering technique developed in this investigation to generate a continuos RDOP surface is sequential in nature and all the RDOP values are computed in a unified time series. This has led to the finding of shift of RDOP curve as a function of session length.

Figure 6:
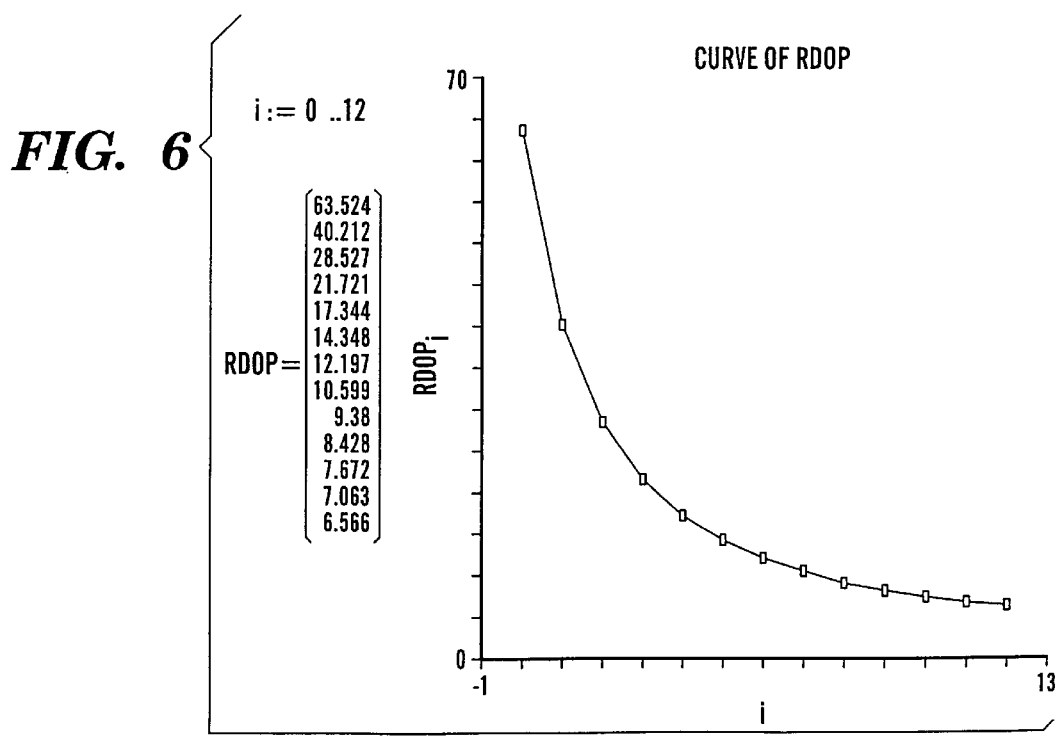
FIG. 6 A curve of RDOP computer with a filtering solution with a fixed number of parameters.

The method used by Merminod, Grant and Rizos (1990) to compute the Bias Dilution of Precision (BDOP), which is similar to RDOP, is a batch solution. Each time only a single value of BDOP can be computed. The BDOP curves were obtained by repeating the whole computation with different start/stop times. In FIG. 6 of their paper, the value of 13DOP was plotted against the middle point of time, thus the plotted value of BDOP at 19h 30m for a 120 minute session represents a session extending from 18h 30m to 20h 30m. Therefore the BDOP curves with different session lengths plotted in FIG. 6 are not in a unified time system. As a result the important phenomenon of the shift of the RDOP as a function of session length was not displayed in FIG. 6 of their paper.

The RDOP is a three dimensional surface in nature. The relation between the RDOP curves with different session lengths can only be found in a three dimensional plot such as the RDOP contour map (FIG. 7). In FIG. 6 of the Merminod, Grant and Rizos paper (1990), one dimension represents session starting time and the other dimension represents the value of BDOP. The session length does not show in the x-y plane. This represents a limitation of the two dimensional plot they used to study BDOP.

The shift of the RDOP curve as a function of session length is an important phenomenon which shows the inner relationship between RDOP and PDOP. Confusions and contradictions concerning PDOP and RDOP in the previous investigations presented in chapter 1 and chapter 2 can be finally clarified.

9.0 RESULTS AND ANALYSIS

The numerical analysis and practical interpretation of the three RDOP models are given in this chapter. The application of the RDOP surface for the optimum design of long distance precision GPS relative positioning will be presented with numerical examples.

9.1 Comparison between the Three RDOP Models.

Three RDOP models were proposed in Chapter 4 for the study of RDOP. The theoretical models and mathematical approaches were given in Chapter 4, Chapter 5, and Chapter 6. The practical interpretation and analysis will be given in this section with numerical examples.

9.1.1 Comparison between Model 3 and Model 2

Example 9.1 Computation of RDOP for a single GPS baseline with Model 3 and Model 2

Two models, Model 3 and Model 2 that were proposed in 4.1, are used to compute the value of RDOP for a 35-minute observation period, 12:42–13:17, on Oct. 24, 1993. The GPS baseline to be observed is Thornden—Point 1, Syracuse. The satellite combination is 3, 16, 17, 23, 26. In Model 2 station Thomden is fixed in the computation of RDOP and only Point 1 is considered as an unknown. In Model 3, both of the station Thornden and Point 1 are considered as unknowns.

Model 3 Computation of RDOP with $A^{lm}$ inverse

The design matrix A for model 3 is $$A = \begin{bmatrix}
-4.636583 & -3.154499 & 0.085950 & 4.642518 & 3.151233 & -0.077201 & 1 & 0 & 0 & 0 \\
1.453095 & -1.588591 & -0.494876 & -1.450239 & 1.588255 & 0.492723 & 0 & 1 & 0 & 0 \\
3.530433 & -0.784332 & 3.181026 & -3.520406 & 0.787337 & -3.179082 & 0 & 0 & 1 & 0 \\
-2.798871 & 0.848778 & 1.586568 & 2.798994 & -0.853179 & -1.582686 & 0 & 0 & 0 & 1 \\
-4.705465 & -3.440666 & 0.038279 & 4.711941 & 3.437419 & -0.029677 & 1 & 0 & 0 & 0 \\
1.340762 & -1.664611 & -0.702603 & -1.338241 & 1.664145 & 0.700481 & 0 & 1 & 0 & 0 \\
3.555384 & -0.969471 & 2.812551 & -3.545417 & 0.972326 & -2.811148 & 0 & 0 & 1 & 0 \\
-2.768288 & 0.545645 & 1.217494 & 2.768514 & -0.550258 & -1.213631 & 0 & 0 & 0 & 1 \\
-4.775442 & -3.713040 & -0.014277 & 4.782432 & 3.709816 & 0.022695 & 1 & 0 & 0 & 0 \\
1.219763 & -1.727881 & -0.911041 & -1.217575 & 1.727275 & 0.908972 & 0 & 1 & 0 & 0 \\
3.565948 & -1.147332 & 2.433827 & -3.556090 & 1.150026 & -2.432965 & 0 & 0 & 1 & 0 \\
-2.745780 & 0.241356 & 0.844608 & 2.746101 & -0.246179 & -0.840757 & 0 & 0 & 0 & 1 \\
-4.848968 & -3.972348 & -0.070617 & 4.856456 & 3.969145 & 0.078809 & 1 & 0 & 0 & 0 \\
1.092557 & -1.779721 & -1.120081 & -1.090700 & 1.778967 & 1.118076 & 0 & 1 & 0 & 0 \\
3.563631 & -1.321779 & 2.043291 & -3.553923 & 1.324295 & -2.042967 & 0 & 0 & 1 & 0 \\
-2.731991 & -0.064632 & 0.466826 & 2.732403 & 0.059602 & -0.462979 & 0 & 0 & 0 & 1 \\
-4.924028 & -4.217905 & -0.132990 & 4.931986 & 4.214720 & 0.140917 & 1 & 0 & 0 & 0 \\
0.958891 & -1.820398 & -1.330084 & -0.957358 & 1.819482 & 1.328154 & 0 & 1 & 0 & 0 \\
3.546368 & -1.488950 & 1.641346 & -3.536856 & 1.491274 & -1.641557 & 0 & 0 & 1 & 0 \\
-2.725195 & -0.370245 & 0.084740 & 2.725702 & 0.365020 & -0.080893 & 0 & 0 & 0 & 1 \\
-4.999796 & -4.445994 & -0.196693 & 5.008197 & 4.442831 & 0.204316 & 1 & 0 & 0 & 0 \\
0.820155 & -1.845144 & -1.534930 & -0.818943 & 1.844061 & 1.533083 & 0 & 1 & 0 & 0 \\
3.517277 & -1.646996 & 1.236740 & -3.508000 & 1.649119 & -1.237473 & 0 & 0 & 1 & 0 \\
-2.727582 & -0.671409 & -0.294794 & 2.728176 & 0.665997 & 0.298650 & 0 & 0 & 0 & 1 \\
-5.076168 & -4.657610 & -0.263156 & 5.084985 & 4.654469 & 0.270435 & 1 & 0 & 0 & 0 \\
0.675979 & -1.857168 & -1.737017 & -0.675072 & 1.855908 & 1.735261 & 0 & 1 & 0 & 0 \\
3.473654 & -1.795679 & 0.822884 & -3.464658 & 1.797591 & -0.824132 & 0 & 0 & 1 & 0 \\
-2.737291 & -0.969734 & -0.675264 & 2.737974 & 0.964151 & 0.679134 & 0 & 0 & 0 & 1
\end{bmatrix} \quad (9.1)$$

The partial derivative part of A was computed in the example 4.1 as A1. The $Q^{-1}$, the inverse of the cofactor matrix of the double difference observation, was computed according to (4.9) and (4.10). $Q^{-1}$ has the following form.

$$Q^{-1} = \begin{bmatrix} Q_{t1}^{-1} & & & & & & \\ & Q_{t2}^{-1} & & & & & \\ & & Q_{t3}^{-1} & & & & \\ & & & Q_{t4}^{-1} & & & \\ & & & & Q_{t5}^{-1} & & \\ & & & & & Q_{t6}^{-1} & \\ & & & & & & Q_{t7}^{-1} \end{bmatrix}$$

where $Q_{t1}^{-1}=Q_{t2}^{-1}=Q_{t3}^{-1}=Q_{t4}^{-1}=Q_{t5}^{-1}=Q_{t6}^{-1}=Q_{t7}^{-1}=Q_t^{-1}$, $Q_t^{-1}$ can be expressed as $$Q_t^{-1} = \begin{bmatrix} 0.4 & -0.1 & -0.1 & -0.1 \\ -0.1 & 0.4 & -0.1 & -0.1 \\ -0.1 & -0.1 & 0.4 & -0.1 \\ -0.1 & -0.1 & -0.1 & 0.4 \end{bmatrix}$$

In model 3 choosing both of the station Thornden and Point 1 as unknowns leaves the matrix of the normal equation coefficients singular, e.g. $|A^T Q^{-1} A|=0$, therefore the inverse of $A^T Q^{-1} A$ dose not exit. The problem of the inversion of a singular matrix $A^T Q^{-1} A$ can be solved by $A^{lm}$ inverse in which the proper choice of $A_0$ is required. Taking the first 7 rows of A as $A_0$ satisfies the condition of (5.15). The cofactor matrix of the adjusted parameters can be solved by $$Q_{xx}=A^{lm}=A_0^T (A_0 A^T A A_0^T)^{-1}A$$

The partial derivative part of A was computed in the example 4.1 as A1. The $Q^{-1}$, the inverse of the cofactor matrix of the double difference observation, was computed according to (4.9) and (4.10). $Q^{-1}$ has the following form.

$$Q^{-1} = \begin{bmatrix} Q_{t1}^{-1} & & & & & & \\ & Q_{t2}^{-1} & & & & & \\ & & Q_{t3}^{-1} & & & & \\ & & & Q_{t4}^{-1} & & & \\ & & & & Q_{t5}^{-1} & & \\ & & & & & Q_{t6}^{-1} & \\ & & & & & & Q_{t7}^{-1} \end{bmatrix}$$

where $Q^{-1}_{t1}=Q^{-1}_{t2}=Q^{-1}_{t3}=Q^{-1}_{t4}=Q^{-1}_{t5}=Q^{-1}_{t6}=Q^{-1}_{t7}=Q^{-1}_t$, $Q^{-1}_t$ can be expressed as $$Q_t^{-1} = \begin{bmatrix} 0.4 & -0.1 & -0.1 & -0.1 \\ -0.1 & 0.4 & -0.1 & -0.1 \\ -0.1 & -0.1 & 0.4 & -0.1 \\ -0.1 & -0.1 & -0.1 & 0.4 \end{bmatrix}$$

In model 3 choosing both of the station Thomden and Point 1 as unknowns leaves the matrix of the normal equation coefficients singular, e.g. $|A^T Q^{-1} A|=0$, therefore the inverse of $A^T Q^{-1} A$ dose not exit. The problem of the inversion of a singular matrix $A^T Q^{-1} A$ can be solved by $A^{lm}$ inverse in which the proper choice of $A_0$ is required. Taking the first 7 rows of A as $A_0$ satisfies the condition of (5.15). The cofactor matrix of the adjusted parameters can be solved by $$Q_{xx} = A^{lm} = A_0^T (A_0 A^T A A_0^T)^{-1} A$$

The cofactor matrix $Q_{xx}$ is $$Q_{XX} = \begin{bmatrix} 1.54416 & 0.09488 & 0.00961 & -1.36865 & -0.16502 & -0.14523 & 15.18337 & -2.51471 & -10.25985 & 7.95049 \\ 0.09488 & 0.34324 & -0.11275 & -0.11275 & -0.07644 & 0.12045 & 3.56705 & 0.77993 & 0.78122 & 0.61846 \\ 0.00961 & -0.11275 & 0.17382 & -0.01044 & 0.11544 & -0.18306 & -0.77123 & -0.02159 & -1.08976 & -0.12230 \\ -1.36865 & -0.07644 & -0.01044 & 1.21329 & 0.13840 & -0.13099 & -13.39507 & 2.25197 & 9.12345 & -0.704205 \\ -0.16502 & -0.35598 & -0.11544 & 0.13840 & 0.37215 & -0.11740 & -4.32546 & -0.69092 & -0.35405 & -0.98646 \\ -0.14523 & 0.12045 & -0.18306 & 0.13099 & -0.11740 & 0.20509 & -0.43503 & 0.28315 & 2.07497 & -0.56607 \\ 15.188337 & 3.56705 & -0.77123 & -13.39507 & -4.32546 & 0.43503 & -170.42820 & -17.08952 & -89.62834 & 79.45218 \\ -2.41471 & 0.77993 & -0.02159 & 2.25197 & -0.69092 & 0.28315 & -17.08951 & 7.95622 & 19.66171 & -1258482 \\ -10.25984 & 0.78122 & -1.08976 & 9.12345 & -0.35405 & 2.07497 & -89.62833 & 19.66171 & 76.91691 & -51.45856 \\ 7.95049 & 0.61846 & -0.12230 & -7.04205 & -0.98646 & -0.56600 & 79.45217 & -12.58482 & -51.45856 & 41.66508 \end{bmatrix}$$

The value of RDOP $$rdop = \sqrt{tr(Q_{XX})} = 17.344$$

Suppose the standard deviation of the double difference observation is:

$\sigma_0 = 0.007$ m

The value of $\sigma_0$ was taken from example 5.1. The standard deviations of the adjusted parameters, $X_A$, $Y_A$, $Z_A$, $X_B$, $Y_B$, $Z_B$, $N^{12}_{AB}$, $N^{13}_{AB}$, $N^{14}_{AB}$, $N^{15}_{AB}$ ($\sigma$) in which A=Thornden and B=Point 1, are the corresponding square roots of the diagonal elements of the cofactor matrix $Q_{xx}$ multiplied by $\sigma_0$.

$$\sigma = \begin{bmatrix} 9 \\ 4 \\ 3 \\ 8 \\ 4 \\ 3 \\ 91 \\ 20 \\ 61 \\ 45 \end{bmatrix} \text{(mm)}$$

The standard deviation of the adjusted GPS vector, $\Delta X$, $\Delta Y$, $\Delta Z$, can be computed based on (4.2 1) and (4.18).

$$\begin{bmatrix} \sigma_{\Delta X} \\ \sigma_{\Delta Y} \\ \sigma_{\Delta Z} \end{bmatrix} = \sigma_0 \begin{bmatrix} \sqrt{q_{X_A X_A} - 2q_{X_A X_B} + q_{X_B X_B}} \\ \sqrt{q_{Y_A Y_A} - 2q_{Y_A Y_B} + q_{Y_B Y_B}} \\ \sqrt{q_{Z_A Z_A} - 2q_{Z_A Z_B} + q_{Z_B Z_B}} \end{bmatrix} = \begin{bmatrix} 16 \\ 8 \\ 6 \end{bmatrix} \text{(mm)}$$

The values of the position standard deviation of $\sigma$ are in the geocentric coordinate system. After the transformation of the covariance from geocentric to local geodetic, the values of the position standard deviation in north, east and height for Thornden and point 1 are $$\sigma_L = \begin{bmatrix} 3 \\ 6 \\ 4 \\ 3 \\ 5 \\ 5 \end{bmatrix} \text{(mm)}$$

Model 2 Computation of RDOP with Thomden as a fixed point

The corresponding design matrix A for model 2 is the last seven columns of A in (9.1). The $Q^{-1}$, the inverse of the cofactor matrix of the double difference observation, is the same as that computed in model 3. The cofactor matrix of the adjusted parameters can be computed as $$Q_{XX} = (A^T Q^{-1} A)^{-1}$$

$$Q_{XX} = \begin{bmatrix} 5.49896 & 0.46829 & 0.30087 & -28.59508 & 4.77217 & 19.38739 & -15.00203 \\ 0.46829 & 1.42573 & -0.46550 & -7.85255 & -1.47596 & -1.15895 & -1.58253 \\ 0.30087 & -0.46550 & 0.74550 & 0.30690 & 0.30845 & 3.18001 & -0.45880 \\ -28.59508 & -7.85255 & 0.30690 & 170.44930 & -17.11770 & -89.64393 & 79.46753 \\ 4.77217 & -1.47596 & 0.30845 & -17.11770 & 7.96170 & 19.67300 & -12.60292 \\ 19.38739 & -1.15895 & 3.18001 & -89.64393 & 19.67300 & 76.89618 & -51.47377 \\ -15.00203 & -1.58253 & -0.45880 & 79.46753 & -12.60292 & -51.47377 & 41.68266 \end{bmatrix}$$

The value of RDOP $$rdop = \sqrt{tr(Q_{XX})} = 17.455$$

Using the same value of $\sigma_0=0.007$ m as in the model 3, the standard deviations of the adjusted parameters, $X_B$, $Y_B$, $Z_B$, $N^{12}_{AB}$, $N^{13}_{AB}$, $N^{14}_{AB}$, $N^{15}_{AB}$ are:

$$\sigma = \begin{bmatrix} 16 \\ 8 \\ 6 \\ 91 \\ 20 \\ 61 \\ 45 \end{bmatrix} \text{(mm)}$$

The values of the position standard deviation of $\sigma$ are in the geocentric coordinate system. After the transformation of the covariance from geocentric to local geodetic, the values of the position standard deviation in north, east and height for Point 1 are $$\sigma_L = \begin{bmatrix} 5 \\ 11 \\ 9 \end{bmatrix} \text{(mm)}$$

Figure 13:
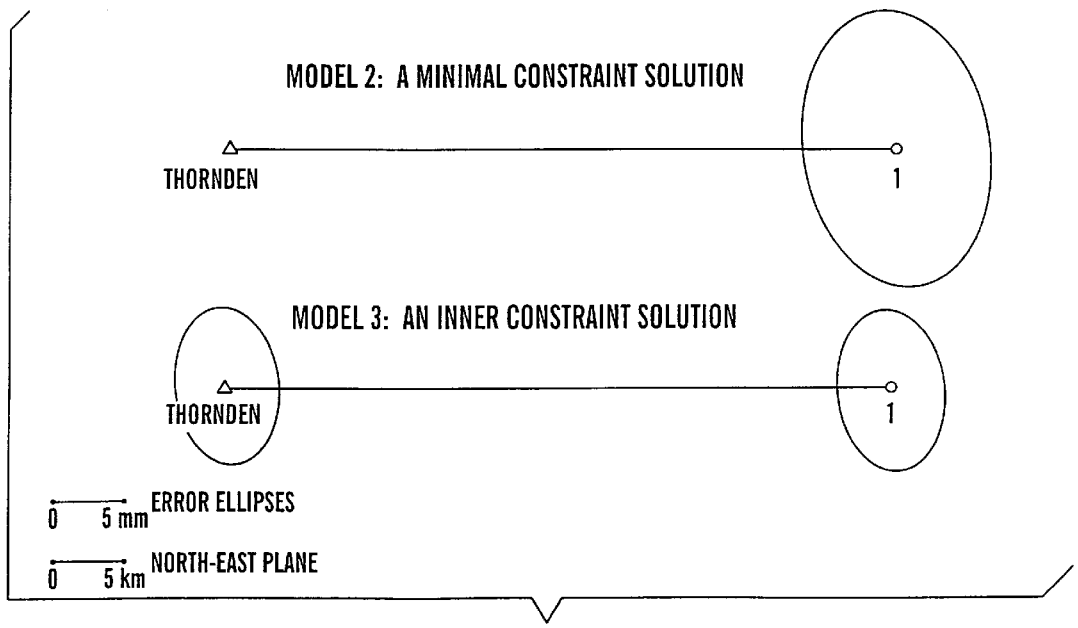
FIG. 13 GPS baseline with error ellipses.

The error ellipses of relative positioning expressed in the local geodetic for model 2 and model 3 are shown in FIG. 13.

The results of model 2 and model 3 are summarized in Table 9.1 and 9.2

TABLE 9.1

Minimal Constraint Solution (Model 2)

| Station | $\sigma_X$ (mm) | $\sigma_Y$ (mm) | $\sigma_Z$ (mm) | RDOP |
|---|---|---|---|---|
| 1 | 5 | 11 | 9 | 17.455 |

TABLE 9.2

Inner Constraint Solution (Model 3)

| Station | $\sigma_X$ (mm) | $\sigma_Y$ (mm) | $\sigma_Z$ (mm) | $\sigma_{\Delta X}$ (mm) | $\sigma_{\Delta Y}$ (mm) | $\sigma_{\Delta Z}$ (mm) | RDOP |
|---|---|---|---|---|---|---|---|
| Thornden | 3 | 6 | 4 | | | | |
| 1 | 3 | 5 | 5 | 5 | 11 | 9 | 17.344 |

Comparing Table 9.1 and 9.2 it can be seen

1. The accuracy of Point 1 computed with model 2 represents the relative accuracy of Point 1 with respect to Thornden. In model 2 only Point 1 is considered as an unknown thus it only contains accuracy information about this point relative to a fixed point.
2. In model 3 both of the two points of the GPS baseline are considered as unknowns therefore it gives both the absolute accuracy of the two endpoints of the GPS baseline and the relative accuracy between the two points. The values of the standard deviation of the adjusted GPS vector, $\Delta X$, $\Delta Y$, $\Delta Z$, computed in model 3 are exactly same as the values of the standard deviation of Point 1 computed in model 2. This is numerical proof of the conclusion in 1. Model 3 is a more generalized model and contains more accuracy information than model 2. Model 2 is only a special case of model 3.
3. As far as RDOP is concerned the two approaches give very close results. The RDOP value of the inner constrained solution is slightly smaller than that of minimal constraint solution. Based on (5.19) it can be further concluded that:

$$tr(Q_{xx})=\min \qquad (9.2)$$

Therefore the value of the RDOP computed with model 3 is minimum. Theoretically speaking only the value of the RDOP computed with modal 3 reflects the pure effect of satellite geometry on the achievable accuracy of the GPS baseline. The value of the RDOP computed with model 2 is also affected by the errors contained in the fixed point thus it is always larger than that of the RDOP computed with model 3.

9.1.2 Comparison between Model 3 and Model 1

Two models, model 3 and model 1 proposed in 4.1, are used to compute the RDOP curve for a 75 minute observation period, 12:42–13:57, on Oct. 24, 1993. The GPS baseline to be observed is Thornden - Point 1, Syracuse. The satellite combination is 3, 16, 17, 23, 26. In model 1 the carrier phase ambiguities are assumed to be solved before the carrier phase processing and only the coordinates of point 1 are considered as unknowns. The unknowns carried in model 3 are the coordinates of the two points of the GPS baseline to be observed and the double difference ambiguities. The data sampling rate is 1 minute. The two RDOP curves computed with model 3 and model 1 are shown in FIG. 14 and FIG. 15 respectively.

Figure 14:
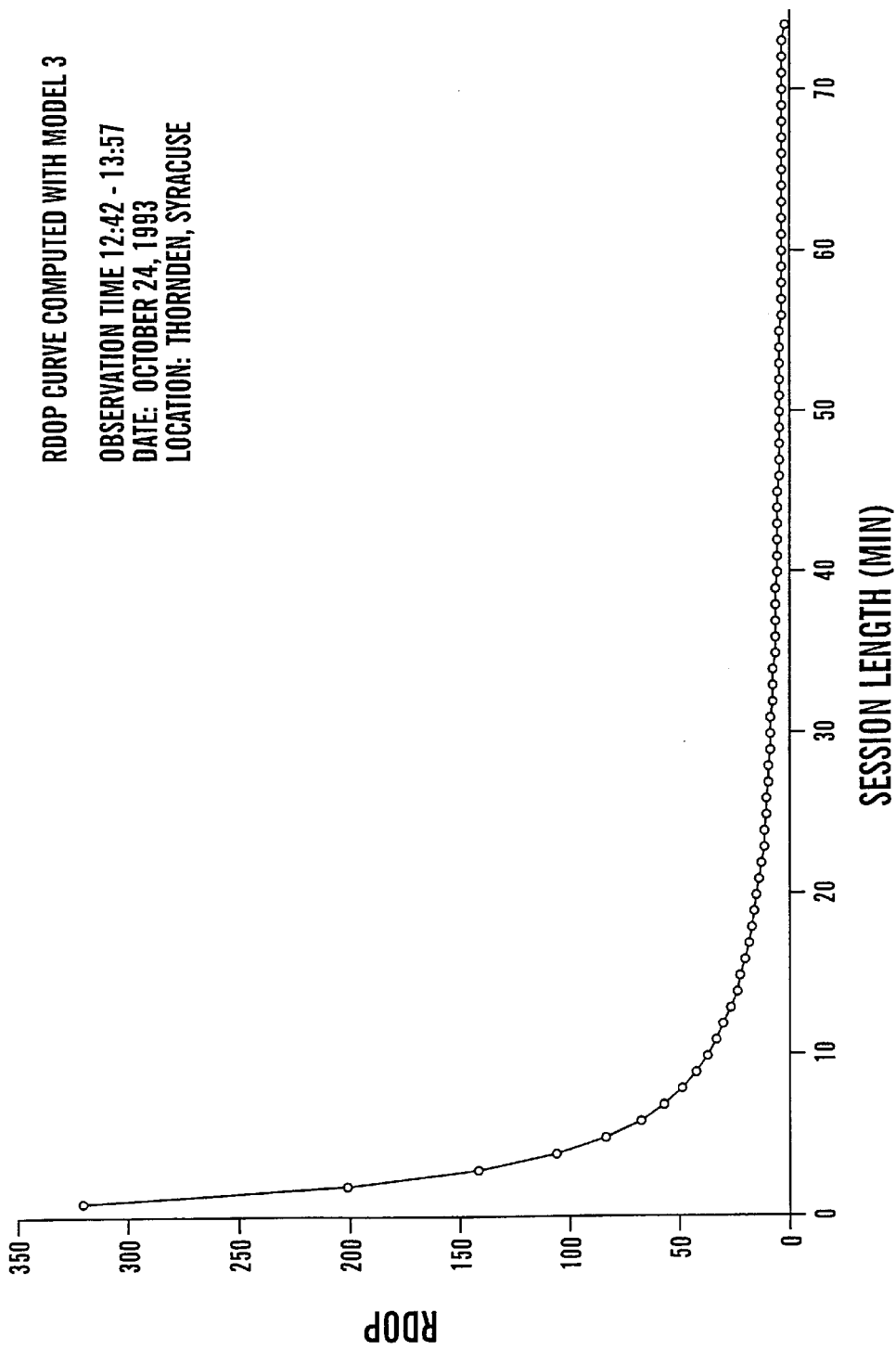
FIG. 14 The RDOP curve for the observation period 12:423–13:57 on Oct. 24, 1993 at Thornden, Syracuse computed with Model 3.
Figure 15:
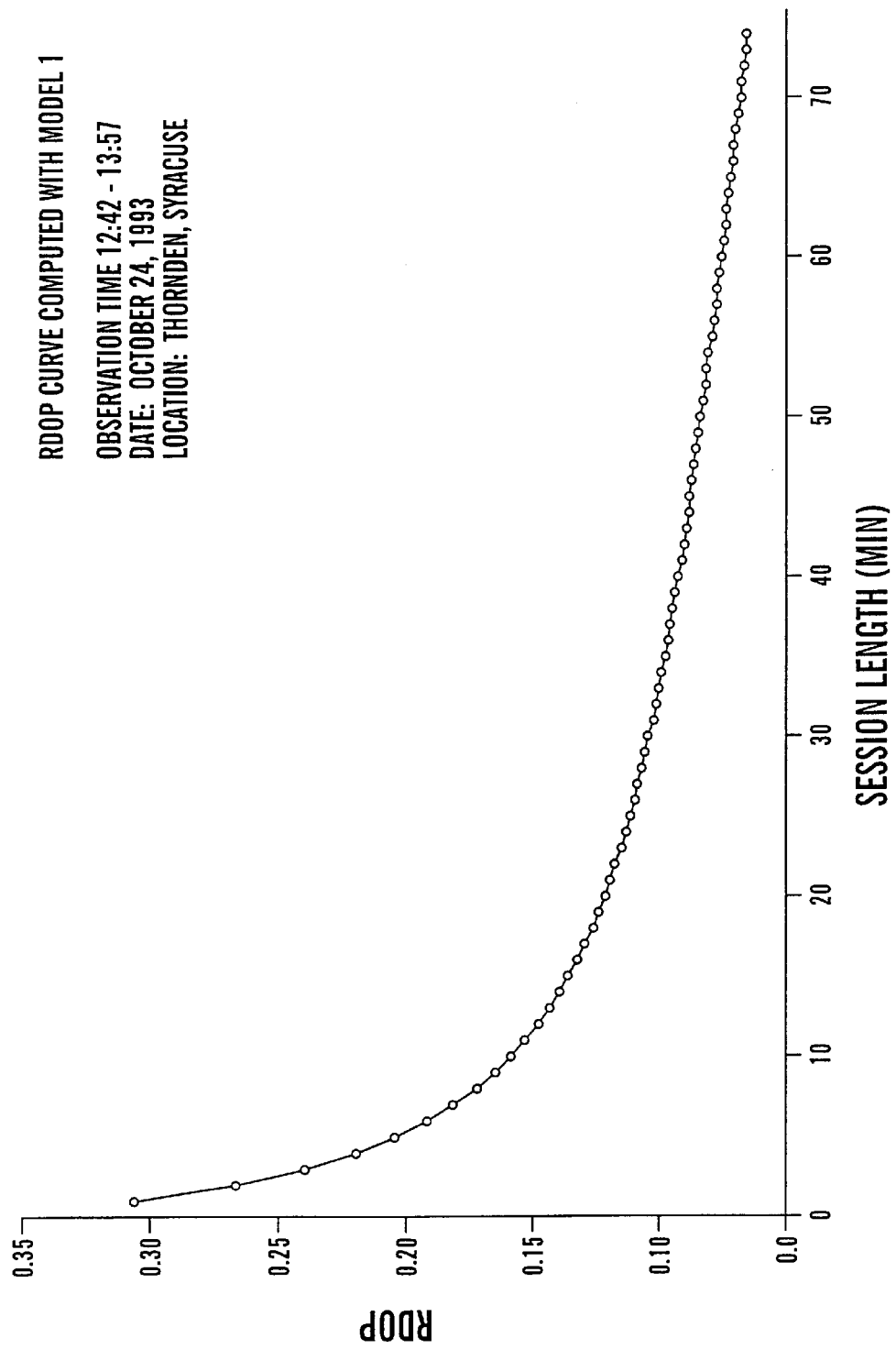
FIG. 15 The RDOP curve for the observation period 12:42–1357 on Oct. 24, 1993, at Thomden, Syracuse computed with model 1.

Comparing FIG. 14 with 15 it can be seen that the values of RDOP computed with model 1 are substantially smaller than those of the RDOP computed with model 3. The initial value of the RD OP at the beginning of the session computed with model 1 is less than 1. This means that subcentimeter accuracy can be obtained with as little as a few seconds of the data if the carrier phase ambiguities can be solved before carrier phase processing. This is consistent with the results reported by Remonth (1986, 1991).

Several techniques have been developed for the determination of the ambiguities for "kinematic" GPS relative positioning. One method is to place a pair of receivers on the two points of a predetermined baseline to collect GPS data from at least four satellites for several minutes. This precise initial baseline is called the starting baseline. The ambiguities can be determined based on the starting baseline and they serve as constants for all subsequent positions of the roving receiver as long as no loss of signal occurs and at least four satellites are in view. The starting baseline can be determined by either GPS static relative positioning or the antenna swap technique (Hofmann-Wellenhof and Remodi, 1988).

There are some limitations for the static initialization techniques described above in some kinematic GPS applications. A typical example is the instantaneous GPS positioning of a plane in motion. The technique of the determination of the ambiguities on-the-fly (OTF) has been developed in recent years for instantaneous ambiguity resolution (Hatch, 1990, Hwang, 1990; Remondi, 1991). Another technique is called rapid static relative positioning in which ambiguities can be determined with 5–10 minutes of data collected from at least 5 satellites (Loomis, 1989; Frei and Beutler, 1990; Mader, 1990; Frei, 1991). These two techniques can now be used for GPS relative positioning with distances less than 15 km.

The mathematical model of RDOP computer with Model 2 or Model 3 can be used for the optimum design of long distance static relative positioning which will be discussed in the next section.

9.2 Optimum GPS Survey Planning

A RDOP surface generated for a location on the Earth geometrically describes the effect of changing satellite geometry on the achievable accuracy of relative positioning for a certain period. The RDOP surface is generated based on the generalized mathematical model described in chapter 4. One of the applications of the RDOP surface is for optimum GPS survey planning.

In contrast to the commonly used values of PDOP which indicate the effect of the instantaneous satellite geometry at a single epoch on point positioning, the values of RDOP give information about the effect of the continuously changing satellite geometry over a certain observation period on relative positioning. Similar to PDOP, the lower the value of RDOP the better the solution of a GPS baseline. Specific values of RDOP with respect to certain starting times and observation intervals can be interpolated from the contour map.

9.2.1 Optimum Session Starting Time

Under certain accuracy requirements, the best session starting time over a twelve hour period can be derived based on the comparison of the values of the RDOP plot in the x direction.

Example 9.2 Find the best session starting time for GPS relative positioning at Thornden, Syracuse on Aug. 31, 1994 in the period 8:00–20:00 based on the RDOP contour map of FIG. 7. Assume the RDOP value of 30 is required for the baseline to be determined.

In FIG. 7 the minimum point of the RDOP curve 30 gives the best session starting time. The worst session starting time corresponds to the maximum point of that RDOP curve. The results are shown in Table 9.3.

TABLE 9.3

Comparison of Best and Worst Sessions

| Session | Starting time | End time | Session length | RDOP |
|---------|---------------|----------|----------------|------|
| 1 | 12:52 | 13:00 | 8 min | 30 |
| 2 | 14:25 | 15:23 | 58 min | 30 |

From Table 9.3 we can see that the best starting time is at 12:52 and the worst starting time is at 14:25. It only takes 8 minutes to achieve the value of RDOP 30 if one starts a session at 12:52 whereas it requires 58 minutes to get the same accuracy if a session starts a 14:25. As far as observation time is concerned, an improvement factor of more than 7 can be achieved.

Figure 16:
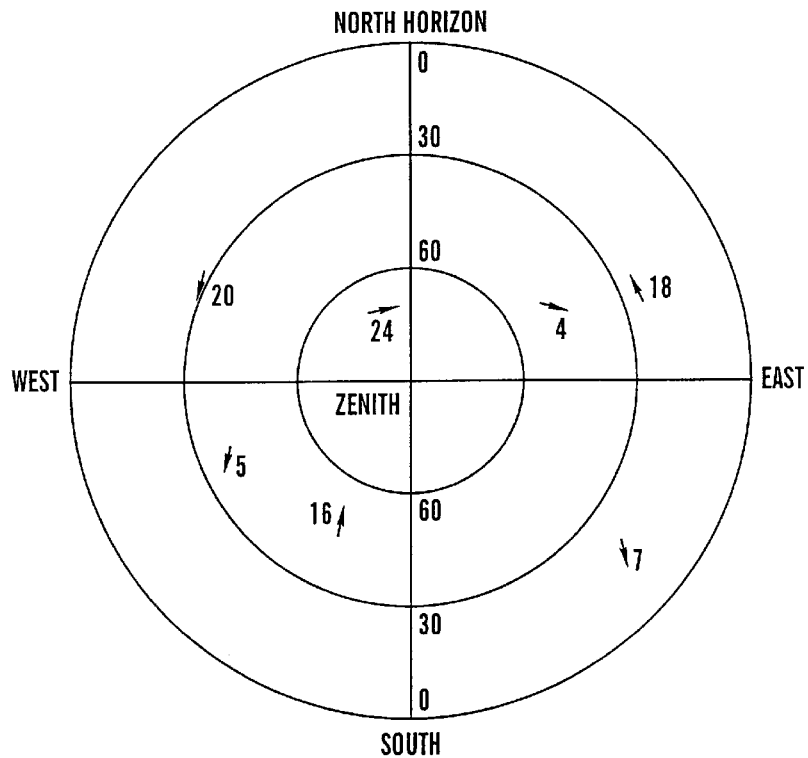
FIG. 16 Skyplot: A topocentric view of the GPS satellits movements from 12:52–13:00 on Aug. 31, 1994 at Thornden, Syracuse.
Figure 17:
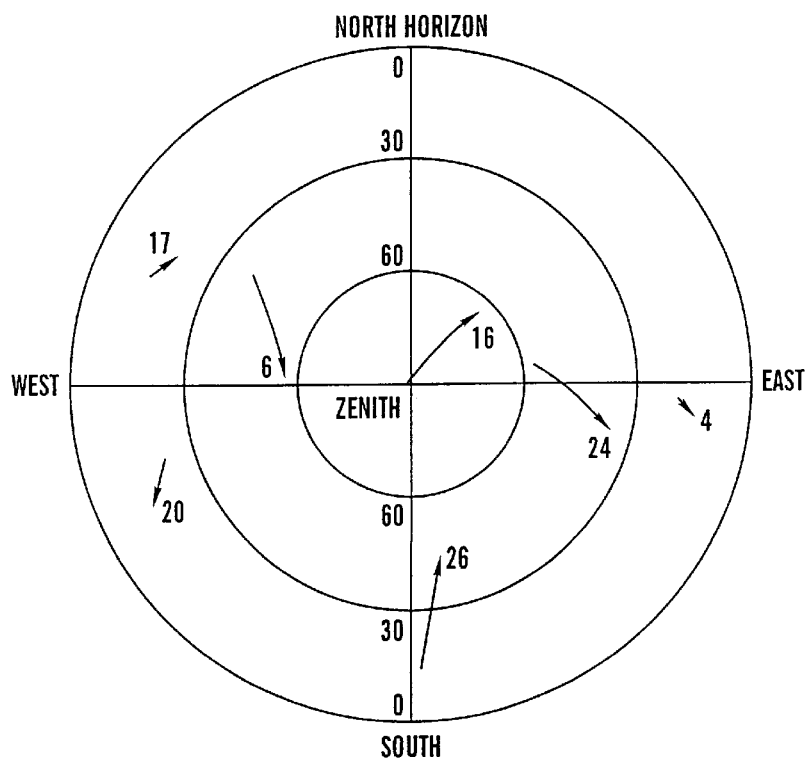
FIG. 17 Skyplot: A topcentric view of the GPS satellites movements from 14:25–152:23 on Aug. 31, 1994 at Thornden, Syracuse.

The relative movements of the GPS satellites during session 1 and session 2 are shown in FIGS. 16 and 17.

9.2.2 Optimum Observing Session Length

The value of RDOP is an inverse proportion to the session length. The required session length to reach a certain value of RDOP at a particular starting time can be interpolated in the y direction of the contour map. Using the same example as in FIG. 7.2 it can be seen that for a GPS baseline to be observed at a starting time of 10:00 on Aug. 31, 1994, at Thornden, Syracuse, it will take 11 minutes to reach the value of RDOP 30. If the value of RDOP 10 is required to get better accuracy for relative positioning, the necessary session length would be 27 minutes.

9.2.3 Optimum Observation Windows

The RDOP contour map of FIG. 7.2 shows the variability of RDOP during a 12 hour period. The five peaks in FIG. 7.2 represent five short periods during which the lowest accuracy would be obtained for the GPS baseline to be determined. The four troughs between the peaks represent the periods during which much higher accuracy can be achieved for GPS surveying. FIG. 7.2 shows that with the full 24 GPS satellite deployment, there are still several periods which are significantly better than others. Table 9.4 shows the periods during which RDOP 30 can be achieved with an observing session length of less than 15 minutes.

The four windows shown in the Table 9.4 give the optimum observation times with a total of 6 hours and 29 minutes in the 12 hour period. The RDOP contour map shows the optimum observation windows during which much higher accuracy can be obtained with relatively shorter observation lengths.

TABLE 9.4

Optimum Observation Windows

| Window | Starting time | End time | Window length | RDOP |
|--------|---------------|----------|---------------|------|
| 1 | 8:20 | 11:25 | 185 min | 30 |
| 2 | 11:50 | 13:52 | 122 min | 30 |
| 3 | 15:48 | 16:10 | 22 min | 30 |
| 4 | 17:55 | 18:55 | 60 min | 30 |

It is perhaps true that, with today's availability of the full satellite constellation, the variability of PDOP and session planning are not as significant as they once were. But it is only true for GPS navigation applications. For high accuracy GPS surveying, especially for long distance GPS baseline determination, there are time windows, as shown in Table 9.4, which are significantly better than others. The best accuracy with the shortest observation time for long distance GPS relative positioning can be achieved based on the information provided with the RDOP surface.

10. CONCLUSIONS

Three Models of RDOP

Three models of the RDOP have been investigated in this research to study the attainable accuracy of GPS relative positioning with respect to the effect of changing GSP satellite/station geometry, observation starting time, and session length. Based on the results and analysis presented in chapter 5 and chapter 9, The following conclusions have been drawn:

(1) Model 3 contains the complete accuracy information on GPS relative positioning. The cofactor matrix derived with model 3 includes the absolute accuracy of the two sites of the GPS baseline to be observed and the relative accuracy between the two sites. The value of the RDOP computed with model 3 is minimum. The RDOP value computed with model 3 reflects the effect of pure satellite/station geometry on GPS relative positioning.

(2) Model 2 contains the accuracy information of one site of the GPS baseline to be observed with respect to the fixed point. The accuracy computed with model 2 represents relative accuracy of a GPS baseline. The value of the RDOP computed with model 2 is always slightly larger than that of the RDOP computed with model 3 since it is affected by the errors contained in the fixed point as well as the satellite/station geometry.

(3) As far as the accuracy of the adjusted GPS vector, $\Delta X$, $\Delta$, $\Delta Z$, is concerned, model 3 and model 2 yield the same results. The only difference between model 3 and model 2 is the derived covariance matrix for the adjusted parameters, which gives a different view for GPS relative positioning.

(4) The least-squares GPS network adjustment with model 2 has been widely used because of its simplicity. The least-squares GPS network adjustment with model 3 has not been widely accepted and thoroughly understood because it involves the general inverse theory. Mathematically speaking model 3 is a generalized mathematical model and model 2 is a special case of model 3.

(5) One of the advantages of the generalized mathematical model 3 is that it is particularly suitable for GPS crustal motion monitoring and subsidence analysis. In earthquake active areas it is difficult to find a stable point as a fixed point which is required in Model 2. In model 3 all points are considered as unknowns and no point is required to be held fixed in the adjustment. The previously adjusted coordinates of all the stations can be used as the initial approximation values in the current adjustment. The adjusted GPS vectors computed with model 3 are optimum unbiased estimations. Therefore the relative movements of all the stations in the earthquake area can be evaluated and the stable points and subsiding points can be identified.

(6) Model 1 yields the accuracy information about kinematic GPS relative positioning in which the only unknowns carried in carrier phase processing are the coordinates of one point of the baseline. The values of the RDOP curve computed with model 1 show that subcentimeter accuracy can be achieved with as little as a few seconds of data for short distance kinematic relative positioning if the cycle ambiguities can be determined before the carrier phase processing.

Array Algebra Filtering

An array algebra filtering technique has been developed in this research for the fast generation of the RDOP surface. The following characteristics of this filtering technique were noted:

(1) Array algebra filtering is an extension of Kalman filtering. Array algebra filtering converts a singular system into nonsingular case by choosing a matrix $A_0$ from the row space of A with the condition of $R(A_0)= R(A)$. Any choice of r $R(A)$ independent $A_{0x}$ among AX spans an unbiased estimable space. Thus the inversion of a singular matrix A can be solved by conventional inversion rules of a non-singular case. Array algebra filtering provides a unique solution for a dynamic singular system.

(2) The array algebra filtering technique processes GSP data in an "on line" mode with real-time computational capability. The array algebra filtering technique processes GPS data on an epoch by epoch basis and gives the current estimates and their accuracy based on all the observations that have been collected to that point. Thus it is particularly suitable for real-time GPS data processing and real-time accuracy prediction.

(3) In array algebra filtering the previous estimates are updated based on the new observations. Therefore in each step only the inversion of a smaller matrix related to the new observations is needed and the previous observations are not required to be stored in memory. Consequently substantially less storage is required and a fast processing speed can be achieved.

Optimum Design with the RDOP Surface

A RDOP surface was generated based on the mathematical model of RDOP derived in chapter 4. The geometric meaning of the RDOP surface was given in chapter 7. One of the applications of the RDOP surface is the optimum planning for high precision long distance GPS static relative positioning. An example was given in chapter 9. The conclusions are:

(1) It is perhaps true that, with today's availability of the full satellite constellation, the variability of PDOP and session planning are not as significant as they once were. But it is only true for GPS navigation applications. For high accuracy GPS surveying, especially for long distance GPS baseline determination, there are time windows, as shown in Table 9.4, which are significantly better than others. Based on the RDOP surface generated for Thomden, Syracuse on Aug. 31, 1994 an improvement factor of more than 7 in the session length can be achieved.

(2) The RDOP is an accuracy indicator for static relative positioning which is governed by the continuous changing satellite geometry which occurs from the starting time to the end of a session. At each epoch the instantaneous satellite-station geometry can be expressed by PDOP. The initial value of the RDOP at the beginning of a session is directly related to that of PDOP. This coincidence changes as a result of the shift of the RDOP when the session length gets longer. The shift of the RDOP curve as a function of session length is an important phenomenon discovered in this research which shows the inner relationship between RDOP and PDOP.

(3) The widely accepted belief that a low PDOP indicates good satellite/station geometry for a GPS survey is not true for relative positioning- The best accuracy with the shortest observation time for long distance GPS relative positioning can be achieved based on the information provided with the RDOP surface derived in this research.

Recommendations (1) For application purposes the mathematical model and method that have been developed based on RDOP in this research should be further verified with additional test observations. The data set can then be divided into subsets with different observation starting times and session lengths. The mathematical model can be verified by comparing the predicted values of RDOP with the computed values. Also, with an accurately determined baseline, the predicted relative accuracy and absolute accuracy can be verified with the computed values.

(2) The system noise presented in the dynamic system model described in chapter 6 affects the accuracy of relative positioning. The system noise varies with time. One of the limitations of the conventional least-squares batch solution is that it can not accommodate system noise in the random mode. The sequential array algebra filtering described in this dissertation is a stochastic estimation technique which is capable of dealing with the random system noise. This feature should be further explored for real-time GPS data processing and real-time accuracy prediction.

(3) A RDOP surface shows the effect of changing satelhte geometry on the achievable accuracy of GPS relative positioning for a certain location on the Earth. The RDOP surface varies with different locations on the Earth. The accuracy of GPS relative positioning could be studied on a global basis with RDOP surfaces generated for different locations on the Earth.

REFERENCES

Bierman, G. J., (1977). Factorization Methods for Discrete Sequential Estimation. New York, Academic Press.

Bietsos, N. A. (1986). Effect of Satellite Position Errors on GPS Relative Navigation, presented at AIAA Guidance, Navigation & Control Conference, Aug. 118–20, 1986, Williamsburg, Va., U.S.A.

Bjerhammar, A., (1973). Theory of Errors and Generalized Matrix Inverses. Amsterdam, N.Y., Elsevier Wetenschappelijke Uitgenerij.

Bjerhammar, A., (1975). Reflexive Prediction, Vermessung, Photogrammetrie, Kulturtechnik, 73: 3,4.

Blaha, G., (1977a). A Few Basic Principles and Techniques of Array Algebra. Bull. Geod., 77: 3.

Blaha, G., (1977b). Least Squares Prediction and filtering in Any Dimensions Using the Principles of Array Algebra. Bull. Geod., 77:4.

Blaha, G., (1987). Nonlinear Parametric Least-Squares Adjustment. Scientific Report No. 1, Air Force Geophysics Laboratory, Hanscom AFB, Mass. 01731.

Bossier, J. D., (1973). A Note on the Meaning of Generalized Inverse Solutions in Geodesy, JGR 78:14.

Brown, D. C. and J. E. Trotter, (1969). SAGA, A computer Program for Short Arc Geodetic Adjustment of Satellite Observations, AFCRL Final Report of Contract F19628–68-C0093.

Brown, D. C., (1955). A Matrix Treatment of the General Problem of Least Squares Considering Correlated Observations, Ballistic Research Laboratory, Report No. 937, Aberdeen, Md.

Brown, D. C., (1958). A Solution to the General Problem of Multiple Station Analytical Stereotriangulation, AF Missile Test Center Technical Report No. 58-8.

Brown, D. C., N. Bush and J. Sibol, (1963). Study of the Feasibility of Roket and Satellite Approaches to the Calibration of Tracking Systems, AF Cambridge Research Labs, Report No. 63-789.

Brown, R. G., (1983). Introduction to Random Signal Analysis and Kalman Filtering. John Wiley & Sons, Inc.

Cooley, J., and J. Tukey, (1965). An Algorithm for Machine Computation of Complex Fourier Series, Math. Comput. Vol. 19.

Copps, E. M., G. J. Geier, W. C. Fidler and P. A. Grundy, (1980). Optimal Processing of GPS Signals, Navigation, Journal of the Institute of Navigation, Vol. 27, No. 3, pp 171–182.

FGCC, (1988). Geometric Geodetic Accuracy Standards and Specifications for Using GPS Relative Positioning Techniques (Version 5.0, May 1988), Federal Geodetic Control Committee, 6001 Executive Blvd., Rockville, Md., U.S.A.

Frei, E., (1991). GPS—Fast Ambiguity Resolution Approach "FARA": Theory and Application. Presented Paper at XX General Assembly of IUGG. IAG-Symposium GM 1/4, Vienna, Aug. 11–24.

Frei, E., and Beutler G., (1990). Rapid Static Positioning Based on the Fast Ambiguity Resolution Approach: The Alternative to Kinematic Positioning. In: Proceedings of the Second International Symposium on Precise Positioning with the Global Positioning System, Ottawa, Canada, Sep. 3–7, 1196–1216.

Goad, C. C. and C. D. Chadwell (1993). Investigation for Improving Global Position System (GPS) Orbits Using a Discrete Sequential Estimator and Stochastic Models of Selected Physical Processes. NASA Contractor Report, NASA CR-194167.

Goad, C. C., (1989). Kinematic Survey of Clinton Lake Dam, Journal of Surveying Engineering, Vol. 115, No. 1.

Grafarend, E. and B. Schaffrin, (1974). Unbiased Free Net Adjustment, Survey Review, XII, 171.

Hatch, R., (1990). Instantaneous Ambiguity Resolution. In: Schwarz K. P., Lachapelle G. (eds): Kinematic Systems in Geodesy, Surveying and Remote Sensing. Springer, New York Berlin Heidelberg London Paris Tokyo Hong Kong, 299–308 [Mueller II (ed); IAG Symposia Proceedings, Vol. 107].

Hatch, R. R. and E. V. Avery. (1989). A Strategic Planning Tool for GPS Surveys, Journal of Surveying Engineering, Vol. 115, No. 1.

Hofmann-Wellenhof B and Remondi B. W., (1988). The Antenna Exchange: One Aspect of High-Precision GPS Kinematic Survey. In: Groten E, Strauβ R (eds): GPS—Techniques Applied to Geodesy and Surveying. Springer, Berlin Heidelberg New York London Paris Tokyo, 261–277.

Hwang, P. Y. C., (1990). Kinematic GPS: Resolving Integer Ambiguities On a the Fly. In: Proceedings of the IEEE Position Location and Navigation Symposium, Las Vegas, March 20–23, 579–586.

IGACSM. (1988). Standards and Specifications for Control Surveys (Draft 6, August 1988), Inter-Government Advisory Committee on Surveying and Mapping, Canberra, Australia.

Jancaitis, J. R. and R. L. Magee, (1977). Investigation of the Application of Array Algebra to Terrain Modeling. Paper presented at joint annual spring Convention, ASP & ACSM, Washington, D. C.

Kalman, R. E. and R. Bucy, (1961). New Results in Linear Filtering and Prediction, Journal of Basic Engineering (ASME), 83D, 95–108.

Kalman, R. E., (1960). A New Approach to Linear Filtering and Prediction. Journal of Basic Engineering (ASME), 82D, 34–35.

Landau, H. and B. Eissfeller, (1985). Optimization of GPS Satellite Selection for High Precision differential Positioning, Schriftenreihe Vermessungswesen, University of the Federal Armed Forces Munich, Report 19, 65–105.

Leick, A. (1980). Adjustment Computations. Lecture Notes, University of Maine, Orono, Me.

Leick, A (1984). GPS Surveying and Data Management, Proceedings: 22nd annual Conference of the Urban and Regional Information Systems Association(URISA), Seattle, August.

Leick, A. (1990). GPS Satellite Surveying. John Wiley & Sons, Inc.

Leick, A. and M. B. Emmons, (1994). Quality Control with Reliability for Large GPS networks, Journal of Surveying Engineering, Vol. 120, No. 1.

Loomis, P., (1989) A Kinematic GPS Double-differencing Algorithm. In: Proceedings of the Fifth International Geodetic Symposium on Satellite Positioning, Las Cruces, N.M., Mar. 13–17, Vol. 2: 611–620.

Mader, G. L., (1990). Ambiguity Function Techniques for GPS Phase Initialization and Kinematic Solutions. In: Proceedings of the Second International Symposium on Precise Positioning with the Global Positioning System, Ottawa, Canada, Sep. 3–7, 1233–1247.

Meissl, P., (1971). Theoretical Analysis of Random Error Propagation in Large Photogrammetric Blocks. Proceedings of ASP Fall Meeting, pp. 751–770, San Frncisco, Sep. 7–11.

Meissl, P., (1980). A Priori Prediction of Roundoff Error Accumulation in the Solution of Super-Large Geodetic Normal Equation System, NOAA Professional Paper 12.

Merminod, B., (1990). The resolution of the Cycle Ambiguities, UNISURV S-38, Report of the School of Surveying, University of New South Wales, Sydney, Australia, 204 pp.

Merminod, B., D. B. Grant and C. Rizos, (1990). Planning GPS Surveys—Using Appropriate Precision Indicators, CISM Journal ACSGC Vol. 44, No. 3, pp. 233–249.

Mikhail, E. M. and Helmering, R. J., (1973). Recursive Methods in Photogrammetric Data Reduction. Photogrammetric Enginering, Vol. 9, pp 983–989.

Milliken, R. J. and C. J. Zoller, (1978). Principle of Operation of NAVSTAR and System Characteristics, Navigation, Journal of the Institute of Navigation, Vol. 25, No. 2, (special issue on GPS), PP 95–106.

Mitra, S. K. and M. P. Ekstorm (Editors), (1978). Two-dimensional Digital Processing. Benchmark Papers in Electrical Engineering and Computer Science, Vol. 20, Dowden, Hutchinson Ross, Inc., Pa.

Mittermayer, E. (1971). Eine Verallgemeinerung der Methode der kleinsten Qundrate zur ausglerchung freier Netze. Z.f.V.(11).

Moritz, H., (1972). Advanced Least-Squares Methods. Department of Geodetic Science, Report No. 175, The Ohio State University, Columbus.

Moritz, H., (1978). Least-Squares Collocation. Reviews of Geophysics and Space Physics, Vol. 16, No. 3.

Mueller, I. I., (1964). Introduction to Satellite Geodesy. Frederick Unger Publishing Co., Inc.

Norton, T., (1987). Monitoring the Precision of Relative GPS Positioning:, Proceedings Centernary GPS Conference, Department of Land Information, Royal Melbourne Institute of Technology, Aug. 24–26, 1987, Melbourne, Australia.

Perelmuter, A. (1979). The Adjustment of Free Nets. Bulletin Geodesique, (4).

Pope, A. J., (1974). Modern Trends in Adjustment Calculus. Presented Paper in Symposium of North American Geodetic Networks, New Brunswick.

Pope, A. J. (1971). Transformation of Covariance Matrices Due to Changes in Minimal Control, Paper presented at the American Geophysical Union Fall Meeting, San Francisco.

Pratt, W. K. (1972). Generalized Wiener Filtering Computation Techniques, IEEE Trans. Computers C-21(7).

Rao C. R. and S. K Mitra, (1971). Generalized Inverse of Matrices and Its Application, Wiley, New York.

Rapatz, P. J. V., M. Craymer, A. Kleusberf, R. B. Langley, S. H. Quek, J. Tranquilla and D. E. Wells, (1987). Procedures and Specifications for Urban GPS Surveys, Report of the Department of surveying Engineering, University of New Brunswick, Canada.

Rauhala, U. A., (1972). Calculus of Matrix Arrays and General Polynomial and Harmonic Interpolation by Least Squares with New Solutions in Photogrammetry and Geodesy, Fot. Medd. VI: 4, Department of Photogrammetry, Royal Institute of Technology, Stockholm.

Rauhala, U. A., (1974). Array Algebra with Application in Photogrammetry and Geodesy. Fot. Medd. VI: 6, Stockholm. Department of Photogrammetry, Royal Institute of Technology, Stockholm.

Rauhala, U. A., (1975). Calculation of Loop Inverses. ASP Spring Convention, March, Washington, D.C.

Rauhala, U. A., (1976). A Review of Array Algebra, Fot. Medd. 2:38, KTH, Stockholm.

Rauhala, U. A., (1977). Array Algebra as General Base of Fast Transforms, Mitrteilungen der Geodatischen Institute Der Techinischen Universität Graz, Folge 29, Graz.

Rauhala, U. A., (1978). Loop Inverses and Array Algebra as Geodetic Tools. Presented Paper of AGU Fall Meeting, San Francisco, Dec. 4–8.

Rauhala, U. A., (1979). Development of Experimental Array Algebra Algorithms for Filtering and Compaction of AS-11B-X and Seasat Altimetry Data, Final Report to DMSSC, Contract 700–78-C0022.

Rauhala, U. A., (1980a). Introduction to Array Algebra, Photogrammetric Engineering and Remote Sensing, Vol. 46, No. 2.

Rauhala, U. A., (1980b). Development of Algebra Algorithms for finite Element Filtering, Final Report to DMAAC, Contract 700-78-C-0022 P 00002.

Rauhala, U. A., (1981a). Sequential Array Algebra Using Direct Solution of Eigenvectors, Bull. Geod. No. 2.

Rauhala, U. A., (1981b). Note on General Linear Estimators and Matrix Inverses. Manuscript Geodaetica, Vol 6.

Rauhala, U. A., (1982). Array Algebra Estimation in Signal Processing. Photogrammetric Engineering and Remote Sensing, No. 9.

Rauhala, U. A., (1984). Array Algebra approach of Self-Calibrating Inertial Traverse and Net Adjustments. ACSM Spring Meeting, Washington, D. C.

Rauhala, U. A., (1986). Complier Positioning of Array Algebra Technology. Int. Arch. of ISPRS, Vol. 26-3/3, Comm. III symposium, Rovaniemi.

Rauhala, U. A., (1987). Fast Compiler Positioning Algorithms and Techniques of Array algebra in Analytical and Digital Photogrammetry. Proceedings of Intercommission ISPRS Conference on Fast Processing of Photogrammetric Data, Interlaken, Jun. 2–4.

Rauhala, U. A., (1989). Compiler Positioning System: An Array Algebra Formulation of Digital Photogrammetry. Photogrammetric Engineering and Remote Sensing, Vol. 65, No. 2.

Remondi, B. W., (1984). Using the Global Positioning System (GPS) Phase Observable for Relative Geodesy: Modeling, Processing and Results. University of Texas at Austin, Center for Space Research.

Remondi, B. W., (1986). Performing Centimeter-level Surveys in Seconds with GPS Carrier Phase: Initial Results. Proceeding of the Fourth International Geodetic Symposium on Satellite Positioning, Austin, Tex., Vol. 2: 1229–1249.

Remondi, B. W., (1991). Kinematic GPS Results without Static Initialization. National Information Center, Rockville, Md., NOOA Technical Memorandum NOS NGS-55.

Schutz, B. E., (1993). GPS Geodesy: Vector Baselines, Earth Rotation and Reference Frames. NASA Contract Report, NASA CR-193184.

Snay, R. A., (1978). Applicability of Array Algebra, Reviews of Geophysics and Space Physics, Vol. 16, No. 3, pp. 459–464.

Strang van Hees, G. L., (1981). Collocation and Adjustment, Zeitschri für Vermessungswesen 5.

Tao, Bencao, (1984). Free Net Adjustment and Deformation Analysis. Surveying and Mapping Publish House, Beijing.

Trimble, (1989). TRIMVEC-PLUS GPS Survey Software User's Manual and Technical Reference Guide. Part Number 12351, p. 5–30.

Uotila, U. A., (1973). Sequential Solutions with Observation Equations. Department of Geodetic Science, Report No. 178, The Ohio State University, Columbus.

Williams, H. S., (1972). A Theorem in Least Squares. Photogrammetric Enginering, Vol 11: pp 1127–1133.

Wooden, W. H., (1985). Navstar Global Positioning System: 1985. In: Proceedings of the First International Symposium on Precise Positioning with the Global Positioning system, Rockville, Md., April 15–19, VoL 1: 403–412.

Yang, Xinyu and R. Brock, (1993). Objective Quality Control of GPS Network with Inner Constraint Solution by Loop Inverse. ACSM/ASPRS Convention, Vol. 3: 435–444.

88

APPENDIX A

ALMANAC FILES

89

A.1 Almanac file 102493.alm

```
**** Week 721 almanac for SV-01 ****GPSIC****
ID:                        01
Health:                    000
Eccentricity:              3.6582946777E-003
Time of Applicability(s):  294912.0000
Orbital Inclination(rad):  0.9560859144
Rate of Right Ascen(r/s):  -7.7603232486E-009
SQRT(A)   (m^1/2):         5153.594668
Right Ascen at TOA(rad):   2.9452319145E+000
Argument of Perigee(rad):  -1.114766240
Mean Anom(rad):            2.4232251644E+000
Af0(s):                    0.0000000000E+000
Af1(s/s):                  0.0000000000E+000
Week:                      721

**** Week 721 almanac for SV-02 ****GPSIC****
ID:                        02
Health:                    000
Eccentricity:              1.2437820435E-002
Time of Applicability(s):  294912.0000
Orbital Inclination(rad):  0.9555106622
Rate of Right Ascen(r/s):  -8.2860594333E-009
SQRT(A)   (m^1/2):         5153.598549
Right Ascen at TOA(rad):   -1.2845108509E+000
Argument of Perigee(rad):  -2.717437983
Mean Anom(rad):            -1.0966666937E+000
Af0(s):                    0.0000000000E+000
Af1(s/s):                  0.0000000000E+000
Week:                      721

****.Week 721 almanac for SV-03 ****GPSIC****
ID:                        03
Health:                    000
Eccentricity:              1.3353347778E-002
Time of Applicability(s):  294912.0000
Orbital Inclination(rad):  1.1276040983
Rate of Right Ascen(r/s):  -5.9316756495E-009
SQRT(A)   (m^1/2):         5153.684507
Right Ascen at TOA(rad):   1.8974360824E-001
Argument of Perigee(rad):  +2.459022522
Mean Anom(rad):            2.3226428032E+000
Af0(s):                    0.0000000000E+000
Af1(s/s):                  0.0000000000E+000
Week:                      721

**** Week 721 almanac for SV-05 ****GPSIC****
ID:                        05
Health:                    000
Eccentricity:              2.5897026062E-003
```

90

```
Time of Applicability(s):    294912.0000
Orbital Inclination(rad):    0.9578415676
Rate of Right Ascen(r/s):    -8.2746303859E-009
SQRT(A)   (m^1/2):           5153.691493
Right Ascen at TOA(rad):     -1.2710386515E+000
Argument of Perigee(rad):    -2.374630451
Mean Anom(rad):              3.0957279205E+000
Af0(s):                      0.0000000000E+000
Af1(s/s):                    0.0000000000E+000
Week:                        721

**** Week 721 almanac for SV-07 ****GPSIC****
ID:                          07
Health:                      000
Eccentricity:                6.0667991638E-003
Time of Applicability(s):    294912.0000
Orbital Inclination(rad):    0.9609215431
Rate of Right Ascen(r/s):    -7.9089008660E-009
SQRT(A)   (m^1/2):           5153.550815
Right Ascen at TOA(rad):     -2.2213922441E-001
Argument of Perigee(rad):    -2.789667368
Mean Anom(rad):              -2.0792768002E+000
Af0(s):                      0.0000000000E+000
Af1(s/s):                    0.0000000000E+000
Week:                        721

**** Week 721 almanac for SV-12 ****GPSIC****
ID:                          12
Health:                      000
Eccentricity:                1.3885974884E-002
Time of Applicability(s):    294912.0000
Orbital Inclination(rad):    1.09048895500
Rate of Right Ascen(r/s):    -6.5717023092E-009
SQRT(A)   (m^1/2):           5153.576622
Right Ascen at TOA(rad):     -1.9823057652E+000
Argument of Perigee(rad):    -0.238240406
Mean Anom(rad):              1.6635370255E+000
Af0(s):                      0.0000000000E+000
Af1(s/s):                    0.0000000000E+000
Week:                        721

**** Week 721 almanac for SV-13 ****GPSIC****
ID:                          13
Health:                      000
Eccentricity:                5.3439140320E-003
Time of Applicability(s):    294912.0000
Orbital Inclination(rad):    1.1144094780
Rate of Right Ascen(r/s):    -6.1031113619E-009
SQRT(A)   (m^1/2):           5153.700224
Right Ascen at TOA(rad):     1.5462158620E-001
Argument of Perigee(rad):    -2.530858517
Mean Anom(rad):              3.1068978310E+000
Af0(s):                      0.0000000000E+000
Af1(s/s):                    0.0000000000E+000
Week:                        721
```

91

```
**** Week 721 almanac for SV-14 ****GPSIC****
ID:                          14
Health:                      000
Eccentricity:                3.5953521729E-003
Time of Applicability(s):    294912.0000
Orbital Inclination(rad):    0.9607836715
Rate of Right Ascen(r/s):    -7.9660461035E-009
SQRT(A)   (m^1/2):           5153.578174
Right Ascen at TOA(rad):     1.9093738794E+000
Argument of Perigee(rad):    +2.958189487
Mean Anom(rad):              -2.4651591778E+000
Af0(s):                      0.0000000000E+000
Af1(s/s):                    0.0000000000E+000
Week:                        721

**** Week 721 almanac for SV-15 ****GPSIC****
ID:                          15
Health:                      000
Eccentricity:                7.1372985840E-003
Time of Applicability(s):    294912.0000
Orbital Inclination(rad):    0.9655594125
Rate of Right Ascen(r/s):    -7.6460327737E-009
SQRT(A)   (m^1/2):           5153.689940
Right Ascen at TOA(rad):     8.7340617180E-001
Argument of Perigee(rad):    +1.856795311
Mean Anom(rad):              -8.4138244390E-002
Af0(s):                      0.0000000000E+000
Af1(s/s):                    0.0000000000E+000
Week:                        721

**** Week 721 almanac for SV-16 ****GPSIC****
ID:                          16
Health:                      000
Eccentricity:                4.9161911011E-004
Time of Applicability(s):    294912.0000
Orbital Inclination(rad):    0.9577577117
Rate of Right Ascen(r/s):    -7.9889041985E-009
SQRT(A)   (m^1/2):           5153.697702
Right Ascen at TOA(rad):     1.9208046198E+000
Argument of Perigee(rad):    -2.622760773
Mean Anom(rad):              8.9224874973E-001
Af0(s):                      0.0000000000E+000
Af1(s/s):                    0.0000000000E+000
Week:                        721

**** Week 721 almanac for SV-17 ****GPSIC****
ID:                          17
Health:                      000
Eccentricity:                7.4186325073E-003
Time of Applicability(s):    294912.0000
Orbital Inclination(rad):    0.9667877793
Rate of Right Ascen(r/s):    -7.6574618212E-009
SQRT(A)   (m^1/2):           5153.597190
Right Ascen at TOA(rad):     9.0740096569E-001
```

92

```
Argument of Perigee(rad):   +1.783454537
Mean Anom(rad):             2.2778232098E+000
Af0(s):                     0.0000000000E+000
Af1(s/s):                   0.0000000000E+000
Week:                       721

**** Week 721 almanac for SV-18 ****GPSIC****
ID:                         18
Health:                     000
Eccentricity:               5.4779052734E-003
Time of Applicability(s):   294912.0000
Orbital Inclination(rad):   0.9442754184
Rate of Right Ascen(r/s):   -7.9317589610E-009
SQRT(A)   (m^1/2):          5153.603982
Right Ascen at TOA(rad):    2.9050829411E+000
Argument of Perigee(rad):   +1.242330432
Mean Anom(rad):             -2.3036324978E+000
Af0(s):                     0.0000000000E+000
Af1(s/s):                   0.0000000000E+000
Week:                       721

**** Week 721 almanac for SV-19 ****GPSIC****
ID:                         19
Health:                     000
Eccentricity:               5.4073333740E-004
Time of Applicability(s):   294912.0000
Orbital Inclination(rad):   0.9376780925
Rate of Right Ascen(r/s):   -8.0117622935E-009
SQRT(A)   (m^1/2):          5153.641043
Right Ascen at TOA(rad):    -2.3236434460E+000
Argument of Perigee(rad):   -0.563364923
Mean Anom(rad):             -1.5910372734E+000
Af0(s):                     0.0000000000E+000
Af1(s/s):                   0.0000000000E+000
Week:                       721

**** Week 721 almanac for SV-20 ****GPSIC****
ID:                         20
Health:                     000
Eccentricity:               4.2510032654E-003
Time of Applicability(s):   294912.0000
Orbital Inclination(rad):   0.9614188724
Rate of Right Ascen(r/s):   -8.2517722909E-009
SQRT(A)   (m^1/2):          5153.627848
Right Ascen at TOA(rad):    -1.2767685652E+000
Argument of Perigee(rad):   +1.489542484
Mean Anom(rad):             -1.3828694820E+000
Af0(s):                     0.0000000000E+000
Af1(s/s):                   0.0000000000E+000
Week:                       721

**** Week 721 almanac for SV-21 ****GPSIC****
ID:                         21
Health:                     000
Eccentricity:               1.0909080505E-002
```

93

```
Time of Applicability(s):    294912.0000
Orbital Inclination(rad):    0.9545099461
Rate of Right Ascen(r/s):   -8.0117622935E-009
SQRT(A)    (m^1/2):          5153.615818
Right Ascen at TOA(rad):     1.8809293509E+000
Argument of Perigee(rad):   +2.681552649
Mean Anom(rad):             -2.7677491307E-001
Af0(s):                      0.0000000000E+000
Af1(s/s):                    0.0000000000E+000
Week:                        721

**** Week 721 almanac for SV-22 ****GPSIC****
ID:                          22
Health:                      000
Eccentricity:                6.7653656006E-003
Time of Applicability(s):    294912.0000
Orbital Inclination(rad):    0.9556724473
Rate of Right Ascen(r/s):   -8.2860594333E-009
SQRT(A)    (m^1/2):          5153.705075
Right Ascen at TOA(rad):    -1.2693020105E+000
Argument of Perigee(rad):   -0.385535151
Mean Anom(rad):             -1.0193796158E+000
Af0(s):                      0.0000000000E+000
Af1(s/s):                    0.0000000000E+000
Week:                        721

**** Week 721 almanac for SV-23 ****GPSIC****
ID:                          23
Health:                      000
Eccentricity:                7.5182914734E-003
Time of Applicability(s):    294912.0000
Orbital Inclination(rad):    0.9582250649
Rate of Right Ascen(r/s):   -7.9889041985E-009
SQRT(A)    (m^1/2):          5153.536068
Right Ascen at TOA(rad):     1.9131388664E+000
Argument of Perigee(rad):   -2.429558277
Mean Anom(rad):             -9.6764564514E-001
Af0(s):                      0.0000000090E+000
Af1(s/s):                    0.0000000000E+000
Week:                        721

**** Week 721 almanac for SV-24 ****GPSIC****
ID:                          24
Health:                      000
Eccentricity:                5.0816535950E-003
Time of Applicability(s):    294912.0000
Orbital Inclination(rad):    0.9708684491
Rate of Right Ascen(r/s):   -7.5888875362E-009
SQRT(A)    (m^1/2):          5153.540919
Right Ascen at TOA(rad):     8.2988023758E-001
Argument of Perigee(rad):   -2.269068480
Mean Anom(rad):              1.7404959202E+000
Af0(s):                      0.0000000000E+000
Af1(s/s):                    0.0000000000E+000
Week:                        721
```

94

```
**** Week 721 almanac for SV-25 ****GPSIC****
ID:                         25
Health:                     000
Eccentricity:               5.7849884033E-003
Time of Applicability(s):   294912.0000
Orbital Inclination(rad):   0.9473374177
Rate of Right Ascen(r/s):   -7.9431880085E-009
SQRT(A)   (m^1/2):          5153.648028
Right Ascen at TOA(rad):    -2.3252654076E+000
Argument of Perigee(rad):   +2.745900154
Mean Anom(rad):             -2.7124612331E+000
Af0(s):                     0.0000000000E+000
Af1(s/s):                   0.0000000000E+000
Week:                       721

**** Week 721 almanac for SV-26 ****GPSIC****
ID:                         26
Health:                     000
Eccentricity:               8.1000328064E-003
Time of Applicability(s):   294912.0000
Orbital Inclination(rad):   0.9589441073
Rate of Right Ascen(r/s):   -7.7603232486E-009
SQRT(A)   (m^1/2):          5153.540919
Right Ascen at TOA(rad):    2.9229884148E+000
Argument of Perigee(rad):   -1.153300047
Mean Anom(rad):             -1.9506992102E+000
Af0(s):                     0.0000000000E+000
Af1(s/s):                   0.0000000000E+000
Week:                       721

**** Week 721 almanac for SV-27 ****GPSIC****
ID:                         27
Health:                     000
Eccentricity:               1.0575294495E-002
Time of Applicability(s):   294912.0000
Orbital Inclination(rad):   0.9511244062
Rate of Right Ascen(r/s):   -7.8974718185E-009
SQRT(A)   (m^1/2):          5153.583414
Right Ascen at TOA(rad):    -2.3138284683E+000
Argument of Perigee(rad):   +2.296474457
Mean Anom(rad):             1.3769073486E+000
Af0(s):                     0.0000000000E+000
Af1(s/s):                   0.0000000000E+000
Week:                       721

**** Week 721 almanac for SV-28 ****GPSIC****
ID:                         28
Health:                     000
Eccentricity:               6.0772895813E-003
Time of Applicability(s):   294912.0000
Orbital Inclination(rad):   0.9688790322
Rate of Right Ascen(r/s):   -7.8403265811E-009
SQRT(A)   (m^1/2):          5153.639685
Right Ascen at TOA(rad):    -2.1608680487E-001
```

95

```
Argument of Perigee(rad):   +2.872140408
Mean Anom(rad):             7.8561609983E-001
Af0(s):                     0.0000000000E+000
Af1(s/s):                   0.0000000000E+000
Week:                       721

**** Week 721 almanac for SV-29 ****GPSIC****
ID:                         29
Health:                     000
Eccentricity:               5.0721168518E-003
Time of Applicability(s):   294912.0000
Orbital Inclination(rad):   0.9548035606
Rate of Right Ascen(r/s):   -7.8174684861E-009
SQRT(A)  (m^1/2):           5153.560517
Right Ascen at TOA(rad):    2.9023373127E+000
Argument of Perigee(rad):   -1.805274487
Mean Anom(rad):             1.3602195978E+000
Af0(s):                     0.0000000000E+000
Af1(s/s):                   0.0000000000E+000
Week:                       721

**** Week 721 almanac for SV-31 ****GPSIC****
ID:                         31
Health:                     000
Eccentricity:               4.3001174927E-003
Time of Applicability(s):   294912.0000
Orbital Inclination(rad):   0.9602983400
Rate of Right Ascen(r/s):   -7.9546170560E-009
SQRT(A)  (m^1/2):           5153.712448
Right Ascen at TOA(rad):    -2.1866753697E-001
Argument of Perigee(rad):   +0.644975245
Mean Anom(rad):             2.3805344105E+000
Af0(s):                     0.0000000000E+000
Af1(s/s):                   0.0000000000E+000
Week:                       721
```

A.2 Almanac file 083194.alm

```
**** Week 764 almanac for SV-01 ****GPSIC****
ID:                         01
Health:                     000
Eccentricity:               3.5586357117E-003
Time of Applicability(s):   552960.0000
Orbital Inclination(rad):   0.9549653658
Rate of Right Ascen(r/s):   -8.0231913410E-009
SQRT(A)  (m^1/2):           5153.705657
Right Ascen at TOA(rad):    -2.4451744556E+000
Argument of Perigee(rad):   -1.213785172
Mean Anom(rad):             6.0070776939E-001
Af0(s):                     0.0000000000E+000
Af1(s/s):                   0.0000000000E+000
Week:                       764

**** Week 764 almanac for SV-02 ****GPSIC****
ID:                         02
Health:                     000
Eccentricity:               1.3511657715E-002
Time of Applicability(s):   552960.0000
Orbital Inclination(rad):   0.9533295458
Rate of Right Ascen(r/s):   -7.7717522961E-009
SQRT(A)  (m^1/2):           5153.619117
Right Ascen at TOA(rad):    -3.9585542679E-001
Argument of Perigee(rad):   -2.633575678
Mean Anom(rad):             -2.9982190132E+000
Af0(s):                     0.0000000000E+000
Af1(s/s):                   0.0000000000E+000
Week:                       764

**** Week 764 almanac for SV-04 ****GPSIC****
ID:                         04
Health:                     000
Eccentricity:               3.0350685120E-003
Time of Applicability(s):   552960.0000
Orbital Inclination(rad):   0.9639235836
Rate of Right Ascen(r/s):   -8.1603399109E-009
SQRT(A)  (m^1/2):           5153.576234
Right Ascen at TOA(rad):    1.7342461348E+000
Argument of Perigee(rad):   -1.245350838
Mean Anom(rad):             -4.9723598361E-001
Af0(s):                     0.0000000000E+000
Af1(s/s):                   0.0000000000E+000
Week:                       764

**** Week 764 almanac for SV-05 ****GPSIC****
ID:                         05
Health:                     000
Eccentricity:               2.1915435791E-003
Time of Applicability(s):   552960.0000
```

97

```
Orbital Inclination(rad):      0.9557982639
Rate of Right Ascen(r/s):     -7.7946103911E-009
SQRT(A)   (m^1/2):             5153.485423
Right Ascen at TOA(rad):      -3.8179755211E-001
Argument of Perigee(rad):     -2.274363995
Mean Anom(rad):                1.2259865999E+000
Af0(s):                        0.0000000000E+000
Af1(s/s):                      0.0000000000E+000
Week:                          764

**** Week 764 almanac for SV-06 ****GPSIC****
ID:                            06
Health:                        000
Eccentricity:                  6.3481330872E-003
Time of Applicability(s):      552960.0000
Orbital Inclination(rad):      0.9597171113
Rate of Right Ascen(r/s):     -8.1946270534E-009
SQRT(A)   (m^1/2):             5153.617758
Right Ascen at TOA(rad):       7.0444059372E-001
Argument of Perigee(rad):     -2.961636782
Mean Anom(rad):                1.9087761641E-001
Af0(s):                        0.0000000000E+000
Af1(s/s):                      0.0000000000E+000
Week:                          764

**** Week 764 almanac for SV-07 ****GPSIC****
ID:                            07
Health:                        000
Eccentricity:                  6.6308975220E-003
Time of Applicability(s):      552960.0000
Orbital Inclination(rad):      0.9629947774
Rate of Right Ascen(r/s):     -8.1260527684E-009
SQRT(A)   (m^1/2):             5153.727001
Right Ascen at TOA(rad):       6.6807109118E-001
Argument of Perigee(rad):     -2.687527180
Mean Anom(rad):                2.1753711700E+000
Af0(s):                        0.0000000000E+000
Af1(s/s):                      0.0000000000E+000
Week:                          764

**** Week 764 almanac for SV-09 ****GPSIC****
ID:                            09
Health:                        000
Eccentricity:                  2.9549598694E-003
Time of Applicability(s):      552960.0000
Orbital Inclination(rad):      0.9503753991
Rate of Right Ascen(r/s):     -8.1489108634E-009
SQRT(A)   (m^1/2):             5153.666462
Right Ascen at TOA(rad):      -1.4124742746E+000
Argument of Perigee(rad):     -0.570188463
Mean Anom(rad):                5.3531998396E-001
Af0(s):                        0.0000000000E+000
Af1(s/s):                      0.0000000000E+000
Week:                          764
```

98

```
**** Week 764 almanac for SV-12 ****GPSIC****
ID:                       12
Health:                   000
Eccentricity:             1.4799118042E-002
Time of Applicability(s): 552960.0000
Orbital Inclination(rad): 1.0872771953
Rate of Right Ascen(r/s): -6.4574118343E-009
SQRT(A)  (m^1/2):         5153.476108
Right Ascen at TOA(rad):  -1.0506958961E+000
Argument of Perigee(rad): -0.165784895
Mean Anom(rad):           -5.3741384298E-002
Af0(s):                   0.0000000000E+000
Af1(s/s):                 0.0000000000E+000
Week:                     764

**** Week 764 almanac for SV-14 ****GPSIC****
ID:                       14
Health:                   000
Eccentricity:             3.0255317688E-003
Time of Applicability(s): 552960.0000
Orbital Inclination(rad): 0.9624315405
Rate of Right Ascen(r/s): -7.6803199162E-009
SQRT(A)  (m^1/2):         5153.677328
Right Ascen at TOA(rad):  2.8044536114E+000
Argument of Perigee(rad): +3.017710209
Mean Anom(rad):           1.9372603893E+000
Af0(s):                   0.0000000000E+000
Af1(s/s):                 0.0000000000E+000
Week:                     764

**** Week 764 almanac for SV-15 ****GPSIC****
ID:                       15
Health:                   000
Eccentricity:             7.0686340332E-003
Time of Applicability(s): 552960.0000
Orbital Inclination(rad): 0.9685734525
Rate of Right Ascen(r/s): -8.1146237209E-009
SQRT(A)  (m^1/2):         5153.615818
Right Ascen at TOA(rad):  1.7671878338E+000
Argument of Perigee(rad): +1.796848059
Mean Anom(rad):           -1.9375060797E+000
Af0(s):                   0.0000000000E+000
Af1(s/s):                 0.0000000000E+000
Week:                     764

**** Week 764 almanac for SV-16 ****GPSIC****
ID:                       16
Health:                   000
Eccentricity:             7.1144104004E-004
Time of Applicability(s): 552960.0000
Orbital Inclination(rad): 0.9592557114
Rate of Right Ascen(r/s): -7.7260361061E-009
SQRT(A)  (m^1/2):         5153.620087
Right Ascen at TOA(rad):  2.8149042130E+000
Argument of Perigee(rad): -1.369167328
```

99

| | |
|---|---|
| Mean Anom(rad): | -2.1662805080E+000 |
| Af0(s): | 0.0000000000E+000 |
| Af1(s/s): | 0.0000000000E+000 |
| Week: | 764 |

** Week 764 almanac for SV-17 GPSIC**

| | |
|---|---|
| ID: | 17 |
| Health: | 000 |
| Eccentricity: | 7.8306198120E-003 |
| Time of Applicability(s): | 552960.0000 |
| Orbital Inclination(rad): | 0.9697419151 |
| Rate of Right Ascen(r/s): | -8.0574784835E-009 |
| SQRT(A) (m^1/2): | 5153.648028 |
| Right Ascen at TOA(rad): | 1.8019176722E+000 |
| Argument of Perigee(rad): | +1.955836415 |
| Mean Anom(rad): | 2.1900010109E-001 |
| Af0(s): | 0.0000000000E+000 |
| Af1(s/s): | 0.0000000000E+000 |
| Week: | 764 |

** Week 764 almanac for SV-18 GPSIC**

| | |
|---|---|
| ID: | 18 |
| Health: | 000 |
| Eccentricity: | 5.6657791138E-003 |
| Time of Applicability(s): | 552960.0000 |
| Orbital Inclination(rad): | 0.9433586212 |
| Rate of Right Ascen(r/s): | -8.1717689584E-009 |
| SQRT(A) (m^1/2): | 5153.666074 |
| Right Ascen at TOA(rad): | -2.4890041351E+000 |
| Argument of Perigee(rad): | +1.340018392 |
| Mean Anom(rad): | 2.0486909806E+000 |
| Af0(s): | 0.0000000000E+000 |
| Af1(s/s): | 0.0000000000E+000 |
| Week: | 764 |

** Week 764 almanac for SV-19 GPSIC**

| | |
|---|---|
| ID: | 19 |
| Health: | 000 |
| Eccentricity: | 4.5013427734E-004 |
| Time of Applicability(s): | 552960.0000 |
| Orbital Inclination(rad): | 0.9338371962 |
| Rate of Right Ascen(r/s): | -8.3432046708E-009 |
| SQRT(A) (m^1/2): | 5153.567308 |
| Right Ascen at TOA(rad): | -1.4390282631E+000 |
| Argument of Perigee(rad): | -2.582934856 |
| Mean Anom(rad): | -1.3829053640E+000 |
| Af0(s): | 0.0000000000E+000 |
| Af1(s/s): | 0.0000000000E+000 |
| Week: | 764 |

** Week 764 almanac for SV-20 GPSIC**

| | |
|---|---|
| ID: | 20 |
| Health: | 000 |
| Eccentricity: | 4.6586990356E-003 |
| Time of Applicability(s): | 552960.0000 |

100

```
Orbital Inclination(rad):    0.9593455685
Rate of Right Ascen(r/s):   -7.7488942011E-009
SQRT(A)    (m^1/2):          5153.756300
Right Ascen at TOA(rad):    -3.8654968143E-001
Argument of Perigee(rad):   +1.448892832
Mean Anom(rad):             -3.0866472721E+000
Af0(s):                      0.0000000000E+000
Af1(s/s):                    0.0000000000E+000
Week:                        764

**** Week 764 almanac for SV-21 ****GPSIC****
ID:                          21
Health:                      000
Eccentricity:                1.1323928833E-002
Time of Applicability(s):    552960.0000
Orbital Inclination(rad):    0.9561518160
Rate of Right Ascen(r/s):   -7.7374651536E-009
SQRT(A)    (m^1/2):          5153.649969
Right Ascen at TOA(rad):     2.7741327286E+000
Argument of Perigee(rad):   +2.849303484
Mean Anom(rad):             -2.3163394928E+000
Af0(s):                      0.0000000000E+000
Af1(s/s):                    0.0000000000E+000
Week:                        764

**** Week 764 almanac for SV-22 ****GPSIC****
ID:                          22
Health:                      000
Eccentricity:                7.3747634888E-003
Time of Applicability(s):    552960.0000
Orbital Inclination(rad):    0.9534853219
Rate of Right Ascen(r/s):   -7.8060394386E-009
SQRT(A)    (m^1/2):          5153.616206
Right Ascen at TOA(rad):    -3.8079836965E-001
Argument of Perigee(rad):   -0.232312709
Mean Anom(rad):             -2.9915707111E+000
Af0(s):                      0.0000000000E+000
Af1(s/s):                    0.0000000000E+000
Week:                        764

**** Week 764 almanac for SV-23 ****GPSIC****
ID:                          23
Health:                      000
Eccentricity:                8.5511207581E-003
Time of Applicability(s):    552960.0000
Orbital Inclination(rad):    0.9597770209
Rate of Right Ascen(r/s):   -7.7031780111E-009
SQRT(A)    (m^1/2):          5153.634252
Right Ascen at TOA(rad):     2.8075399399E+000
Argument of Perigee(rad):   -2.355905056
Mean Anom(rad):             -2.8134200573E+000
Af0(s):                      0.0000000000E+000
Af1(s/s):                    0.0000000000E+000
Week:                        764
```

101

```
**** Week 764 almanac for SV-24 ****GPSIC****
ID:                         24
Health:                     000
Eccentricity:               5.6061744690E-003
Time of Applicability(s):   552960.0000
Orbital Inclination(rad):   0.9738105637
Rate of Right Ascen(r/s):   -8.0574784835E-009
SQRT(A)  (m^1/2):           5153.688000
Right Ascen at TOA(rad):    1.7253190279E+000
Argument of Perigee(rad):   -2.173247099
Mean Anom(rad):             -1.8511432409E-001
Af0(s):                     0.0000000000E+000
Af1(s/s):                   0.0000000000E+000
Week:                       764

**** Week 764 almanac for SV-25 ****GPSIC****
ID:                         25
Health:                     000
Eccentricity:               5.7501792908E-003
Time of Applicability(s):   552960.0000
Orbital Inclination(rad):   0.9434604992
Rate of Right Ascen(r/s):   -8.2060561009E-009
SQRT(A)  (m^1/2):           5153.608833
Right Ascen at TOA(rad):    -1.4378567934E+000
Argument of Perigee(rad):   +2.968749046
Mean Anom(rad):             1.5076783895E+000
Af0(s):                     0.0000000000E+000
Af1(s/s):                   0.0000000000E+000
Week:                       764

**** Week 764 almanac for SV-26 ****GPSIC****
ID:                         26
Health:                     000
Eccentricity:               8.4280967712E-003
Time of Applicability(s):   552960.0000
Orbital Inclination(rad):   0.9579014969
Rate of Right Ascen(r/s):   -7.9889041985E-009
SQRT(A)  (m^1/2):           5153.654820
Right Ascen at TOA(rad):    -2.4667048454E+000
Argument of Perigee(rad):   -0.966013193
Mean Anom(rad):             2.3370640278E+000
Af0(s):                     0.0000000000E+000
Af1(s/s):                   0.0000000000E+000
Week:                       764

**** Week 764 almanac for SV-27 ****GPSIC****
ID:                         27
Health:                     000
Eccentricity:               1.0888099670E-002
Time of Applicability(s):   552960.0000
Orbital Inclination(rad):   0.9473374177
Rate of Right Ascen(r/s):   -8.1717689584E-009
SQRT(A)  (m^1/2):           5153.653849
Right Ascen at TOA(rad):    -1.4252389669E+000
Argument of Perigee(rad):   +2.472266912
```

102

```
Mean Anom(rad):              -6.8642497063E-001
Af0(s):                       0.0000000000E+000
Af1(s/s):                     0.0000000000E+000
Week:                         764

**** Week 764 almanac for SV-28 ****GPSIC****
ID:                           28
Health:                       000
Eccentricity:                 5.0811767578E-003
Time of Applicability(s):     552960.0000
Orbital Inclination(rad):     0.9710062311
Rate of Right Ascen(r/s):    -8.0346203885E-009
SQRT(A)   (m^1/2):            5153.619117
Right Ascen at TOA(rad):      6.7626529932E-001
Argument of Perigee(rad):    +2.920622587
Mean Anom(rad):              -1.1210287809E+000
Af0(s):                       0.0000000000E+000
Af1(s/s):                     0.0000000000E+000
Week:                         764

**** Week 764 almanac for SV-29 ****GPSIC****
ID:                           29
Health:                       000
Eccentricity:                 5.1074028015E-003
Time of Applicability(s):     552960.0000
Orbital Inclination(rad):     0.9539047511
Rate of Right Ascen(r/s):    -8.0460494360E-009
SQRT(A)   (m^1/2):            5153.565368
Right Ascen at TOA(rad):     -2.4883718491E+000
Argument of Perigee(rad):    -1.824993730
Mean Anom(rad):              -5.1448130608E-001
Af0(s):                       0.0000000000E+000
Af1(s/s):                     0.0000000000E+000
Week:                         764

**** Week 764 almanac for SV-31 ****GPSIC****
ID:                           31
Health:                       000
Eccentricity:                 5.0282478333E-003
Time of Applicability(s):     552960.0000
Orbital Inclination(rad):     0.9623835893
Rate of Right Ascen(r/s):    -8.1489108634E-009
SQRT(A)   (m^1/2):            5153.634834
Right Ascen at TOA(rad):      6.7114055157E-001
Argument of Perigee(rad):    +0.667058825
Mean Anom(rad):               6.1563110352E-001
Af0(s):                       0.0000000000E+000
Af1(s/s):                     0.0000000000E+000
Week:                         764
```

103

APPENDIX B

DESIGN MATRICES

104

These six files contain the partial derivative parts of design matrices A1, A2, A3, A4, A5, A6 computed for the observation period 13:32 - 15:02, east standard time on October 24, 1993. The GPS baseline to be observed is Thornden - 1, Syracuse.

A1.prn

| | | | | | |
|---:|---:|---:|---:|---:|---:|
| -5.377298921 | -5.33365017 | -0.5532369848 | 5.387453752 | 5.330590818 | 0.558782625 |
| 0.06825109251 | -1.765489029 | -2.492590636 | -0.06845761281 | 1.763463598 | 2.491178267 |
| 3.168152599 | -2.278443914 | -0.8702960096 | -3.160671838 | 2.279454432 | 0.86714545 |
| -2.856033307 | -2.100173932 | -2.164386362 | 2.857070958 | 2.094070939 | 2.168342238 |
| -5.448359764 | -5.458112671 | -0.6271836941 | 5.458762855 | 5.455078105 | 0.6322195349 |
| -0.08717215727 | -1.70841506 | -2.662067686 | 0.08672446085 | 1.706192988 | 2.660725213 |
| 3.061279041 | -2.367350215 | -1.2948184 | -3.05426172 | 2.368132599 | 1.291246315 |
| -2.903592447 | -2.36087388 | -2.520794628 | 2.904725465 | 2.354699491 | 2.524775615 |
| -5.516464625 | -5.564757381 | -0.7005109153 | 5.52708005 | 5.561751373 | 0.7050123888 |
| -0.2421016826 | -1.638437684 | -2.821825905 | 0.2414290002 | 1.636021255 | 2.820542375 |
| 2.9431758 | -2.442481101 | -1.716888743 | -2.936649893 | 2.443038588 | 1.712922749 |
| -2.957518322 | -2.610937782 | -2.868320353 | 2.95875101 | 2.604719996 | 2.872326025 |
| -5.580976462 | -5.653787451 | -0.7726031893 | 5.591768103 | 5.650814905 | 0.7765493882 |
| -0.3955852278 | -1.55617571 | -2.9710153 | 0.3947041882 | 1.553569619 | 2.969778231 |
| 2.814442469 | -2.503499421 | -2.135015498 | -2.8084323 | 2.503837257 | 2.130686226 |
| -3.017313187 | -2.849586918 | -3.20578657 | 3.018650778 | 2.843355672 | 3.20981569 |
| -5.641265874 | -5.72552147 | -0.8428766826 | 5.652197695 | 5.722588387 | 0.8462506179 |
| -0.5466824076 | -1.462364125 | -3.108889613 | 0.5456098874 | 1.459575497 | 3.107685428 |
| 2.679722835 | -2.550176752 | -2.547746126 | -2.670248789 | 2.550301988 | 2.543087139 |
| -3.082439172 | -3.07615613 | -3.532108596 | 3.083887798 | 3.069942918 | 3.536159186 |

A2.prn

| | | | | | |
|---:|---:|---:|---:|---:|---:|
| -0.6944756512 | -1.357840508 | -3.234816017 | 0.6932285944 | 1.354878853 | 3.233630486 |
| 2.52769893 | -2.582388389 | -2.953677546 | -2.522777199 | 2.582309637 | 2.948725197 |
| -3.15232524 | -3.290092635 | -3.846300733 | 3.153891896 | 3.283930098 | 3.850370148 |
| -0.8380806805 | -1.243529884 | -3.348282141 | 0.8366759311 | 1.240406997 | 3.347100826 |
| 2.371085266 | -2.600107179 | -3.351465064 | -2.366727638 | 2.599834329 | 3.346258285 |
| -3.226374064 | -3.490953095 | -4.14748089 | 3.228066539 | 3.48487457 | 4.151565885 |

105

A3.prn

| | | | | | |
|---:|---:|---:|---:|---:|---:|
| -0.9766562287 | -1.120428572 | -3.448900274 | 0.9751103808 | 1.117158375 | 3.447708963 |
| 2.206623453 | -2.603396517 | -3.739829536 | -2.202837153 | 2.602940429 | 3.734409576 |
| -3.30396861 | -3.678399129 | -4.434873044 | 3.305795409 | 3.672438188 | 4.438969838 |
| 4.159570189 | -3.777288725 | -1.782386968 | -4.149413005 | 3.776084258 | 1.779115226 |
| -1.109412878 | -0.9895874341 | -3.536408847 | 1.107742145 | 0.9861857687 | 3.535193963 |
| 2.035077189 | -2.592402841 | -4.117563027 | -2.031864765 | 2.591775027 | 4.11197312 |
| -3.384478368 | -3.852191714 | -4.707807851 | 3.386448614 | 3.846381701 | 4.711912182 |
| 4.080137079 | -3.749260091 | -2.214845934 | -4.070350333 | 3.748054265 | 2.211035373 |

A4.prn

| | | | | | |
|---:|---:|---:|---:|---:|---:|
| -1.235620819 | -0.8520950453 | -3.610671235 | 1.233840919 | 0.84857942 | 3.609420209 |
| 1.857227703 | -2.567347919 | -4.483532956 | -1.85458697 | 2.566560215 | 4.477817932 |
| -3.467265129 | -4.012184732 | -4.965721493 | 3.469388441 | 4.006558306 | 4.969828667 |
| 3.99329412 | -3.707954214 | -2.641127775 | -3.983906207 | 3.706761548 | 2.636798985 |
| 3.218041322 | -5.660509217 | -4.195263826 | -3.212014791 | 5.655806037 | 4.189657065 |
| -1.35461637 | -0.7090612229 | -3.671672074 | 1.352742444 | 0.7054505278 | 3.670373684 |
| 1.673869713 | -2.528521188 | -4.836684771 | -1.671793755 | 2.527585437 | 4.830890627 |
| -3.551688215 | -4.158317901 | -5.208152954 | 3.553974581 | 4.152906607 | 5.212257888 |
| 3.899526474 | -3.653590512 | -3.060173459 | -3.890563863 | 3.652425581 | 3.055350877 |
| 3.284700231 | -5.466124611 | -4.37086068 | -3.278513322 | 5.461663655 | 4.364991078 |

106

A5.prn

| | | | | | |
|---|---|---|---|---|---|
| -1.465807246 | -0.5616012678 | -3.719511372 | 1.46385378 | 0.5579154596 | 3.718156028 |
| 1.485807826 | -2.476272351 | -5.176043515 | -1.484285045 | 2.475200097 | 5.170216935 |
| -3.637109187 | -4.290609454 | -5.434740072 | 3.639568815 | 4.285443323 | 5.438837329 |
| 3.799321697 | -3.58643358 | -3.470984832 | -3.79080878 | 3.585310746 | 3.465696618 |
| 3.352094557 | -5.263944056 | -4.531213292 | -3.345737968 | 5.259752743 | 4.525115373 |
| -4.486343068 | -2.089020549 | 0.8991674046 | 4.490900331 | 2.08152201 | -0.9025233932 |
| -1.568676439 | -0.4108213035 | -3.754396702 | 1.566657223 | 0.4070810717 | 3.752976678 |
| 1.293853425 | -2.411004416 | -5.500714266 | -1.29286766 | 2.409806627 | 5.494902116 |
| -3.722895961 | -4.409148684 | -5.645214502 | 3.725539123 | 4.404255875 | 5.64929832 |
| 3.693167635 | -3.506786096 | -3.872623691 | -3.6851266 | 3.505719247 | 3.866901559 |
| 3.420230089 | -5.055045221 | -4.675976993 | -3.413695489 | 5.051148724 | 4.669688693 |
| -4.556781527 | -1.971342164 | 0.4542387184 | 4.561311418 | 1.963733554 | -0.457575546 |
| -1.662784782 | -0.2578049154 | -3.776633834 | 1.660712879 | 0.2540313388 | 3.77514344 |
| 1.098821935 | -2.333167286 | -5.809881826 | -1.098352629 | 2.331854098 | 5.804130619 |
| -3.808426396 | -4.514088636 | -5.839395941 | 3.811263268 | 4.50949512 | 5.843460265 |
| 3.581550854 | -3.41498239 | -4.264210059 | -3.57400156 | 3.413984698 | 4.25808906 |
| 3.489080459 | -4.840507792 | -4.804925062 | -3.482360779 | 4.836928642 | 4.798487324 |
| -4.618683748 | -1.848584014 | 0.009184195953 | 4.623175583 | 1.840887836 | -0.01246690497 |
| -1.747772174 | -0.1036013471 | -3.786616162 | 1.745659906 | 0.09981554782 | 3.785051864 |
| 0.9015304768 | -2.243251972 | -6.102809707 | -0.9015529001 | 2.241832476 | 6.097165062 |
| -3.893091336 | -4.605639011 | -6.017185776 | 3.896131825 | 4.601368306 | 6.021224285 |
| 3.464955581 | -3.311382796 | -4.644919694 | -3.457915452 | 3.310466488 | 4.638437962 |
| 3.558589798 | -4.621401104 | -4.917944545 | -3.5516795 | 4.618158849 | 4.911400846 |
| -4.671546237 | -1.721977946 | -0.4352332172 | 4.67598902 | 1.714217542 | 0.4320397353 |
| -1.823357544 | 0.0507846503 | -3.784813301 | 1.821216493 | -0.05456184473 | 3.783173772 |
| 0.7027957925 | -2.141785481 | -6.378838683 | -0.7032813223 | 2.140267542 | 6.373344782 |
| -3.976297166 | -4.684059453 | -6.178560416 | 3.979550746 | 4.680132407 | 6.182566548 |
| 3.343863109 | -3.196368834 | -5.013981129 | -3.337347039 | 3.195544984 | 5.007179597 |
| 3.628675906 | -4.398772821 | -5.015030701 | -3.621571222 | 4.395883752 | 5.00842653 |
| -4.714914723 | -1.592770343 | -0.8782578162 | 4.71929717 | 1.584969786 | 0.8751884131 |
| -1.889337646 | 0.2044012344 | -3.771759212 | 1.887178665 | -0.2081496141 | 3.770045332 |
| 0.5034324066 | -2.029326363 | -6.637385028 | -0.5043488562 | 2.027716483 | 6.63208408 |
| -4.057467915 | -4.749653262 | -6.323564465 | 4.060943457 | 4.74608789 | 6.327531451 |
| 3.218751601 | -3.070339223 | -5.370672392 | -3.21277187 | 3.069617566 | 5.363594475 |
| 3.699233811 | -4.173638801 | -5.096280275 | -3.691932954 | 4.171115747 | 5.089662574 |
| -4.748387705 | -1.462211221 | -1.319134868 | 4.752698298 | 1.454395202 | 1.31622372 |

A6.prn

| | | | | | |
|---|---|---|---|---|---|
| 2.249835745 | -2.262817044 | -3.129898395 | -2.248980969 | 2.264820538 | 3.126615331 |
| -2.190462166 | -5.159117722 | -2.704263736 | 2.196334547 | 5.159629361 | 2.709969833 |
| 5.035681038 | -3.290062877 | -1.96627736 | -5.028080468 | 3.29315192 | 1.960753816 |
| 5.715724352 | -4.303330386 | -1.413843618 | -5.706060907 | 4.304882856 | 1.4090454 |
| -2.82603498 | -1.687899564 | 1.990935618 | 2.8324288 | 1.683793542 | -1.991870225 |

APPENDIX C

108

COMPARISON BETWEEN RDOP AND PDOP

Xinyu Yang and Robert Brock

State University of New York
College of Environmental Science and Forestry
Syracuse, New York 13210

ABSTRACT

The RDOP (Relative Delusion of Precision) is a precision indicator for GPS relative positioning which is governed by the continuous changing satellite geometry from the observation starting time to the end of a session. The measure of RDOP is compared with that of PDOP (Position Delusion of Precision) for the optimum design of GPS relative positioning. An important phenomenon, the shift of the RDOP curve as a function of session length, has been discovered. The relation between PDOP and RDOP is explained based on this finding. The impropriety of PDOP as an accuracy indicator for GPS relative positioning is discussed with practical examples.

INTRODUCTION

The measure of Position Dilution of Precision (PDOP) has been commonly used to describe the effect of the satellite/receiver geometric configuration on the achievable accuracy of GPS positioning. The concept of PDOP was borrowed from the GPS navigation principle which reflects only the instantaneous satellite geometry related to a single point at a signal epoch. The PDOP factor does not reflect the achievable accuracy of GPS geodetic relative positioning which is determined by the continuously changing satellite geometry over the entire observing session. The limitation of PDOP as a precision indicator for GPS relative positioning was reported by Norton (1987), Hatch and Avery (1989) and Merminod, Grant and Rizos (1990).

The measure of RDOP (Relative Dilution of Precision) proposed by Goad (1989) contains the information on the precision of GPS relative positioning with respect to the continuously changing satellite geometry from session starting to the end of a session, thus it is an ideal precision indicator for GPS relative positioning. Similar precision indicators were devised by Hatch and Avery (1989) and Merminod, Grant and Rizos (1990). The application significance of RDOP is (1) the RDOP values can be numerically simulated based on the broadcast almanac file for the optimum design of GPS geodetic relative positioning and (2) it can also be used for real-time accuracy prediction and real-time automatic session length determination based on the ephemeris file (Yang, 1995; Yang and Brock, 1995).

The measure of RDOP has not been widely accepted for GPS survey planning. The main reasons are:

(1) The RDOP is a function of session starting time and session length. As an optimum design tool the RDOP is a three dimensional surface. The generation of the RDOP surface is computationally expensive. It requires an efficient computational technique to make the RDOP surface available in a practical sense.

(2) There have been some confucians about RDOP and PDOP. Why is PDOP not a proper measure for GPS relative positioning? What is the relation between RDOP and PDOP? The RDOP can not be widely accepted unless the above questions have been fully answered.

With regard to the former, an array algebra filtering technique (Rawhala, 1980, 1982) has been successfully developed for the fast generation of the RDOP surface (Yang, 1995). The optimum observation windows, optimum session starting time and optimum session length have been derived from the RDOP surface for the optimum design of precise GPS relative positioning (Yang and Brock, 1995). This paper mainly deals with the second issue. In this paper a practical example was used to compare the RDOP curves extracted from the RDOP surface with the PDOP curve computed using the commercially available software. An interesting phenomenon, the shift of the RDOP curve as a function of session length, was found. The relation between RDOP and PDOP is explained based on this finding.

POINT POSITIONING AND RELATIVE POSITIONING

Two different techniques are commonly used in GPS positioning: point positioning and relative positioning. In point positioning a single receiver is used at an unknown station to determine the three dimensional coordinates of that point. Point positioning is commonly used in navigation solutions. In relative positioning two receivers are used at two sites to simultaneously collect carrier phase observations from several satellites for a certain period of time. Relative positioning is the commonly used technique in GPS surveying to determine one geodetic position with respect to another geodetic position. These two techniques are shown in Figure 1.

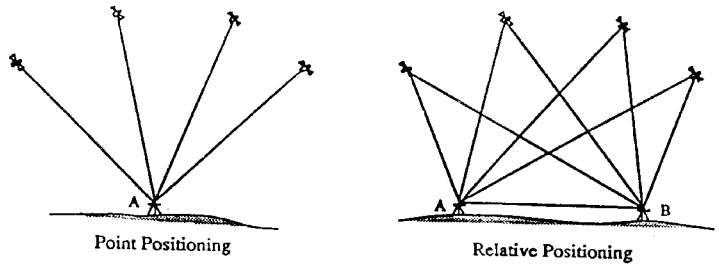

Point Positioning        Relative Positioning

Figure 1:
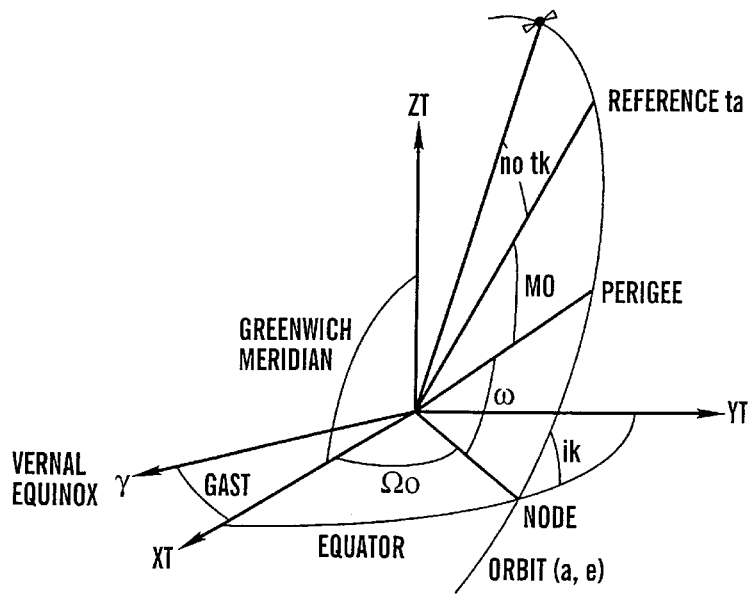
FIG. 1 The spatial orientation of the orbital ellipse described with almanac parameters.

Figure 1 Point positioning and relative positioning

The characteristic of GPS relative positioning is that the relative location of the two stations can be determined to a very high order of accuracy. Typically 1 ppm to 0.1 ppm can be routinely achieved; but the absolute position of the baseline, at present time, is only at the 5 meter level or worse. The commonly used technique in GPS surveying is to start relative positioning from a station whose absolute position has been accurately determined so the whole GPS network can be fixed to that station.

Point positioning and relative positioning are totally two different techniques. The basic differences are:

110

(1) In point positioning a single receiver is used to determine the position of a single point while in relative positioning two or more receivers are used simultaneously to determine the relative positions among those points.

(2) The commonly used observable in point positioning is pseudo-range. The pseudo-range observable is contaminated by the receiver clock error which is a constant to all tracked satellites at a single epoch but varies from epoch to epoch. The observable used in relative positioning is the ambiguous carrier phase. Most of the errors contained in the carrier phase observables, satellite related or receiver related are canceled or greatly reduced with the carrier phase differential technique. The remaining predominant terms, cycle ambiguities, carried in carrier phase processing are constants over all epochs if no cycle slip occurs.

(3) In point positioning the position of a single point is determined at a single epoch while in relative positioning the relative position between two points are determined over certain period of time to resolve the cycle ambiguities.

Based on (1) (2) and (3) one can see that the two methods, point positioning and relative positioning, are totally different in terms of observables, data processing, error types and field configuration. The geometric strength of the pseudo-range solution is quite different from that of the carrier phase solution.

INDICATORS OF PRECISION: RDOP VIS PDOP

The achievable accuracy of the point positioning is affected by the satellite/receiver geometry. The measure of PDOP is commonly used to describe the satellite/receiver geometry for GPS positioning. In a mathematical approach the PDOP can be derived from the design matrix A of point positioning. If 4 satellites are observed at point A the design matrix A has the following form:

$$A = \begin{bmatrix} -\frac{X^1 - X_A}{\rho_A^1} & -\frac{Y^1 - Y_A}{\rho_A^1} & -\frac{Z^1 - Z_A}{\rho_A^1} & -c \\ -\frac{X^2 - X_A}{\rho_A^2} & -\frac{Y^2 - Y_A}{\rho_A^2} & -\frac{Z^2 - Z_A}{\rho_A^2} & -c \\ -\frac{X^3 - X_A}{\rho_A^3} & -\frac{Y^3 - Y_A}{\rho_A^3} & -\frac{Z^3 - Z_A}{\rho_A^3} & -c \\ -\frac{X^4 - X_A}{\rho_A^4} & -\frac{Y^4 - Y_A}{\rho_A^4} & -\frac{Z^4 - Z_A}{\rho_A^4} & -c \end{bmatrix} \quad (1)$$

where the first three elements in each row are the direction cosines of the unit vector from point A to satellite i. Therefore the design matrix A contains the geometric information of point positioning. More generally the PDOP can be calculated from the cofactor matrix $Q_{XX}$ which is the inverse of the normal equation matrix of the least-squares solution.

$$Q_{XX} = (A^T A)^{-1} \quad (2)$$

111

The cofactor matrix $Q_{xx}$ contains the information on the precision of the coordinates and time offset estimates, therefore it constitutes the basis for the precision analysis of GPS point positioning. The PDOP is the sum of the square of the error ellipsoid axes which are contained in the first three of the diagonal elements of the cofactor matrix. It should be emphasized that the value of PDOP changes with time and only reflects the instantaneous satellite/receiver geometry at a single epoch.

In contrast to the point positioning the achievable accuracy of relative positioning is determined by the continuously changing satellite geometry over the entire observing session. The changing satellite geometry of relative positioning is shown in Figure 2.

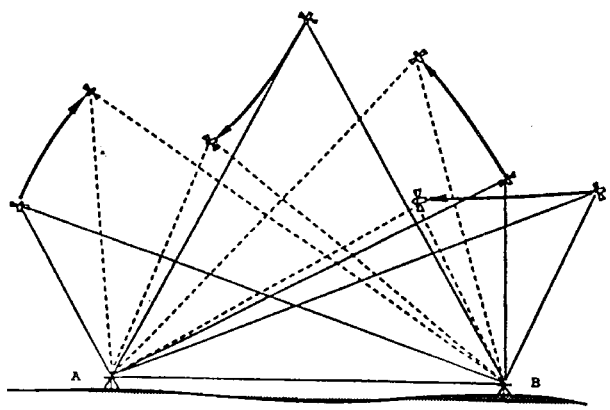

Figure 2:
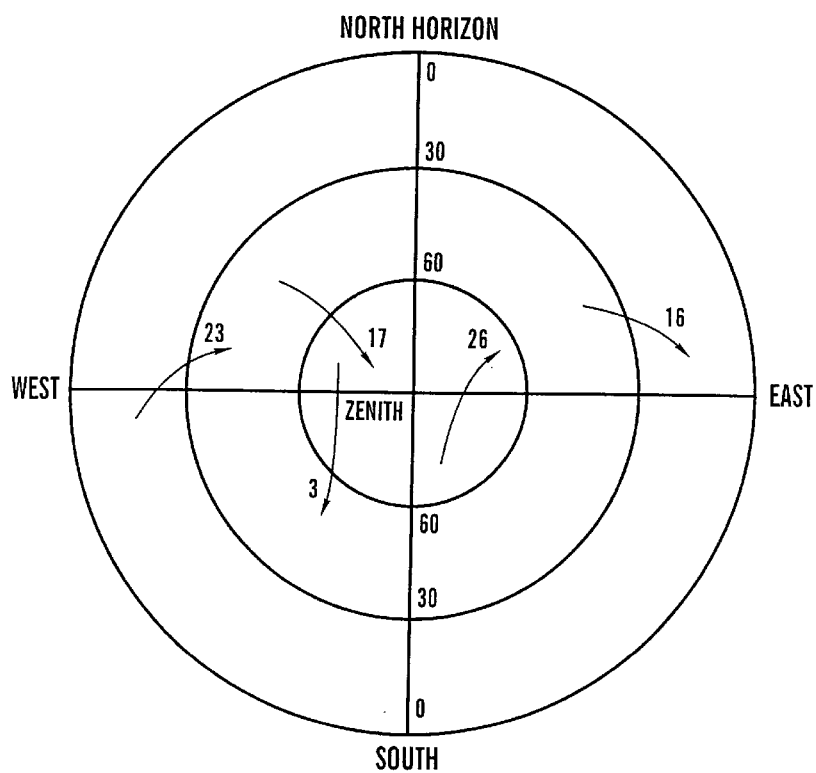
FIG. 2 Skyplot: A topocentric view of the GPS satellites movements from 12:42–13:57 on Oct. 24, 1993 at Thornden, Syracuse.

Figure 2 The changing satellite geometry of relative positioning

Similar to PDOP the RDOP is a function of the diagonal elements of the cofactor matrix of the carrier phase adjustment. In general, $$RDOP = \sqrt{tr[A^T Q^{-1} A]^{-1}} \qquad (3)$$

where $$A = \begin{bmatrix} A_{t1} \\ A_{t2} \\ A_{t3} \\ \vdots \\ A_{ti} \end{bmatrix} \qquad (4)$$

The design matrix A of (4) consists of sub matrices $A_{t1}, A_{t2}, A_{t3}, \ldots A_{ti}$, each of which is formed at a particular time t. The number of rows of the sub matrix $A_t$ is a function of the number of satellites observed at epoch t. The number of non-zero columns of the sub matrix $A_t$ is a function of the

112 unknowns carried at epoch t. The number of non-zero columns of $A_t$ changes at an epoch when one or more satellites is rising or setting. The design matrix A of (4) contains the information on the changing satellite geometry from the observing starting time to the end of a session. Each sub matrix $A_{ti}$ of A contains the information on the satellite geometry at a particular epoch i. For the detailed derivation of RDOP refer to Yang and Brock (1996).

In contrast to the geometric meaning of PDOP, which contains the satellite/receiver geometry at a single epoch, the measure of RDOP reflects the continuously changing satellite/receiver geometry over the entire observing session.

RDOP SURFACE

In the mathematical model of RDOP the time t is treated as a continuous variable thus the variability of the precision of the GPS relative positioning regarding different observation starting time and session length can be studied. The commonly used PDOP curve is a two dimensional plot in which one axis represents observation time and the other axis represents the value of PDOP. In the plot of RDOP the observing session length can be expressed in the third dimension to generate a surface. This surface is called the RDOP surface. The RDOP surface is an optimum design tool for GPS relative positioning (Yang and Brock, 1995).

The RDOP surface is a 3-D graphical presentation of the RDOP as a function of session starting time and session length. A RDOP surface, generated for a specific location on the Earth, geometrically describes the effect of the changing satellite geometry on the achievable accuracy of GPS relative positioning for a certain period. The geometric meaning of RDOP surface was discussed by Yang and Brock (1995).

Figure 3:
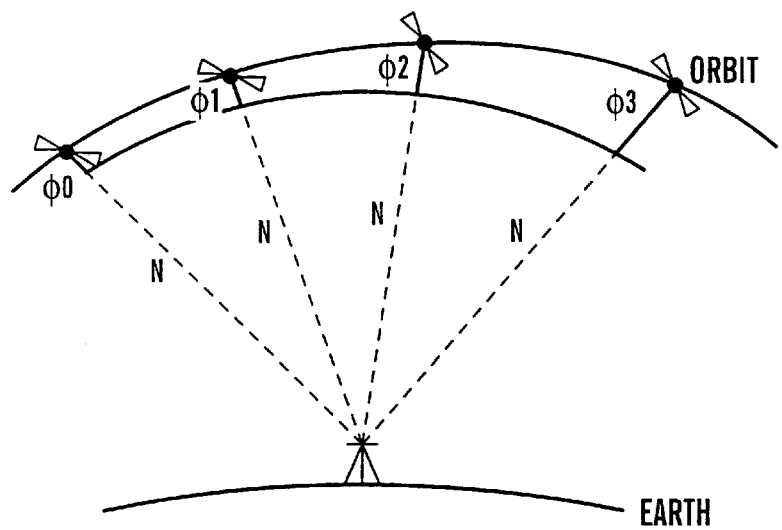
FIG. 3 The geometric meaning of carrier phase observable.

A software package GPSBIRD written in C++ has been developed in this investigation for the computation of the RDOP surface. A RDOP surface for a 60 minute session length was generated for Thornden, Syracuse for a twelve hour window, 8:00 - 20:00, on August 31, 1994. A grided perspective view of the RDOP surface is shown in Figure 3 and the corresponding RDOP contour map is shown in Figure 4.

RELATION BETWEEN RDOP AND PDOP

In order to study the possible relation between RDOP and PDOP, a PDOP plot (Figure 5) was generated for the same period under same conditions (all-in-view satellites and a 15° cut-off elevation) for Thornden, Syracuse with the Trimble ProPlan software. By comparing the PDOP plot of Figure (5) with the RDOP contour map of Figure (4), several interesting results have been found.

In comparing the PDOP plot of Figure (5) with the RDOP contour map of Figure (4), a similarity in the trend can be found between the peeks and troughs of PDOP and RDOP. The five maxima of PDOP correspond to the five maxima of RDOP. Therefore RDOP is somehow related to PDOP. A relation can be found by comparing the x coordinates of the five peaks (including the two side peaks) of the PDOP curve with the x coordinates of the five peaks of the initial solution of the RDOP. The results are shown in Table 1.

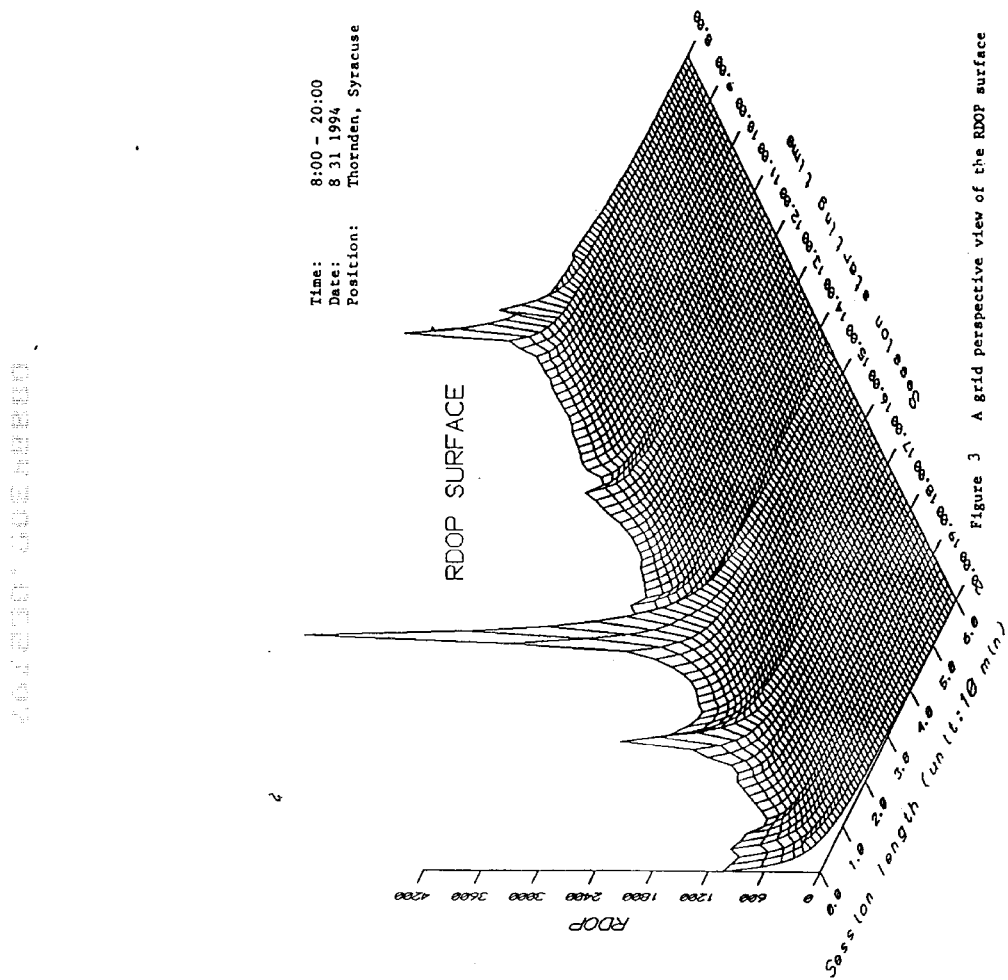
Figure 3 A grid perspective view of the RDOP surface

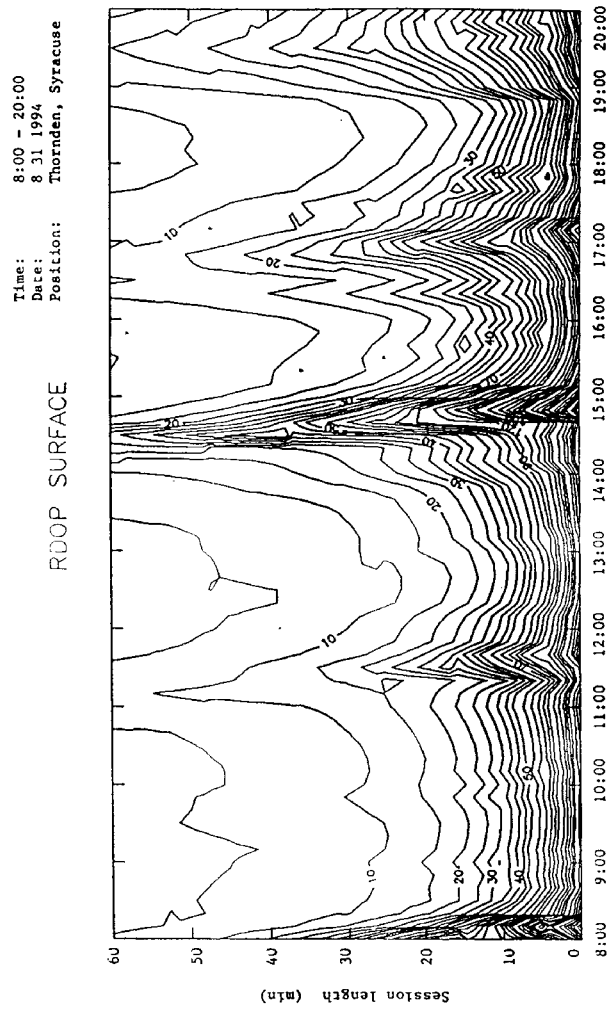
Figure 4 The RDOP contour map

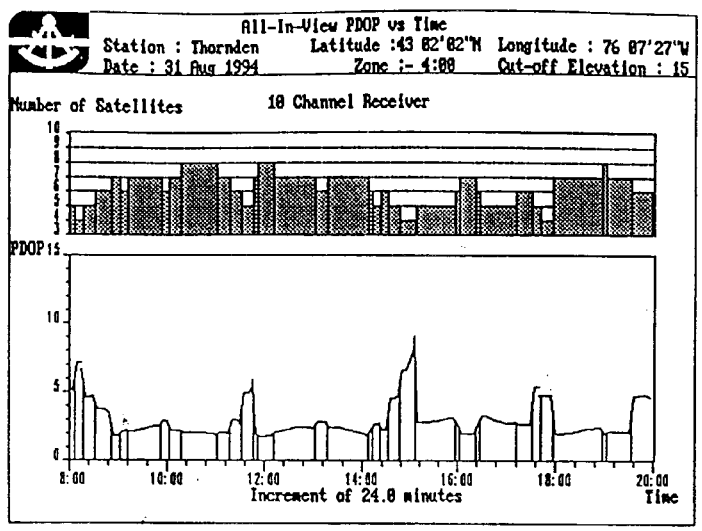

Figure 5   All-inview PDOP vs time

Although the filtering technique developed to compute the continuous RDOP surface is quite different than the technique used in Trimble software to compute PDOP, the x coordinates of the five peaks of PDOP curve generally coincide with those of the five peaks of the initial solution of RDOP at the beginning of the session. It can be concluded that the initial value of RDOP at the beginning of a session is directly related to that of PDOP. The reason is obvious. Both PDOP and RDOP are a function of the satellite/station geometry. The lowest PDOP corresponds to the highest accuracy for point positioning and so does the lowest RDOP for relative positioning. There should not be any contradiction between the two. The question is: can we simply use PDOP as an accuracy indicator for relative positioning ?

Comparison between PDOP and RDOP          Table 1

|      | max1  | max2  | max3  | max4  | max5  |
|------|-------|-------|-------|-------|-------|
| PDOP | 8:10  | 11:40 | 15:00 | 17:30 | 19:50 |
| RDOP | 8:10  | 11:40 | 14:50 | 17:10 | 20:00 |

SHIFT OF RDOP CURVE

Through the careful examination of the x coordinates of the peaks of the RDOP curves at different session lengths, an interesting phenomenon has been found. The x coordinates of the peaks of the RDOP curve gradually change as the session length gets longer. The shift of the RDOP curve as a function of session length is shown in Table 2.

Shift of the Peaks of the RDOP Curve  Table 2

| Session length (min) | max2 | max3 | max4 | max5 |
|---|---|---|---|---|
| 10 | 11:38 | 14:50 | 17:10 | 19:50 |
| 20 | 11:28 | 14:43 | 16:58 | 19:50 |
| 30 | 11:28 | 14:42 | 16:57 | 19:30 |
| 60 | 11:08 | 14:32 | 16:42 | 19:30 |

The first local maximum max1 does not show in Table 2 since the shift of x coordinate of max1 is out of the range of Figure 4 when the observing session is longer than 15 minutes. On the other hand the shift of the local maximum max5 becomes more obvious as shown by the shifting of the x coordinate of max5 when the session length is more the 5 minutes. The shift of the RDOP curve is due to the changing geometry of satellites. The RDOP is governed by the continuously changing satellite geometry from the starting time to the end of a session. At each epoch the instantaneous satellite-station geometry can be expressed by PDOP. The RDOP reflects the accumulated PDOP. The longer the session length is, the wider will be the range of PDOP covered from the starting time to the end of the session. The variation of the PDOP during a session will in turn affect the x coordinates of the peaks of the RDOP. Thus the x coordinates of the peaks of the RDOP curve will gradually change as the session length gets longer.

The shift of the RDOP curve as the session length gets longer changes the coincidence between PDOP and the initial solution of RDOP. The comparison between the maxima of the PDOP curve (Figure 5) and those of the 60 minute RDOP curve (Figure 4) is shown in Table 3.

Comparison between PDOP and 60 min Session RDOP  Table 3

|  | max2 | max3 | max4 | max5 |
|---|---|---|---|---|
| PDOP | 11:40 | 14:50 | 17:30 | 19:50 |
| 60 min RDOP | 11:08 | 14:32 | 16:42 | 19:28 |

Note the three maxima at 11:08, 14:32 and 19:28 of the 60 minute RDOP curve correspond to the three minima of PDOP curve. The other maximum at 16:42 of RDOP also corresponds to the relatively low value of PDOP. The coincidence between PDOP and RDOP at beginning epoch does not exist any more due to the shift of the peaks of RDOP when the observing session is getting longer. Thus the widely accepted belief that low PDOP indicates good satellite/station geometry for a GPS survey is not true for relative positioning. Similar results were also reported by Norton (1987), Hatch and Avery (1989) and Merminod, Grant and Rizos (1990).

The filtering technique developed in this investigation to generate a continuos RDOP surface is sequential in nature and all the RDOP values are computed in a unified time series. This has led to the the finding of shift of the RDOP curve as a function of session length. The shift of the RDOP curve as a function of session length is an important phenomenon which shows the inner relationship between RDOP and PDOP.

117

CONCLUSIONS

The RDOP is governed by the continuous changing satellite geometry from the the observation starting time to the end of a session. The RDOP reflects the accumulated PDOP. At each epoch the instantaneous satellite/station geometry can be expressed by PDOP. The initial value of the RDOP at the beginning of a session is directly related to that of PDOP. This coincidence changes as a result of the shift of the RDOP when the session length gets longer. The shift of the RDOP curve as a function of session length is an important phenomenon which shows the inner relationship between RDOP and PDOP.

The RDOP is an ideal precision indicator for GPS relative positioning. The widely accepted belief that a low PDOP indicates good satellite/station geometry for a GPS survey is not true for long distance geodetic relative positioning. The RDOP surface contains the precision information of GPS relative positioning with respect to a different session starting time and session length. The best precision with the shortest observation time for long distance GPS relative positioning can be achieved based on the information provided with the RDOP surface.

REFERENCES

Goad, C. C., (1989). Kinematic Survey of Clinton Lake Dam, Journal of Surveying Engineering, Vol. 115, No. 1.

Hatch, R.R. and E.V. Avery. (1989). A Strategic Planning Tool for GPS Surveys, Journal of Surveying Engineering, Vol. 115, No. 1.

Merminod, B., D.B. Grant and C. Rizos, (1990). Planning GPS Surveys --- Using Appropriate Precision Indicators, CISM Journal ACSGC Vol. 44, No. 3, pp. 233-249.

Norton, T., (1987). Monitoring the Precision of Relative GPS Positioning, Proceedings Centernary GPS Conference, Department of Land Information, Royal Melbourne Institute of Technology, Aug. 24-26, 1987, Melbourne, Australia.

Rauhala, U. A., (1980). Introduction to Array Algebra, Photogrammetric Engineering and Remote Sensing, Vol. 46, No. 2.

Rauhala, U. A., (1982). Array Algebra Estimation in Signal Processing. Photogrammetric Engineering and Remote Sensing, No. 9.

Yang, Xinyu, (1995). The Optimum Design of Precise GPS relative Positioning with RDOP Surface: Modeling, Comparison and Results. Ph.D. Dissertation, State University of New York, College of Environmental Science and Forestry.

Yang, Xinyu and Robert Brock, (1995). RDOP surface: The Optimum Design Tool for GPS Relative Positioning, GIS/LIS'95, Nashville, Tennessee.

Yang, Xinyu and Robert Brock, (1996). Modeling GPS Satellite Geometry With RDOP, ACSM/ASPRS Convention, Baltimore.

118

APPENDIX D

RDOP SURFACE: AN OPTIMUM DESIGN TOOL FOR GPS RELATIVE POSITIONING

Xinyu Yang and Robert Brock

State University of New York
College of Environmental Science and Forestry
Syracuse, New York 13210

ABSTRACT

A method based on modeling the relative dilution of precision (RDOP) has been developed for the quantitative analysis of the accuracy of GPS relative positioning with respect to the changing satellite/station configuration, observation starting time and session length. The RDOP surface, a mathematical surface, has been generated based on the broadcast almanac file for the optimum design of GPS relative positioning with carrier phase observable. The optimum observation windows, optimum session starting time and optimum observation session length have been derived from the study of the RDOP surface. The application of the RDOP surface for the optimum design of GPS relative positioning is discussed with practical examples.

INTRODUCTION

In the past ten years, there has been a rapid advance in GPS positioning methodologies and data processing techniques but little effort has been made to establish a clear procedure for optimum GPS surveying design. This is partly because of the limited number of available satellites and restricted windows in the early days of GPS surveying and partly because of the complex relationships regarding the obtainable accuracy with the changing geometry of the satellite configuration, timing and duration of the observation session. Another reason for the delay in the research on this topic is that many people feel the full GPS satellites deployment in 1993 has resulted in the GPS survey planning problem being less critical.

The measure of Geometric Dilution of Precision (GDOP) or Position Dilution of Precision (PDOP) has been commonly used to describe the effect of the satellite geometric distribution on the achievable accuracy of GPS positioning. The concept of GDOP/PDOP was borrowed from the GPS navigation principle which reflects only the instantaneous satellite geometry related to a single point at a single epoch. The GDOP factor does not reflect the accuracy achievable with precise GPS relative positioning which is determined by the satellite/station geometry and the timing and duration of the observations. PDOP values for pseudo range solutions are more relevant to navigation than to survey applications. The limitation of PDOP as an accuracy indicator for relative positioning was reported by Norton (1987), Hatch and Avery (1989), and Merminod, Grant and Rizos (1990).

120

Due to the absence of a proper measure of good satellite geometry for relative positioning, GDOP factors have tended also to be used to assist in the planning of GPS surveys (Merminod, Grant and Rizos 1990). The recommended GDOP/PDOP factors for relative positioning can be found in government survey and mapping organization documentation (Canada, Rapatz et al, 1987; Australia, Inter-Government Advisory Committee on Surveying and Mapping, IGACSM, 1988). The United States Federal Geodetic Control Committee (FGCC, 1988) recognized the problem with GDOP and remarked, "... Studies are underway to investigate the relationship of Geometric Dilution of Precision (GDOP) values to the accuracy of the base line determinations. ... It appears the best result may be achieved when the GDOP values are changing in value during the observing session." Several efforts have been made to use the changing rate of GDOP as a measure for relative positioning. One suggested that the best results are achieved when the GDOP values are getting smaller in value during the observing session (IGACSM 1988) while the other said that it was often desirable to take observations at a time of rapidly changing PDOP (Trimble, 1989). It is obvious that there are some contradictions and Confusions in the previous research about a rational criterion that can be used for optimum GPS survey planning.

The accuracy of relative positioning is determined by the continuously changing satellite geometry from the observation starting time to the end of the session. Since the computation of GDOP does not take into account time as a variable, it is not a proper measure for GPS satellite surveying.

In Yang's Ph.D. research work a mathematical model based on RDOP, a quantifiable measure proposed by Goad (1989), was developed to study the effect of the continuously changing satellite geometry on the achievable accuracy of relative positioning under the full GPS constellation (Yang, 1995). The RDOP surface, a mathematical surface, was generated based on the broadcast almanac file with a fast array algebra filtering technique (Rauhala, 1980, 1982; Yang, 1995). The optimum observation window, optimum session starting time and optimum observation session length can be derived from the study of the RDOP surface. In this paper the application of the RDOP surface for the optimum design of GPS relative positioning will be discussed with practical examples.

MATHEMATICAL MODEL OF RDOP

A generalized mathematical model of RDOP was developed for the fast generation of the RDOP surface (Yang, 1995). This model is based on:

(1) Unlike point positioning, the accuracy of which is determined by the instantaneous satellite/station geometry at a single epoch, the accuracy of relative positioning is determined by the continuously changing satellite/station geometry from the observation starting time to the end of the session which may last for a few hours. Therefore in this model the time t will be treated as a continuous variable.

(2) The position determined in point positioning only involves a single point while in relative positioning 2 positions are determined simultaneously for a GPS baseline. Ideally the coordinates of both points should be considered as unknowns in this model.

In this model the time t is treated as a continuous variable thus the variability of the accuracy of relative positioning with respect to different observation starting time and session length can be studied. With the two stations of a baseline considered as unknowns a complete accuracy analysis can be derived from this model, namely the positional precision of the two stations and the relative precision between the two.

Compared with the mathematical model of PDOP, a new variable, the observation session length, is introduced into the model of RDOP. The commonly used PDOP curve is a two dimensional plot in which one axis represents observation time and the other axis represents the values of PDOP. In the plot of RDOP the observation session length can be expressed in the third dimension to generate a mathematical surface. This surface is called the RDOP surface. The RDOP surface contains the accuracy information for GPS relative positioning with respect to a certain session starting time and session length. The advantage of the RDOP surface is that it can be numerically simulated based on the GPS broadcast almanac file. Optimum observation curves can then be derived from the RDOP surface. The optimum curves can be used for a GPS surveying network design based on the almanac file. It can also be used for the automatic determination of the session length in a real-time mode based on the ephemeris file. The value of RDOP is a measure that can also be used for objective quality control in a least-squares adjustment of a GPS network.

RDOP SURFACE

The RDOP surface is a 3-D graphical presentation of the RDOP as a function of session starting time and session length. A RDOP surface, generated for a specific location on the Earth, geometrically describes the effect of the changing satellite geometry on the achievable accuracy of relative positioning for a certain period.

The RDOP surface varies with different locations on the earth. The changing satellite geometry with respect to the same location on the earth repeats for every 11 hours and 58 minutes and at a time which is four minutes earlier each day. Therefore the RDOP surface generated for a 12 hour period fully describes the effect of the relative movement of GPS satellites on the achievable accuracy for relative positioning.

A software package GPSBIRD written in C++ was developed for the computation of the RDOP surface. A RDOP surface for a 60 minute session length was generated for Thornden, Syracuse for a twelve hour window, 8:00 - 20:00, on August 31, 1994. A grided perspective view of the RDOP surface is shown in Figure 1 and the corresponding RDOP contour map is shown in Figure 2.

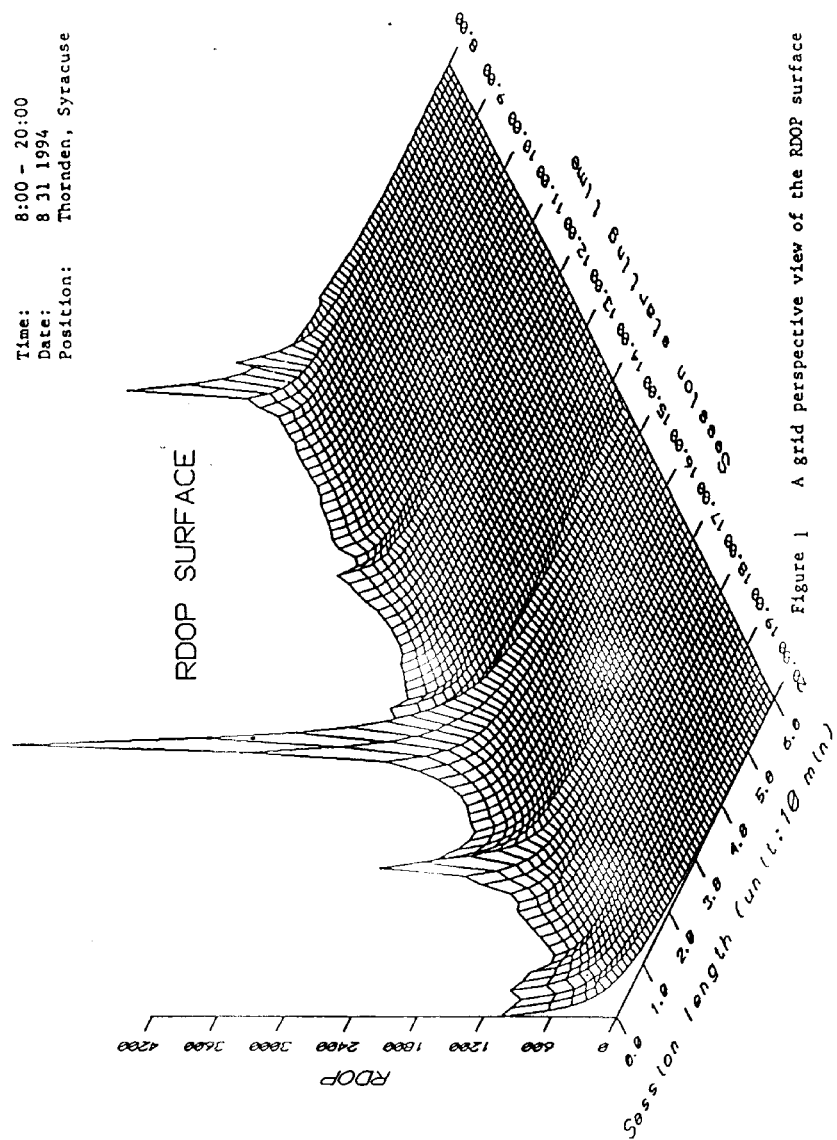
Figure 1 A grid perspective view of the RDOP surface

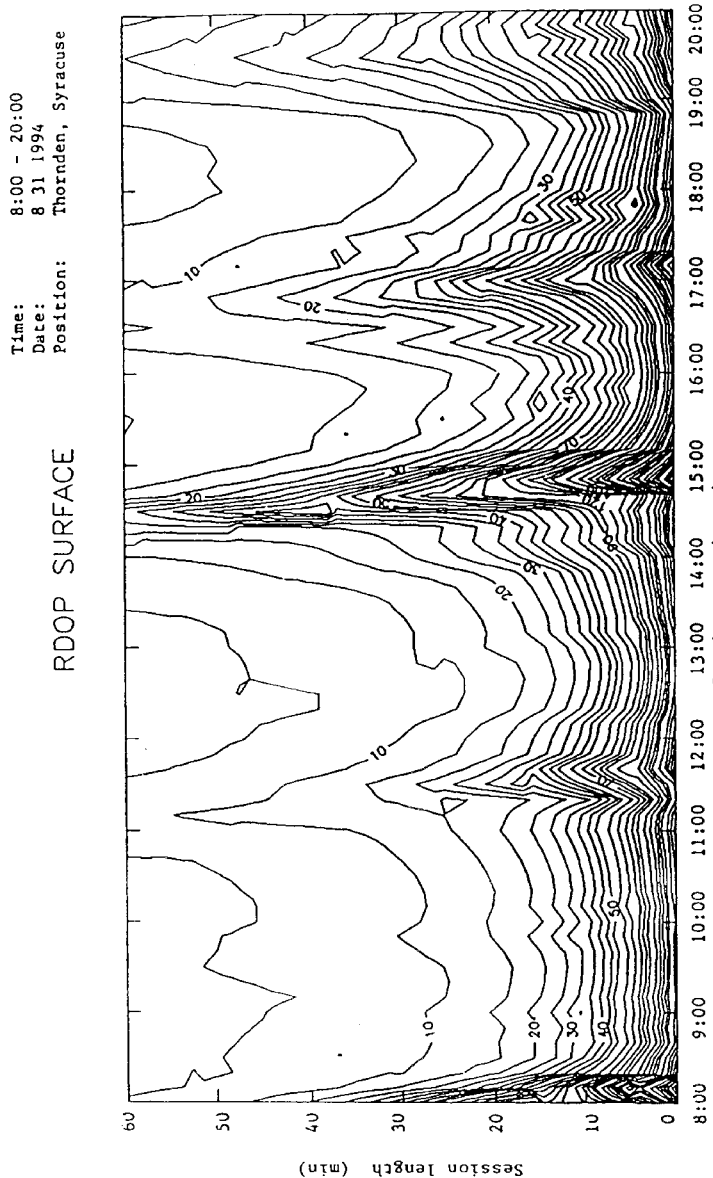
Figure 2 The RDOP contour map

GEOMETRIC MEANING OF THE RDOP SURFACE

The RDOP contour map of Figure 2 shows the variability and magnitude of the RDOP with respect to different session starting times and session lengths over a 12 hour period. In Figure 2 the x axis represents session starting time and the y axis shows the session length. The contour lines represent the values of the RDOP in the third dimension. Specific RDOP curves with different implications can be extracted from the contour map.

Profiles along the x Direction

A profile along the x direction extracted from the RDOP contour map is a RDOP curve representing the variability of RDOP versus different starting times for a certain observation period. Figure 3 is an extraction of two profiles parallel to the x axis. One RDOP curve represents a 30 minute session and the other represents a 60 minute session.

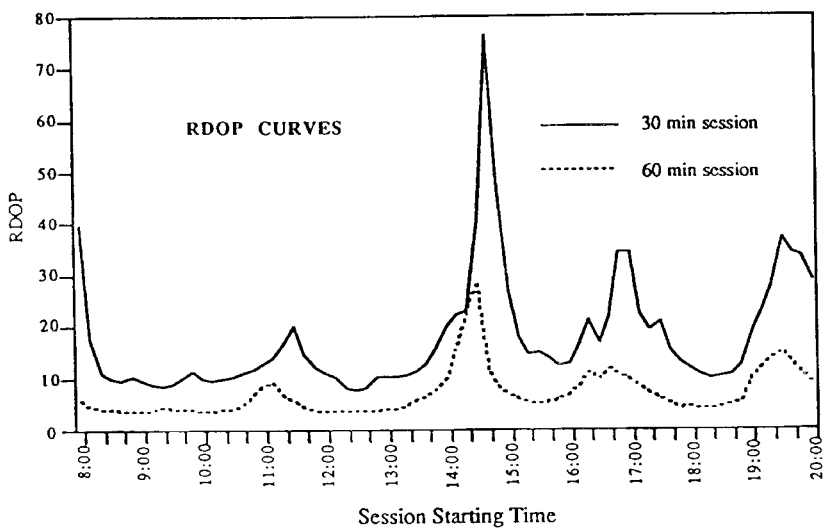

Figure 3  RDOP curves extracted along the x direction

The RDOP curves extracted along the x direction give information about the optimum starting times for GPS relative positioning for Thornden, Syracuse during a 12 hour period on August 31, 1994. The five peaks represent the five local maximums for the RDOP, which correspond to the lowest accuracy for relative positioning. The four troughs between the peaks represent the optimum starting periods for relative positioning.

Comparing these two curves it can be seen that (1) a significant improvement in the RDOP can be achieved for the 60 minute session and (2) the variability of the RDOP for the longer session has been smoothed.

Profiles along the y Direction

A profile in the y direction shows the improvement of RDOP over certain tracking intervals. Figure 4 shows two RDOP curves for the 9:00 - 10:00 session and the 14:30 - 15:30 session respectively.

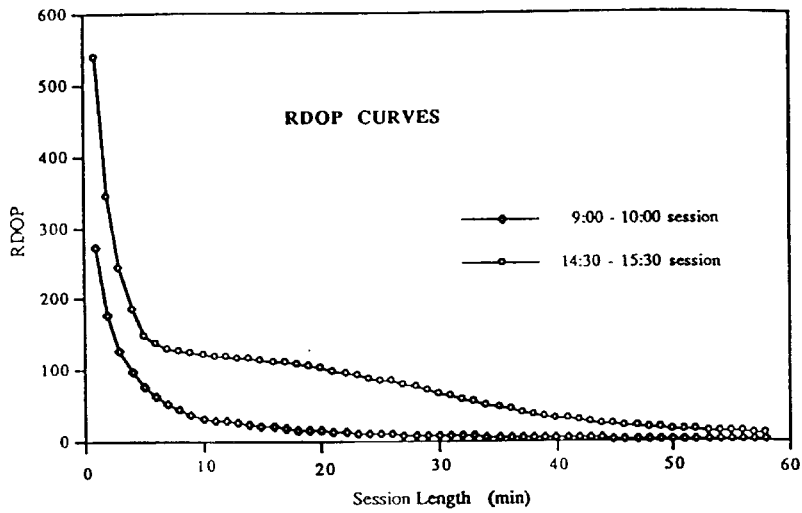

Figure 4  RDOP curves extracted along the y direction

From Figure 4 we can see the rapid improvement of RDOP in a very short period at the beginning. It then slows down very quickly after 10 minutes. There is a significant change at the 5 minute session length in the 14:30 - 15:30 session. The variation of changing rate of the RDOP is determined by the changing satellite geometry and the combination of satellites available at each epoch. The initial values of the RDOP are determined by the satellite/station geometry at the session starting time and the number of satellites available. The difference in the RDOP for different sessions gets much smaller as the session lengths increase. This is the smoothing effect mentioned in the previous section.

APPLICATION SIGNIFICANCE

The RDOP surface is an optimum design tool for GPS relative positioning. The optimum observation windows, optimum session starting time and optimum observation session length can be derived from the RDOP surface.

Optimum Session Starting Time

The RDOP contour map of Figure 2 shows the variability of RDOP during a 12 hour period. The five peaks in Figure 2 represent five short periods during which the lowest accuracy would be obtained for the GPS baseline to be determined. The four troughs between the peaks represent the periods during which higher accuracy can be achieved with GPS surveying. Under certain accuracy requirements, the best session starting time over a twelve hour period can be derived based on the comparison of the values of the RDOP plot in the x direction.

An Example  Find the best session starting time for GPS relative positioning at Thornden, Syracuse on August 31, 1994 in the period 8:00 - 20:00 based on the RDOP contour map of Figure 2. Assume the RDOP value of 30 is required for the baseline to be determined.

In Figure 2 the minimum point of the RDOP curve 30 gives the best session starting time. The worst session starting time corresponds to the maximum point of that RDOP curve. The results are shown in Table 1.

Comparison of Best and Worst Sessions    Table 1

| Session | Starting time | End time | Session length | RDOP |
|---------|---------------|----------|----------------|------|
| 1 | 12:52 | 13:00 | 8 min | 30 |
| 2 | 14:25 | 15:23 | 58 min | 30 |

From Table 1 we can see that the best starting time is at 12:52 and the worst starting time is at 14:25. It only takes 8 minutes to achieve the value of RDOP 30 if one starts a session at 12:52 whereas it requires 58 minutes to get the same accuracy if a session starts a 14:25. As far as observation time is concerned, an improvement factor of more than 7 can be achieved.

Optimum Observing Session Length

The value of RDOP is inversely proportional to the session length. The optimum observation length for a particular starting time for GPS relative positioning can be interpolated from the RDOP curve extracted along y direction. The required session length to reach a certain value of RDOP at a particular starting time can be interpolated in the y direction of the contour map. Using the same example as in Figure 2 it can be seen that for a GPS baseline to be observed at a starting time of 10:00 on August 31, 1994, at Thornden, Syracuse, it will take 11 minutes to reach the value of RDOP 30. If the value of RDOP 10 is required to achieve better accuracy for relative positioning, the necessary session length would be 27 minutes.

Optimum Observation Windows

The RDOP contour map of Figure 2 shows the variability of RDOP during a 12 hour period. The five peaks in Figure 2 represent five short periods during which the lowest accuracy would be obtained for the GPS baseline to be determined. The four troughs between the peaks represent the periods during which much higher accuracy can be achieved for GPS surveying. Figure 2 shows that with the full 24 GPS satellite deployment, there are still several periods which are significantly better than others. Table 2 shows the periods during which RDOP 30 can be achieved with an observing session length of less than 15 minutes. The four windows shown in the Table 2 give the optimum observation times with a total of 6 hours and 29 minutes in the 12 hour period. The RDOP contour map shows the optimum observation windows during which higher accuracy can be obtained with relatively shorter observation lengths.

Optimum Observation Windows                    Table 2

| Window | Starting time | End time | Window length | RDOP |
|--------|---------------|----------|---------------|------|
| 1 | 8:20  | 11:25 | 185 min | 30 |
| 2 | 11:50 | 13:52 | 122 min | 30 |
| 3 | 15:48 | 16:10 | 22 min  | 30 |
| 4 | 17:55 | 18:55 | 60 min  | 30 |

CONCLUSIONS

It is perhaps true that, with today's availability of the full satellite constellation, the variability of PDOP and session planning are not as significant as they once were. But it is only true for GPS navigation applications. For high accuracy GPS surveying, especially for long distance GPS baseline determination, there are time windows, as shown in Table 2, which are significantly better than others. The best accuracy with the shortest observation time for long distance GPS relative positioning can be achieved based on the information provided with the RDOP surface The array algebra filtering technique used for the fast generation of RDOP surface is sequential in nature. This technique processes GSP data in an "on line" mode with real-time computational capability. The array algebra filtering technique processes GPS data on an epoch by epoch basis and gives the current estimates and their accuracy based on all the observations that have been collected to that point. Thus it is particularly suitable for real-time GPS data processing and real-time accuracy prediction

REFERENCES

FGCC, (1988). Geometric Geodetic Accuracy Standards and Specifications for Using GPS Relative Positioning Techniques (Version 5.0, May 1988), Federal Geodetic Control Committee, 6001 Executive Blvd., Rockville, Maryland, U.S.A.

Goad, C. C., (1989). Kinematic Survey of Clinton Lake Dam, Journal of Surveying Engineering, Vol. 115, No. 1.

Hatch, R.R. and E.V. Avery. (1989). A Strategic Planning Tool for GPS Surveys, Journal of Surveying Engineering, Vol. 115, No. 1.

IGACSM. (1988). Standards and Specifications for Control Surveys (Draft 6, August 1988), Inter-Government Advisory Committee on Surveying and Mapping, Canberra, Australia.

Merminod, B., D.B. Grant and C. Rizos, (1990). Planning GPS Surveys --- Using Appropriate Precision Indicators, CISM Journal ACSGC Vol. 44, No. 3, pp. 233-249.

Norton, T., (1987). Monitoring the Precision of Relative GPS Positioning, Proceedings Centernary GPS Conference, Department of Land Information, Royal Melbourne Institute of Technology, Aug. 24-26, 1987, Melbourne, Australia.

Rauhala, U. A., (1980). Introduction to Array Algebra, Photogrammetric Engineering and Remote Sensing, Vol. 46, No. 2.

Rauhala, U. A., (1982). Array Algebra Estimation in Signal Processing. Photogrammetric Engineering and Remote Sensing, No. 9.

Rapatz, P.J.V., M. Craymer, A. Kleusberf, R.B. Langley, S.H. Quek, J. Tranquilla and D.E. Wells, (1987). Procedures and Specifications for Urban GPS Surveys, Report of the Department of surveying Engineering, University of New Brunswick, Canada.

Yang, Xinyu, (1995). The Optimum Design of Precise GPS relative Positioning with RDOP Surface: Modeling, Comparison and Results. Ph.D. Dissertation, State University of New York, College of Environmental Science and Forestry.

We claim:

1. A method of determining the relative dilution of precision (RDOP) of a GPS measurement comprising:

receiving signals from a plurality of GPS satellites at a first, fixed, known location;

receiving the signals from the plurality of GPS satellites at a second, fixed locations;

measuring the time of receipt of the signals;

determining the RDOP of a measurement of the locations of the second locations with respect to the first location in accordance with the relative changes in satellite positions during the receipt of the signals.

2. The method of claim 1 wherein the step of determining the RDOP comprises dynamically estimating the RDOP.

3. The method of claim 2 wherein the RDOP is estimated by algebraic filtering.

4. An apparatus for determining the relative dilution of precision (RDOP) of a GPS measurement comprising:

means for receiving signals from a plurality of GPS satellites at a first, fixed, known location;

means for receiving the same signals from the plurality of GPS satellites at a second, fixed location;

means for measuring the time of receipt of the signals;

means for determining the RDOP of a measurement of the second location with respect to the first location in accordance with the relative changes in satellite positions during the receipt of the signals.

5. The apparatus of claim 4 wherein the means for determining the RDOP comprises means for dynamically estimating the RDOP.

6. The apparatus of claim 5 wherein the means for estimating RDOP comprises an algebraic filter.

* * * * *